(12) United States Patent
Tabata et al.

(10) Patent No.: US 7,566,288 B2
(45) Date of Patent: Jul. 28, 2009

(54) CONTROL APPARATUS FOR VEHICULAR DRIVE SYSTEM

(75) Inventors: Atsushi Tabata, Okazaki (JP); Yuji Inoue, Nisshin (JP); Atsushi Kamada, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 237 days.

(21) Appl. No.: 11/441,114

(22) Filed: May 26, 2006

(65) Prior Publication Data
US 2007/0111848 A1 May 17, 2007

(30) Foreign Application Priority Data
May 26, 2005 (JP) ............................. 2005-154748
Jun. 24, 2005 (JP) ............................. 2005-184436

(51) Int. Cl.
*B60W 10/18* (2006.01)
*B60W 10/08* (2006.01)

(52) U.S. Cl. ....................... 477/4; 477/3; 477/5; 475/5; 475/275; 475/276; 475/280; 475/330; 180/65.2; 180/65.7

(58) Field of Classification Search ........................ None
See application file for complete search history.

(56) References Cited

U.S. PATENT DOCUMENTS

| 5,775,449 | A | 7/1998 | Moroto et al. |
| 6,146,302 | A | 11/2000 | Kashiwase |
| 6,629,024 | B2 * | 9/2003 | Tabata et al. .................. 701/22 |
| 7,053,566 | B2 * | 5/2006 | Aizawa et al. ................ 318/34 |
| 2005/0001480 | A1 * | 1/2005 | Tabata et al. ................ 303/141 |
| 2005/0245350 | A1 * | 11/2005 | Tabata et al. .................. 477/34 |

FOREIGN PATENT DOCUMENTS

| JP | 7-336810 | 12/1995 |
| JP | 9-308011 | 11/1997 |
| JP | 11-217025 | 8/1999 |
| JP | 2003-301731 | 10/2003 |

* cited by examiner

*Primary Examiner*—David D. Le
(74) *Attorney, Agent, or Firm*—Oblon, Spivak, McClelland, Maier & Neustadt, P.C.

(57) ABSTRACT

A control apparatus for a vehicular drive system including a continuously-variable transmission portion operable as an electrically controlled continuously variable transmission having a differential mechanism operable to distribute an output of an engine to a first electric motor and a power transmitting member, and a second electric motor disposed in a power transmitting path between the power transmitting member and a drive wheel of a vehicle. The control apparatus includes: (a) a differential-state limiting device provided in the differential mechanism, and operable to limit a differential function of the differential mechanism, for limiting an operation of the continuously-variable transmission portion as the electrically controlled continuously variable transmission; and (b) a differential-state switching controller operable, when acceleration or deceleration of the vehicle is required, for removing the limitation imposed by the differential-state limiting device on the operation of the continuously-variable transmission portion as the electrically controlled continuously variable transmission.

18 Claims, 19 Drawing Sheets

| | C0 | C1 | C2 | B0 | B1 | B2 | B3 | SPEED RATIO | STEPPING RATIO |
|---|---|---|---|---|---|---|---|---|---|
| 1st | ◎ | ○ | | | | | ○ | 3.357 | 1.54 |
| 2nd | ◎ | ○ | | | | ○ | | 2.180 | 1.53 |
| 3rd | ◎ | ○ | | | ○ | | | 1.424 | 1.42 |
| 4th | ◎ | ○ | ○ | | | | | 1.000 | 1.42 |
| 5th | | ○ | ○ | ◎ | | | | 0.705 | SPREAD 4.76 |
| R | | | ○ | | | | ○ | 3.209 | |
| N | ○ | | | | | | | | |

○ ENGAGED
◎ ENGAGED FOR STEP-VARIABLE SHIFTING, AND RELEASED FOR CONTINUOUSLY-VARIABLE SHIFTING

| | C0 | C1 | C2 | B0 | B1 | B2 | SPEED RATIO | STEPPING RATIO |
|---|---|---|---|---|---|---|---|---|
| 1st | ◎ | ○ | | | | ○ | 2.804 | 1.54 |
| 2nd | ◎ | ○ | | | ○ | | 1.531 | 1.53 |
| 3rd | ◎ | ○ | ○ | | | | 1.000 | 1.42 |
| 4th | | ○ | ○ | ◎ | | | 0.705 | SPREAD 3.977 |
| R | | | ○ | | | ○ | 2.393 | |
| N | ○ | | | | | | | |

○ ENGAGED
◎ ENGAGED FOR STEP-VARIABLE SHIFTING, AND RELEASED FOR CONTINUOUSLY-VARIABLE SHIFTING

CONTROL APPARATUS FOR VEHICULAR DRIVE SYSTEM

The present application is based on Japanese Patent Applications No. 2005-154748 and No. 2005-184436.

BACKGROUND OF THE INVENTION

1. Field of the Invention

The present invention relates to a vehicular drive system including a differential mechanism having a differential function, and electric motors, and more particularly to techniques for improving a fuel economy.

2. Discussion of Prior Art

There is known a drive system for a vehicle, which includes a differential mechanism operable to distribute an output of an engine to a first electric motor and its output shaft, and a second electric motor disposed between the output shaft of the differential mechanism and a drive wheel of the vehicle. Patent Document 1 discloses an example of such a vehicular drive system, which is a hybrid vehicle drive system. In this hybrid vehicle drive system, the differential mechanism is constituted by a planetary gear set, for example, and a major portion of a drive force of the engine is mechanically transmitted to the drive wheels through the differential function of the differential mechanism, while the rest of the drive force is electrically transmitted from the first electric motor to the second electric motor, through an electric path therebetween, so that the differential mechanism functions as a transmission the speed ratio of which is continuously variable, for example, as an electrically controlled continuously variable transmission, thereby making it possible to drive the vehicle under the control of a control device, with the engine kept in an optimum operating state with an improved fuel economy.

Patent Document 1 JP-2003-301731A

Generally, a continuously variable transmission is known as a transmission which permits an improved fuel economy of the vehicle, while on the other hand a gear type transmission such as a step-variable automatic transmission is known as a transmission having a high power transmitting efficiency. However, there is not available any power transmitting mechanism having the advantages of those two types of transmission. For example, the hybrid vehicle drive system disclosed in the above-identified publication JP-2003-301731A includes the electric path for transmitting an electric energy from the first electric motor to the second electric motor, namely, a power transmitting path for transmitting a portion of the vehicle drive force as an electric energy, so that a portion of the output of the engine is once converted into an electric energy which is subsequently converted into a mechanical energy to be transmitted to the drive wheels, whereby the fuel economy of the vehicle may possibly be deteriorated under some running condition of the vehicle, for instance, during a high-speed running of the vehicle. Where the above-described differential mechanism is a transmission the speed ratio of which is electrically variable, for example, a continuously variable transmission so-called an "electric CVT", the vehicular drive system suffers from a similar problem.

The present invention was made in view of the background art described above. It is therefore an object of this invention to provide a control apparatus for a vehicular drive system including a differential mechanism operable to distribute an output of an engine to a first electric motor and its output shaft, and a second electric motor disposed in a power transmitting path between the differential mechanism and a drive wheel of a vehicle, which control apparatus permits improvement of fuel economy of the vehicular drive system, particularly, during a high-speed running of the vehicle.

SUMMARY OF THE INVENTION

The present invention according to claim 1 provides a control apparatus for (a) a vehicular drive system including a continuously-variable transmission portion operable as an electrically controlled continuously variable transmission, the continuously-variable transmission portion having a differential mechanism operable to distribute an output of an engine to a first electric motor and a power transmitting member, and a second electric motor disposed in a power transmitting path between the power transmitting member and a drive wheel of a vehicle, the control apparatus being characterized by comprising: (b) a differential-state limiting device provided in the differential mechanism, and operable to limit a differential function of the differential mechanism, for limiting an operation of the continuously-variable transmission portion as the electrically controlled continuously variable transmission; and (c) differential-state switching control means operable, when acceleration or deceleration of the vehicle is required, for removing the limitation imposed by the differential-state limiting device on the operation of the continuously-variable transmission portion as the electrically controlled continuously variable transmission.

In the control apparatus constructed as described above, the continuously-variable transmission portion of the vehicular drive system is switchable by the differential-state limiting device, between a continuously-variable shifting state in which the differential mechanism has the differential function without a limitation imposed by the differential-state limiting device, to permit the continuously-variable transmission portion to be operable as the electrically controlled continuously variable transmission, and a non-continuously-variable shifting state in which the differential function of the differential mechanism is limited to the operation of the continuously-variable transmission portion. When the differential mechanism is placed in a non-differential state, for example, in a locked state, the continuously-variable transmission portion is placed in the non-continuously-variable shifting state, for example, in a step-variable shifting state in which the continuously-variable transmission portion is not operable as the electrically controlled continuously variable transmission. Accordingly, the present drive system has both an advantage of an improvement of the fuel economy of a transmission the speed ratio of which is electrically variable, and an advantage of a high power transmitting efficiency of a gear type power transmitting device constructed for mechanical transmission of power.

When the continuously-variable transmission portion is placed in the continuously-variable shifting state in a normal output state of the engine during a low-speed or medium-speed running or a low-output or medium-output running of the vehicle, for example, the fuel economy of the vehicle is improved. When the continuously-variable transmission portion is placed in the non-continuously-variable shifting state during a high-speed running of the vehicle, the output of the engine is transmitted to the drive wheel primarily through the mechanical power transmitting path, so that the fuel economy is improved owing to reduction of a loss of conversion of a mechanical energy into an electric energy, which would take place when the continuously-variable transmission portion is operated as the electrically controlled continuously variable transmission.

Further, when acceleration or deceleration of the vehicle is required, the differential-state switching control means removes the limitation imposed by the differential-state limiting device on the operation of the continuously-variable transmission portion as the electrically controlled continuously variable transmission, so that a rotational speed of the engine can be freely set irrespective of a vehicle speed owing to the differential function of the differential mechanism, i.e., owing to absence of the limitation on the operation of the continuously-variable transmission portion as the electrically controlled continuously variable transmission, unlike in the non-continuously-variable shifting state in which the operation of the continuously-variable transmission portion as the electrically controlled continuously variable transmission is limited whereby the rotational speed of the engine is determined by the vehicle speed and cannot be freely set.

When acceleration of the vehicle is required, the rotational speed of the engine can be increased according to a depressing operation of an accelerator pedal, without being determined by the vehicle speed, so that a drive torque of the vehicle is rapidly increased whereby the vehicle acceleration performance and the vehicle acceleration drivability as felt by the vehicle operator are improved. Further, when deceleration of the vehicle is required, the rotational speed of the engine can be reduced according to a returning operation of the accelerator pedal, without being determined by the vehicle speed, so that the drive torque of the vehicle is rapidly reduced whereby the vehicle acceleration performance and the vehicle deceleration drivability as felt by the vehicle operator are improved.

The present invention according to claim 2 provides a control apparatus for (a) a vehicular drive system including a differential portion, the differential portion having a differential mechanism operable to distribute an output of an engine to a first electric motor and a power transmitting member, and a second electric motor disposed in a power transmitting path between the power transmitting member and a drive wheel of a vehicle, the control apparatus being characterized by comprising: (b) a differential-state limiting device provided in the differential mechanism, and operable to limit a differential function of the differential mechanism, for limiting a differential function of the differential portion; and (c) differential-state switching control means operable, when acceleration or deceleration of the vehicle is required, for placing the differential portion in a differential state in which the differential portion performs the differential function.

In the control apparatus constructed as described above, the differential portion of the vehicular drive system is switchable by the differential-state limiting device, between the differential state in which the differential mechanism has the differential function without a limitation imposed by the differential-state limiting device, to permit the differential portion to be operable to perform the differential function, and a state in which the differential function of the differential mechanism is limited by the differential-state limiting device. When the differential mechanism is placed in a non-differential state, for example, in a locked state, the differential portion is placed in the non-continuously-variable shifting state, for example, in a step-variable shifting state in which the differential portion is not operable as the electrically controlled continuously variable transmission. Accordingly, the present drive system has both an advantage of an improvement of the fuel economy of a transmission the speed ratio of which is electrically variable, and an advantage of a high power transmitting efficiency of a gear type power transmitting device constructed for mechanical transmission of power.

When the differential portion is placed in the differential state in a normal output state of the engine during a low-speed or medium-speed running or a low-output or medium-output running of the vehicle, for example, the fuel economy of the vehicle is improved. When the differential portion is placed in the non-differential state during a high-speed running of the vehicle, the output of the engine is transmitted to the drive wheel primarily through the mechanical power transmitting path, the fuel economy is improved owing to reduction of a loss of conversion of a mechanical energy into an electric energy, which would take place when the differential portion is operated as the electrically controlled continuously variable transmission.

Further, when acceleration or deceleration of the vehicle is required, the differential-state switching control means places the differential portion in the differential state in which the differential portion performs the differential function, so that the rotational speed of the engine can be freely set irrespective of a vehicle speed owing to the differential function of the differential mechanism, i.e., owing to absence of the limitation on the operation of the differential function of the differential portion, unlike in the non-differential state in which the differential function of the differential portion is limited whereby the rotational speed of the engine is determined by the vehicle speed and cannot be freely set.

When acceleration of the vehicle is required, for example, when the accelerator pedal is operatively depressed, the rotational speed of the engine can be increased according to a depressing operation of the accelerator pedal, without being determined by the vehicle speed, so that the drive torque of the vehicle is rapidly increased whereby the vehicle acceleration performance and the vehicle acceleration drivability as felt by the vehicle operator are improved. Further, when deceleration of the vehicle is required, for example, when the accelerator pedal is operatively returned, the rotational speed of the engine can be reduced according to a returning operation of the accelerator pedal, without being determined by the vehicle speed, so that the drive torque of the vehicle is rapidly reduced whereby the vehicle acceleration performance and the vehicle deceleration drivability as felt by the vehicle operator are improved.

In the invention according to claim 3, the differential-state limiting device includes an engaging element operable to connect at least two of three rotary elements constituting the differential mechanism, or to hold one of the three rotary elements stationary, and the differential-state switching control means releases the engaging element, for placing the differential portion in a differential state in which the differential portion performs the differential function. In this arrangement, the differential mechanism is easily switchable by the engaging element, between the differential state in which the differential mechanism can perform the differential function, and the state in which the differential function is limited, thereby providing the drive system having both an advantage of an improvement of the fuel economy of a transmission the speed ratio of which is electrically variable, and an advantage of a high power transmitting efficiency of a gear type power transmitting device constructed for mechanical transmission of power. Further, when acceleration or deceleration of the vehicle is required, the differential mechanism is easily placed in the differential state by a releasing action of the engaging element, so that the rotational speed of the engine can be freely set irrespective of the vehicle speed.

In the invention according to claim 4, the differential-state limiting device includes an engaging element operable to connect at least two of three rotary elements constituting the differential mechanism, or to hold one of the three rotary elements stationary, and the differential-state switching control means partially engages the engaging element, for placing the differential portion in a differential state in which the differential portion performs the differential function. In this arrangement, the differential mechanism is easily switchable by the engaging element, between the differential state in which the differential mechanism can perform the differential function, and the state in which the differential function is limited, thereby providing the drive system having both an advantage of an improvement of the fuel economy of a transmission the speed ratio of which is electrically variable, and an advantage of a high power transmitting efficiency of a gear type power transmitting device constructed for mechanical transmission of power. Further, when acceleration or deceleration of the vehicle is required, the differential mechanism is easily placed in the differential state by the engaging element being partially engaged, so that the rotational speed of the engine can be freely set irrespective of the vehicle speed. This arrangement enables the engaging element to be engaged more rapidly as compared with an arrangement in which the engaging element is released for placing the differential mechanism in the differential state.

In the invention according to claim 5, there are further provided: a step-variable transmission portion constituting a part of the power transmitting path and functioning as a step-variable transmission; and rotational speed control means operable, during a shift-down action of the step-variable transmission portion effected when the acceleration of the vehicle is required, to increase a rotational speed of the engine in an initial stage of the shift-down action. In this arrangement, when acceleration of the vehicle is required, for example, when the accelerator pedal is operatively depressed, the drive torque of the vehicle is rapidly increased in the initial stage of the shift-down action according to a depressing operation of the accelerator pedal, irrespective of a shifting time required for the step-variable transmission portion in process of completing its shifting action, i.e., irrespective of responsiveness of the shifting action of the step-variable transmission portion, whereby the vehicle acceleration performance and the vehicle acceleration drivability as felt by the vehicle operator are improved.

In the invention according to claim 6, the rotational speed control means is operated, during the shift-down action of the step-variable transmission portion effected when the acceleration of the vehicle is required, to adjust the rotational speed of the engine by using the first electric motor, such that the adjusted rotational speed coincides in a final stage of the shift-down action with a rotational speed of the engine that is to be established in a non-differential state in which the differential function of the differential mechanism is limited. This arrangement restrains generation of a shock upon placement of the differential mechanism in the non-differential state.

In the invention according to claim 7, there are further provided: a step-variable transmission portion constituting a part of the power transmitting path and functioning as a step-variable transmission; and rotational speed control means operable, during a shift-up action of the step-variable transmission portion effected when the deceleration of the vehicle is required, to reduce a rotational speed of the engine in an initial stage of the shift-up action. In this arrangement, when deceleration of the vehicle is required, for example, when the accelerator pedal is operatively returned, the drive torque of the vehicle is rapidly reduced in the initial stage of the shift-up action according to a returning operation of the accelerator pedal, irrespective of a shifting time required for the step-variable transmission portion in process of completing its shifting action, i.e., irrespective of responsiveness of the shifting action of the step-variable transmission portion, whereby the vehicle deceleration performance and the vehicle deceleration drivability as felt by the vehicle operator are improved.

In the invention according to claim 8, the rotational speed control means is operated, during the shift-up action of the step-variable transmission portion effected when the deceleration of the vehicle is required, to adjust the rotational speed of the engine by using the first electric motor, such that the adjusted rotational speed coincides, in a final stage of the shift-up action, with a rotational speed of the engine that is to be established in a non-differential state in which the differential function of the differential mechanism is limited. This arrangement restrains generation of a shock upon placement of the differential mechanism in the non-differential state.

In the invention according to claim 9, there is further provided torque-responsiveness changing means operable, when the differential-state switching control means cannot remove the limitation imposed on the operation of the continuously-variable transmission portion as the electrically controlled continuously variable transmission, for changing responsiveness of an input torque of the continuously-variable transmission portion with respect to change in an angle of operation of a manually operable vehicle accelerating member. In this arrangement, even where a change in the output torque of the engine (hereinafter referred to as "engine torque") is transmitted directly to the drive wheel due to failure of removal of the limitation imposed on the on the operation of the continuously-variable transmission portion as the electrically controlled continuously variable transmission when the acceleration or deceleration of the vehicle is required, it is possible to restrain generation of a shock when the acceleration or deceleration is required, since the torque-responsiveness changing means changes the responsiveness of the input torque of the continuously-variable transmission portion with respect to the change in the angle of operation of the accelerating member, namely, since the change in the torque transmitted to the drive wheel is smoothed.

In the invention according to claim 10, the torque-responsiveness changing means changes responsiveness of an output torque of the engine, for thereby changing the responsiveness of the input torque of the continuously-variable transmission portion with respect to the change in the angle of the operation of the manually operable vehicle accelerating member. In this arrangement, the responsiveness of the input torque of the continuously-variable transmission portion with respect to the change in the angle of operation of the manually operable vehicle accelerating member is changed by changing the responsiveness of the torque outputted by the engine per se with respect to the change in the angle of operation of the accelerating member, so that the change in the torque transmitted to the drive wheel is smoothed thereby making it possible to restrain generation of the shock when the acceleration or deceleration is required.

In the invention according to claim 11, the torque-responsiveness changing means moderates change in the output torque of the engine by a predetermined moderation amount, for thereby changing the responsiveness of the output torque of the engine with respect to the change in the angle of the operation of the manually operable vehicle accelerating member. In this arrangement, the change in the engine torque is smoothed thereby smoothing the change in the input torque of the continuously-variable transmission portion and accordingly smoothing the change in the torque transmitted to the drive wheel.

In the invention according to claim 12, the torque-responsiveness changing means offsets change in an output torque of the engine, by a torque of the first electric motor and/or the second electric motor, for thereby changing the responsiveness of the input torque of the continuously-variable transmission portion with respect to the change in the angle of the operation of the manually operable vehicle accelerating member. In this arrangement, the change in the engine toque is offset by the torque of the first electric motor and/or the second electric motor, thereby changing the responsiveness of the input torque of the continuously-variable transmission portion with respect to the change in the angle of the operation of the accelerating member, and accordingly smoothing the change in the torque transmitted to the drive wheel. It is therefore possible to restrain generation of the shock when the acceleration or deceleration is required.

In the invention according to claim 13, the torque-responsiveness changing means moderates change in the input torque of the continuously-variable transmission portion relative to change in the angle of the operation of the manually operable vehicle accelerating member, by offsetting the change in the output torque of the engine by the torque of the first electric motor and/or the second electric motor. In this arrangement, the change in the input torque of the continuously-variable transmission portion is smoothed whereby the change in the torque transmitted to the drive wheel is smoothed.

In the invention according to claim 14, there is further provided a torque-responsiveness changing means operable, when the differential-state switching control means cannot place the differential portion in the differential state in which the differential portion performs the differential function, for changing responsiveness of an input torque of the differential portion with respect to change in an angle of operation of a manually operable vehicle accelerating member. In this arrangement, even where the change in the engine torque is transmitted directly to the drive wheel due to failure of placement of the differential portion in the differential state in which the differential portion performs the differential function when the acceleration or deceleration of the vehicle is required, it is possible to restrain generation of a shock when the acceleration or deceleration is required, since the torque-responsiveness changing means changes the responsiveness of the input torque of the differential portion with respect to the change in the angle of operation of the accelerating member, namely, since the change in the torque transmitted to the drive wheel is smoothed.

In the invention according to claim 15, the torque-responsiveness changing means changes responsiveness of an output torque of the engine, for thereby changing the responsiveness of the input torque of the differential portion with respect to the change in the angle of the operation of the manually operable vehicle accelerating member. In this arrangement, the responsiveness of the input torque of the differential portion with respect to the change in the angle of operation of the accelerating member is changed by changing the responsiveness of the torque outputted by the engine per se with respect to the change in the angle of operation of the accelerating member, so that the change in the torque transmitted to the drive wheel is smoothed thereby making it possible to restrain generation of the shock when the acceleration or deceleration is required.

In the invention according to claim 16, the torque-responsiveness changing means moderates change in the output torque of the engine by a predetermined moderation amount, for thereby changing the responsiveness of the output torque of the engine with respect to the change in the angle of the operation of the manually operable vehicle accelerating member. In this arrangement, the change in the engine torque is smoothed thereby smoothing the change in the input torque of the differential portion and accordingly smoothing the change in the torque transmitted to the drive wheel.

In the invention according to claim 17, the torque-responsiveness changing means offsets change in an output torque of the engine, by a torque of the first electric motor and/or the second electric motor, for thereby changing the responsiveness of the input torque of the differential portion with respect to the change in the angle of the operation of the manually operable vehicle accelerating member. In this arrangement, the change in the engine toque is offset by the torque of the first electric motor and/or the second electric motor, thereby changing the responsiveness of the input torque of the differential portion with respect to the change in the angle of the operation of the accelerating member, and accordingly smoothing the change in the torque transmitted to the drive wheel. It is therefore possible to restrain generation of the shock when the acceleration or deceleration is required.

In the invention according to claim 18, the torque-responsiveness changing means moderates change in the input torque of the differential portion relative to change in the angle of the operation of the manually operable vehicle accelerating member, by offsetting the change in the output torque of the engine by the torque of the first electric motor and/or the second electric motor. In this arrangement, the change in the input torque of the differential portion is smoothed whereby the change in the torque transmitted to the drive wheel is smoothed.

Preferably, the case when the acceleration or deceleration is required corresponds to when a degree of vehicle acceleration or deceleration required by the vehicle operator is not smaller than a predetermined extent. In this arrangement, the differential-state switching control means is not necessarily operated for improving the vehicle acceleration or deceleration drivability as felt by the vehicle operator, always when the accelerator pedal is operated. Thus, the operation of the differential-state switching control means is stabilized.

Specifically, there is further provided an accelerator-operating-amount determining means for determining an amount of change in the operating amount of the accelerator pedal or a rate of the change in the operating amount of the accelerator pedal. In this arrangement, it is possible to determine whether the degree of vehicle acceleration or deceleration required by the vehicle operator is not smaller than the predetermined extent.

For example, the accelerator-operating-amount determining means determines whether the degree of the required acceleration is not smaller than the predetermined extent, by seeing if the amount of positive change in the operating amount of the accelerator pedal made by a depressing operation of the accelerator pedal is not smaller than a predetermined threshold, or by seeing if a rate of the positive change in the operating amount of the accelerator pedal is not smaller than a predetermined threshold.

Further, for example, the accelerator-operating-amount determining means determines whether the degree of the required deceleration is not smaller than the predetermined extent, by seeing if the amount of negative change in the operating amount of the accelerator pedal made by a returning operation of the accelerator pedal is not smaller than a predetermined threshold, or by seeing if a rate of the negative change in the operating amount of the accelerator pedal is not smaller than a predetermined threshold.

Preferably, the differential-state limiting device is arranged to place the differential mechanism in a differential state in which the differential mechanism performs the differential function, for thereby placing the continuously-variable transmission portion in the continuously-variable shifting state in which the continuously-variable transmission portion is operable as the electrically controlled continuously variable transmission, and to place the differential mechanism in a non-differential state (for example, a locked state) in which the differential function of the differential mechanism is limited, for thereby placing the continuously-variable transmission portion in the non-continuously-variable shifting state (for example, a step-variable shifting state) in which the operation of the continuously-variable transmission portion as the electrically controlled continuously variable transmission is limited. In this arrangement, the continuously-variable transmission portion is switchable between the continuously-variable shifting state and the non-continuously-variable shifting state.

Preferably, the differential-state switching device is arranged to place the differential mechanism in a differential state in which the differential mechanism performs the differential function, for thereby placing the differential portion in the differential state in which the differential portion can perform the differential function, and to place the differential mechanism in a non-differential state (for example, a locked state) in which the differential function of the differential mechanism is limited, for thereby placing the differential portion in a non-differential state (for example, a locked state) in which the differential function oft eh differential portion is limited. In this arrangement, the differential portion is switchable between the differential state and the non-differential state.

Preferably, the differential mechanism has a first rotary element (first element) connected to the engine, a second rotary element (second element) connected to the first electric motor and a third rotary element (third element) connected to the power transmitting member, and the differential-state limiting device is operable to place the differential mechanism in a differential state in which the first, second and third elements of the differential mechanism are rotatable relative to each other, and to place the differential mechanism in a non-differential state (for example, locked state) in which at least the second and third elements are not rotatable at different speeds. For example, the second and third elements are rotatable at respective different speeds in the differential state of the differential mechanism, and the first, second and third elements are rotated as a unit or the second element is held stationary in the non-differential or locked state of the differential mechanism. Thus, the differential mechanism is switchable between the differential and non-differential states.

Preferably, the differential-state limiting device includes a clutch operable to connect at least two of the first, second and third elements of the differential mechanism to each other for rotating the first, second and third elements as a unit, and/or a brake operable to fix the second element to a stationary member for holding the second element stationary. This arrangement permits the differential mechanism to be easily switched between the differential and non-differential states.

Preferably, the clutch and brake are released to place the differential mechanism in the differential state in which at least the second and third elements are rotatable at respective different speeds, and in which the differential mechanism is operable as an electrically controlled differential device. In this case, the clutch is engaged to permit the differential mechanism to be operable as a transmission having a speed ratio of 1, or the brake is engaged to permit the differential mechanism to be operable as a speed-increasing transmission having a speed ratio lower than 1. In this arrangement, the differential mechanism is switchable between the differential state and the non-differential state, and is operable as a transmission having a single gear position with a single fixed speed ratio or a plurality of gear positions having respective fixed speed ratios.

Preferably the differential mechanism is a planetary gear set, and the first element is a carrier of the planetary gear set, and the second element is a sun gear of the planetary gear set, while the third element is a ring gear of the planetary gear set. In this arrangement, the axial dimension of the differential mechanism can be reduced, and is simply constituted by one planetary gear device.

Preferably, the planetary gear set is of a single-pinion type. In this case, the axial dimension of the differential mechanism can be reduced, and the differential mechanism is simply constituted by one planetary gear set.

Preferably, an overall speed ratio of the vehicular drive system is defined by a speed ratio of the continuously-variable transmission portion and a speed ratio of the step-variable transmission portion. In this arrangement, the vehicle drive force can be obtained over a relatively wide range of the overall speed ratio, by utilizing the speed ratio of the step-variable transmission portion, so that the efficiency of the continuously-variable shifting control of the continuously-variable transmission portion is further improved. Where the step-variable transmission portion is operated as a speed-reducing transmission having a speed ratio larger than 1, the output torque of the second electric motor may be smaller than the output torque of the output shaft of the transmission portion, so that the second electric motor can be made compact in size. The continuously-variable transmission portion placed in its continuously-variable shifting state and the step-variable transmission portion cooperate to constitute a continuously-variable transmission, while the continuously-variable transmission portion placed in the non-continuously-variable shifting state and the step-variable transmission portion cooperate to constitute a step-variable transmission.

Preferably, an overall speed ratio of the vehicular drive system is defined by a speed ratio of the differential portion and a speed ratio of the step-variable transmission portion. In this arrangement, the vehicle drive force can be obtained over a relatively wide range of the overall speed ratio, by utilizing the speed ratio of the step-variable transmission portion. Where the step-variable transmission portion is operated as a speed-reducing transmission having a speed ratio larger than 1, the output torque of the second electric motor may be smaller than the output torque of the output shaft of the transmission portion, so that the second electric motor can be made compact in size. The differential portion placed in its continuously-variable shifting state and the step-variable transmission portion cooperate to constitute a continuously-variable transmission, while the differential portion placed in the non-continuously-variable shifting state and the step-variable transmission portion cooperate to constitute a step-variable transmission.

The step-variable transmission portion is a step-variable automatic transmission. In this arrangement, the overall speed ratio of the drive system is changed in steps when the step-variable transmission portion is shifted. The change of the overall speed ratio in steps is more rapid than when the overall speed ratio is continuously changed. Accordingly, the drive system functions as a continuously variable transmission capable of smoothly changing the vehicle drive torque, and also capable of changing the speed ratio in steps for rapidly obtaining the vehicle drive torque.

When the vehicle is running at a relatively high speed, the drive system is placed in the non-continuously-variable shifting state, for example, in the step-variable shifting state. The drive system is operated as a step-variable transmission in the non-continuously-variable shifting state. When the vehicle is running at a low or medium running speed, the drive system is placed in the continuously-variable shifting state, for thereby assuring improved fuel economy of the vehicle. Further, When the vehicle is running at a relatively high speed, the drive system is placed in the non-continuously-variable shifting state in which the output of the engine is transmitted to the drive wheel primarily through a mechanical power transmitting path, so that the fuel economy is improved owing to reduction of a loss of energy conversion between mechanical and electric energies, which would take place when the vehicular drive system operates as the electrically controlled continuously-variable transmission.

Further, a manually operable means may be provided to selectively place the drive system in the non-continuously-variable shifting state, for example, in the step-variable shifting state, so that the vehicle operator can manually place the drive system in the continuously-variable shifting state when the vehicle operator desires the drive system to operate as a continuously variable transmission or desires to improve the fuel economy of the vehicle, or place the vehicle drive system in the step-variable shifting state when the vehicle operator desires the drive system to operate as a step-variable transmission or desires a rhythmic change of the engine rotational speed as a result of a shifting action of the step-variable transmission.

DETAILED DESCRIPTION OF THE INVENTION

The embodiments of this invention will be described in detail by reference to the drawings.

Embodiment 1

Figures 1, 2:
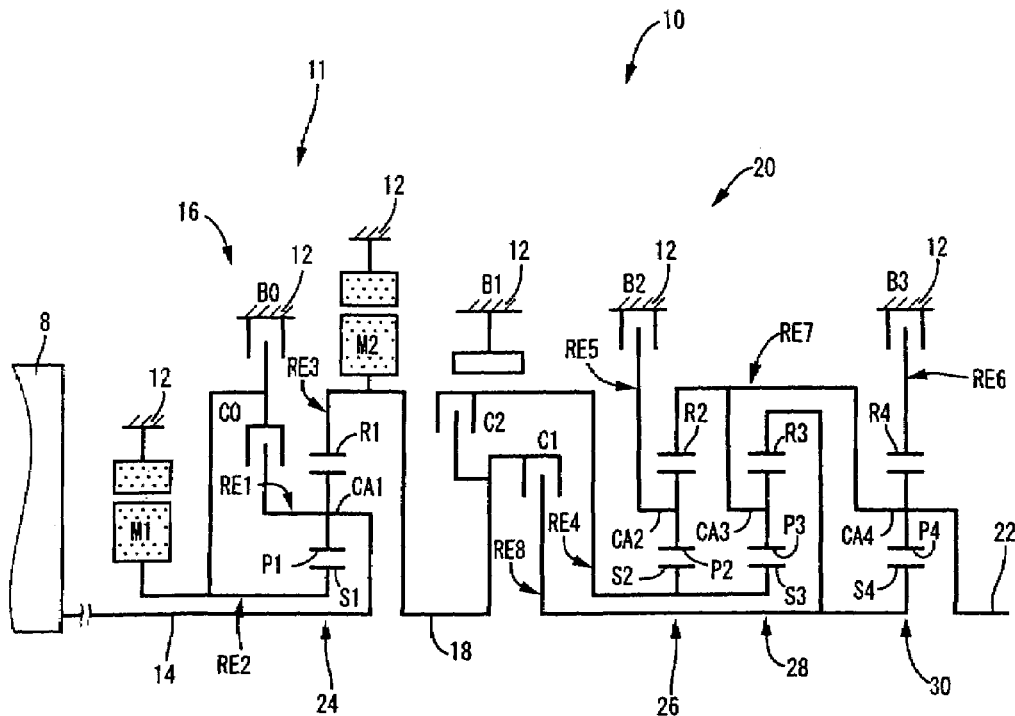
FIG. 1 is a schematic view showing an arrangement of a drive system of a hybrid vehicle as an embodiment of the present invention.
FIG. 2 is a table indicating shifting actions of the hybrid vehicle drive system of FIG. 1, which is operable in a selected one of a continuously-variable shifting state and a step-variable shifting state, in relation to different combinations of operating states of hydraulically operated frictional coupling devices to effect the respective shifting actions.
Figure 5:
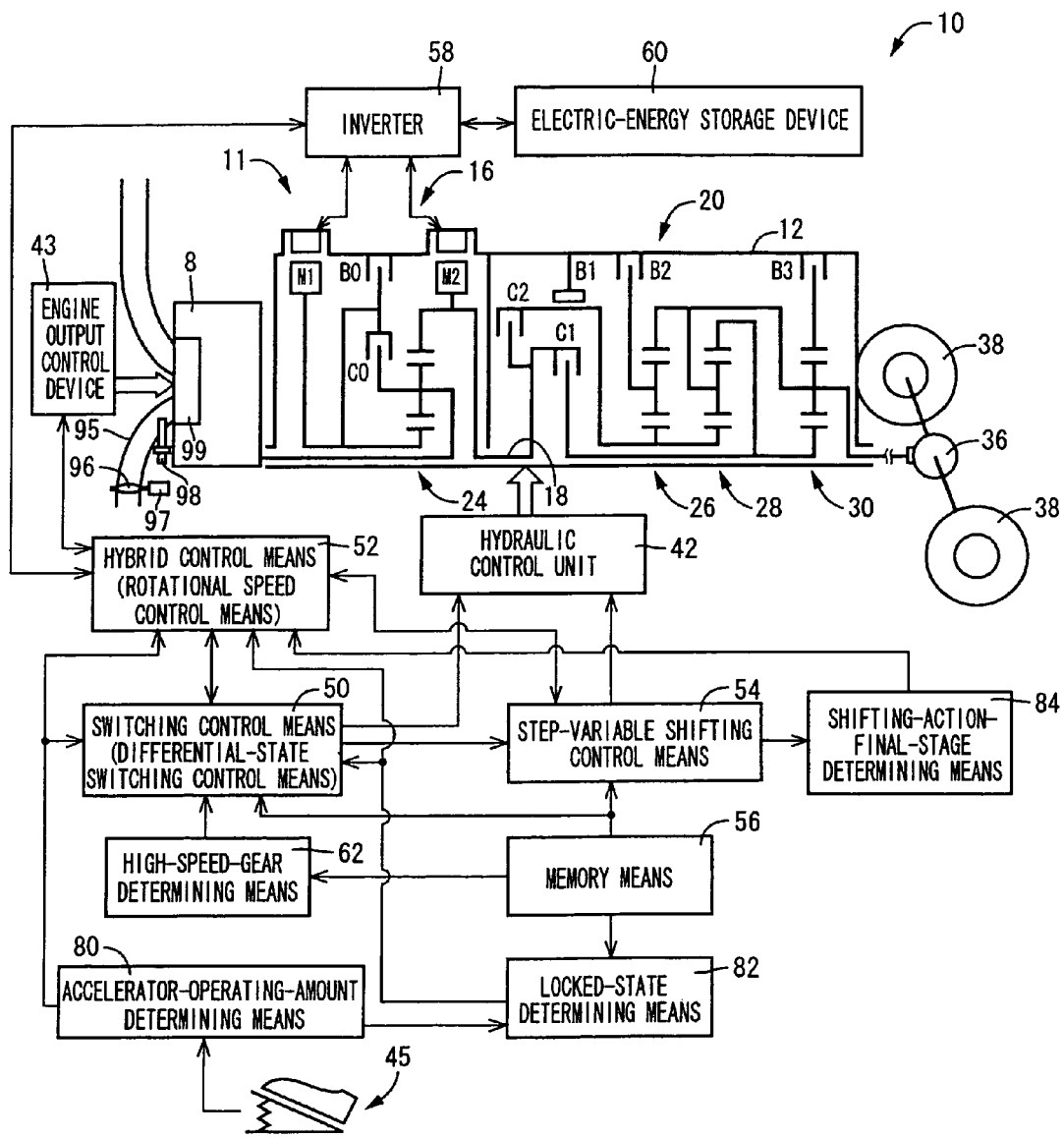
FIG. 5 is a functional block diagram illustrating major control functions of the electronic control device of FIG. 4.

Referring to the schematic view of FIG. 1, there is shown a transmission mechanism 10 constituting a part of a drive system for a hybrid vehicle, which drive system is controlled by a control apparatus according to one embodiment of this invention. In FIG. 1, the transmission mechanism 10 includes: an input rotary member in the form of an input shaft 14; a continuously-variable transmission portion in the form of a differential portion 11 connected to the input shaft 14 either directly, or indirectly via a pulsation absorbing damper (vibration damping device) not shown; a step-variable or multiple-step transmission portion in the form of an automatic transmission portion 20 disposed between the differential portion 11 and drive wheels 38 of the vehicle, and connected in series via a power transmitting member 18 (power transmitting shaft) to the transmission portion 11 and the drive wheels 38; and an output rotary member in the form of an output shaft 22 connected to the automatic transmission portion 20. The input shaft 14, differential portion 11, automatic transmission portion 20 and output shaft 22 are coaxially disposed on a common axis in a transmission casing 12 (hereinafter referred to as "casing 12") functioning as a stationary member attached to a body of the vehicle, and are connected in series with each other. This transmission mechanism 10 is suitably used for a transverse FR vehicle (front-engine, rear-drive vehicle), and is disposed between a drive power source in the form of an internal combustion engine 8 and the pair of drive wheels 38, to transmit a vehicle drive force from the engine 8 to the pair of drive wheels 38 through a differential gear device 36 (final speed reduction gear) and a pair of drive axles, as shown in FIG. 5. The engine 8 may be a gasoline engine or diesel engine and functions as a vehicle drive power source directly connected to the input shaft 14 or indirectly via a pulsation absorbing damper.

In the present transmission mechanism 10, the engine 8 and the differential portion 11 are directly connected to each other. This direct connection means that the engine 8 and the transmission portion 11 are connected to each other, without a fluid-operated power transmitting device such as a torque converter or a fluid coupling being disposed therebetween, but may be connected to each other through the pulsation absorbing damper as described above. It is noted that a lower half of the transmission mechanism 10, which is constructed symmetrically with respect to its axis, is omitted in FIG. 1. This is also true to the other embodiments of the invention described below.

The differential portion 11 is provided with: a first electric motor M1; a power distributing mechanism 16 functioning as a differential mechanism operable to mechanically distribute an output of the engine 8 received by the input shaft 14, to the first electric motor M1 and the power transmitting member 18; and a second electric motor M2 which is disposed to be rotatable integrally with the output shaft 22. The second electric motor M2 may be disposed at any portion of the power transmitting path between the power transmitting member 18 and the drive wheels 38. Each of the first and second electric motors M1 and M2 used in the present embodiment is a so-called motor/generator having a function of an electric motor and a function of an electric generator. However, the first electric motor M1 should function at least as an electric generator operable to generate an electric energy and a reaction force, while the second electric motor M2 should function at least as a drive power source operable to produce a vehicle drive force.

The power distributing mechanism 16 includes, as major components, a first planetary gear set 24 of a single pinion type having a gear ratio ρ1 of about 0.418, for example, a switching clutch C0 and a switching brake B1. The first planetary gear set 24 has rotary elements consisting of a first sun gear S1; first planetary gears P1; a first carrier CA1 supporting the first planetary gears P1 such that each of the first planetary gears P1 is rotatable about its axis and about the axis of the first sun gear S1; and a first ring gear R1 meshing with the first sun gear S1 through the first planetary gears P1. Where the numbers of teeth of the first sun gear S1 and the first ring gear R1 are represented by ZS1 and ZR1, respectively, the above-indicated gear ratio ρ1 is represented by ZS1/ZR1.

In the power distributing mechanism 16, the first carrier CA1 is connected to the input shaft 14, that is, to the engine 8, and the first sun gear S1 is connected to the first electric motor M1, while the first ring gear R1 is connected to the power transmitting member 18. The switching brake B0 is disposed between the first sun gear S1 and the casing 12, and the switching clutch C0 is disposed between the first sun gear S1 and the first carrier CA1. When the switching clutch C0 and brake B0 are both released, the power distributing mechanism 16 is placed in a differential state in which three elements of the first planetary gear set 24 consisting of the first sun gear S1, first carrier CA1 and first ring gear R1 are rotatable relative to each other, so as to perform a differential function, so that the output of the engine 8 is distributed to the first electric motor M1 and the power transmitting member 18, whereby a portion of the output of the engine 8 is used to drive the first electric motor M1 to generate an electric energy which is stored or used to drive the second electric motor M2. Accordingly, the differential portion 11 (power distributing mechanism 16) is placed in the continuously-variable shifting state (electrically established CVT state), in which the rotational speed of the power transmitting member 18 is continuously variable, irrespective of the rotational speed of the engine 8, namely, placed in the differential state in which a speed ratio γ0 (rotational speed of the input shaft 14/rotational speed of the power transmitting member 18) of the power distributing mechanism 16 is continuously changed from a minimum value γ0min to a maximum value γ0max, that is, in the continuously-variable shifting state in which the power distributing mechanism 16 functions as an electrically controlled continuously variable transmission the speed ratio γ0 of which is continuously variable from the minimum value γ0min to the maximum value γ0max.

When the switching clutch C0 or brake B0 is engaged while the power distributing mechanism 16 is placed in the continuously-variable shifting state, the power distributing mechanism 16 is brought into a locked state or non-differential state in which the differential function is not available. Described in detail, when the switching clutch C0 is engaged, the first sun gear S1 and the first carrier CA1 are connected together, so that the power distributing mechanism 16 is placed in the locked state in which the three rotary elements of the first planetary gear set 24 consisting of the first sun gear S1, first carrier CA1 and first ring gear R1 are rotatable as a unit, namely, placed in a non-differential state in which the differential function is not available, so that the differential portion 11 is also placed in a non-differential state. In this non-differential state, the rotational speed of the engine 8 and the rotational speed of the power transmitting member 18 are made equal to each other, so that the differential portion 11 (power distributing mechanism 16) is placed in a fixed-speed-ratio shifting state or step-variable shifting state in which the mechanism 16 functions as a transmission having a fixed speed ratio γ0 equal to 1.

When the switching brake B0 is engaged in place of the switching clutch C0, the first sun gear S1 is fixed to the casing 12, so that the power distributing mechanism 16 is placed in the locked state in which the first sun gear S1 is not rotatable, namely, placed in a non-differential state in which the differential function is not available, so that the differential portion 11 is also placed in the non-differential state. Since the rotational speed of the first ring gear R1 is made higher than that of the first carrier CA1, the differential portion 11 is placed in the fixed-speed-ratio shifting state or step-variable shifting state in which differential portion 11 (the power distributing mechanism 16) functions as a speed-increasing transmission having a fixed speed ratio γ0 smaller than 1, for example, about 0.7.

Thus, the frictional coupling devices in the form of the switching clutch C0 and brake B0 function as a differential-state switching device operable to selectively switch the differential portion 11 (power distributing mechanism 16) between the differential state (namely, non-locked state) and the non-differential state (namely, locked state), that is, between the continuously-variable shifting state in which the differential portion 11 (power distributing mechanism 16) is operable as an electrically controlled continuously variable transmission the speed ratio of which is continuously variable, and the locked state in which the differential portion 11 is not operable as the electrically controlled continuously variable transmission capable of performing a continuously-variable shifting operation, and in which the speed ratio of the transmission portion 11 is held fixed, namely, the fixed-speed-ratio shifting state (non-differential state) in which the transmission portion 11 is operable as a transmission having a single gear position with one speed ratio or a plurality of gear positions with respective speed ratios, namely, the fixed-speed-ratio shifting state in which the transmission portion 11 is operated as a transmission having a single gear position with one speed ratio or a plurality of gear positions with respective speed ratios.

In other words, the switching clutch C0 and switching brake B0 function as a differential-state limiting device operable of limiting the differential function of the power distributing mechanism 16 for limiting the electric differential function of the differential portion 11, namely, the function of the differential portion 11 as the electrically controlled continuously variable transmission, by placing the power distributing mechanism 16 in its non-differential state to place the differential portion 11 in its step-variable shifting state. The switching clutch C0 and switching brake B0 are also operable to place the power distributing mechanism 16 in its differential state, for placing the differential portion 11 in its continuously-variable shifting state, in which the differential function of the power distributing mechanism 16 and the electric differential function of the differential portion 11 are not limited, namely, the function of the differential portion as the electrically controlled continuously variable transmission is not limited.

The automatic transmission portion 20 includes a single-pinion type second planetary gear set 26, a single-pinion type third planetary gear set 28 and a single-pinion type fourth planetary gear set 30, and functions as a step-variable automatic transmission. The second planetary gear set 26 has: a second sun gear S2; second planetary gears P2; a second carrier CA2 supporting the second planetary gears P2 such that each of the second planetary gears P2 is rotatable about its axis and about the axis of the second sun gear S2; and a second ring gear R2 meshing with the second sun gear S2 through the second planetary gears P2. For example, the second planetary gear set 26 has a gear ratio ρ2 of about 0.562. The third planetary gear set 28 has: a third sun gear S3; third planetary gears P3; a third carrier CA3 supporting the third planetary gears P3 such that each of the third planetary gears P3 is rotatable about its axis and about the axis of the third sun gear S3; and a third ring gear R3 meshing with the third sun gear S3 through the third planetary gears P3. For example, the third planetary gear set 28 has a gear ratio ρ3 of about 0.425. The fourth planetary gear set 30 has: a fourth sun gear S4; fourth planetary gears P4; a fourth carrier CA4 supporting the fourth planetary gears P4 such that each of the fourth planetary gears P4 is rotatable about its axis and about the axis of the fourth sun gear S4; and a fourth ring gear R4 meshing with the fourth sun gear S4 through the fourth planetary gears P4. For example, the fourth planetary gear set 30 has a gear ratio ρ4 of about 0.421. Where the numbers of teeth of the second sun gear S2, second ring gear R2, third sun gear S3, third ring gear R3, fourth sun gear S4 and fourth ring gear R4 are represented by ZS2, ZR2, ZS3, ZR3, ZS4 and ZR4, respectively, the above-indicated gear ratios ρ2, ρ3 and ρ4 are represented by ZS2/ZR2. ZS3/ZR3, and ZS4/ZR4, respectively.

In the automatic transmission portion 20, the second sun gear S2 and the third sun gear S3 are integrally fixed to each other as a unit, selectively connected to the power transmitting member 18 through a second clutch C2, and selectively fixed to the casing 12 through a first brake B1. The second carrier CA2 is selectively fixed to the casing 12 through a second brake B2, and the fourth ring gear R4 is selectively fixed to the casing 12 through a third brake B3. The second ring gear R2, third carrier CA3 and fourth carrier CA4 are integrally fixed to each other and fixed to the output shaft 22. The third ring gear R3 and the fourth sun gear S4 are integrally fixed to each other and selectively connected to the power transmitting member 18 through a first clutch C1. Thus, the automatic transmission portion 20 and the power transmitting member 18 are selectively connected to each other through the first clutch C1 or the second clutch C2, which is provided to shift the automatic transmission portion 20. In other words, the first clutch C1 and the second clutch C2 function as a coupling device operable to place a power transmitting path between the power transmitting member 18 and the automatic transmission portion 20, that is, between the differential portion 11 (power transmitting member 18) and the drive wheels 38, selectively in one of a power transmitting state in which a vehicle drive force can be transmitted through the power transmitting path, and a power cut-off state in which the vehicle drive force cannot be transmitted through the power transmitting path. Described more specifically, the above-indicated power transmitting path is placed in the power transmitting state when at least one of the first clutch C1 and the second clutch C2 is placed in the engaged state, and is placed in the power cut-off state when the first clutch C1 and the second clutch C2 are placed in the released state. The automatic transmission portion 20 is a step-variable transmission which is operable to perform so-called "clutchto-clutch shifting actions" each of which is effected by concurrent engaging and releasing actions of the appropriate two frictional coupling devices.

The above-described switching clutch C0, first clutch C1, second clutch C2, switching brake B0, first brake B1, second brake B2 and third brake B3 (hereinafter collectively referred to as "clutches C" and "brakes B", unless otherwise specified) are hydraulically operated frictional coupling devices used in a conventional vehicular automatic transmission. Each of these hydraulically-operated frictional coupling devices as engaging elements is constituted by a wet-type multiple-disc clutch including a plurality of friction plates which are forced against each other by a hydraulic actuator, or a band brake including a rotary drum and one band or two bands which is/are wound on the outer circumferential surface of the rotary drum and tightened at one end by a hydraulic actuator. Each of the clutches C0-C2 and brakes B0-B3 is selectively engaged for connecting two members between which each clutch or brake is interposed.

In the transmission mechanism 10 constructed as described above, the power distributing mechanism 16 is provided with the switching clutch C0 and the switching brake B0 one of which is engaged to place the differential portion 11 in the continuously-variable shifting state in which the differential portion 11 is operable as a continuously variable transmission, or in the step-variable shifting state (fixed-speed-ratio shifting state) in which the differential portion 11 is operable as a step-variable transmission having a fixed speed ratio or ratios. In the present transmission mechanism 10, therefore, the differential portion 11 placed in the fixed-speed-ratio shifting state by the engaging action of one of the switching clutch C0 and switching brake B0 cooperates with the automatic transmission portion 20 to constitute a step-variable transmission device, while the differential portion 11 placed in the continuously-variable shifting state with the switching clutch C0 and switching brake B0 being both held in the released state cooperates with the automatic transmission portion 20 to constitute an electrically controlled continuously variable transmission device. In other words, the transmission mechanism 10 is placed in its step-variable shifting state by engaging one of the switching clutch C0 and switching brake B0, and in its continuously-variable shifting state by releasing both of the switching clutch C0 and switching brake B0. Similarly, the differential portion 11 is selectively placed in one of its step-variable and continuously-variable shifting states.

Described in detail, when the transmission mechanism 10 is placed in its step-variable shifting state with the differential portion 11 placed in its step-variable shifting state with one of the switching clutch C0 and switching brake B0 held in the engaged state, one of a first gear position (first speed position) through a fifth gear position (fifth speed position), a reverse gear position (rear drive position) and a neural position is selectively established by engaging actions of a corresponding combination of the two frictional coupling devices selected from the above-described first clutch C1, second clutch C2, first brake B1, second brake B2 and third brake B3, as indicated in the table of FIG. 2. The two frictional coupling devices may consist of a frictional coupling device to be released, and a frictional coupling device to be engaged. The above-indicated positions have respective speed ratios $\gamma T$ (=input shaft rotational speed $N_{IN}$/output shaft rotational speed $N_{OUT}$) which change as geometric series. The speed ratios $\gamma T$ are overall speed ratios of the transmission mechanism 10 determined by a speed ratio $\gamma 0$ of the differential portion 11 and a speed ratio $\gamma$ of the automatic transmission portion 20.

Where the transmission mechanism 10 functions as the step-variable transmission, for example, the first gear position having the highest speed ratio $\gamma 1$ of about 3.357, for example, is established by engaging actions of the switching clutch C0, first clutch C1 and third brake B3, and the second gear position having the speed ratio $\gamma 2$ of about 2.180, for example, which is lower than the speed ratio $\gamma 1$, is established by engaging actions of the switching clutch C0, first clutch C1 and second brake B2, as indicated in FIG. 2. Further, the third gear position having the speed ratio $\gamma 3$ of about 1.424, for example, which is lower than the speed ratio $\gamma 2$, is established by engaging actions of the switching clutch C0, first clutch C1 and first brake B1, and the fourth gear position having the speed ratio $\gamma 4$ of about 1.000, for example, which is lower than the speed ratio $\gamma 3$, is established by engaging actions of the switching clutch C0, first clutch C1 and second clutch C2. The fifth gear position having the speed ratio $\gamma 5$ of about 0.705, for example, which is smaller than the speed ratio $\gamma 4$, is established by engaging actions of the first clutch C1, second clutch C2 and switching brake B0. Further, the reverse gear position having the speed ratio $\gamma R$ of about 3.209, for example, which is intermediate between the speed ratios $\gamma 1$ and $\gamma 2$, is established by engaging actions of the second clutch C2 and the third brake B3. The neutral position N is established by engaging only the switching clutch C0.

Where the transmission mechanism 10 functions as the continuously-variable transmission with the differential portion 11 placed in its continuously-variable shifting state, on the other hand, the switching clutch C0 and the switching brake B0 indicated in FIG. 2 are both released, so that the differential portion 11 functions as the continuously variable transmission, while the automatic transmission portion 20 connected in series to the differential portion 11 functions as the step-variable transmission, whereby the speed of the rotary motion transmitted to the automatic transmission portion 20 placed in a selected gear position M (hereinafter referred to as "input rotational speed $N_{IN}$ of the automatic transmission portion 20"), namely, the rotational speed of the power transmitting member 18 is continuously changed, so that the speed ratio of the drive system when the automatic transmission portion 20 is placed in the selected gear position M is continuously variable over a predetermined range. Accordingly, the overall speed ratio $\gamma T$ of the transmission mechanism 10 determined by the speed ratio $\gamma 0$ of the differential portion 11 and the speed ratio $\gamma$ of the automatic transmission portion 20 is continuously variable.

For example, the input rotational speed $N_{IN}$ of the automatic transmission portion 20 placed in one of the first through fourth gear positions (or the fifth gear position established by the engaging actions of the same frictional coupling devices C1, C2 as used to establish the fourth gear position) is continuously variable in the released state of both of the switching clutch C0 and switching brake B0, as indicated in the table of FIG. 2, while the transmission mechanism 10 functions as the continuously variable transmission, so that the overall speed ratio $\gamma T$ of the transmission mechanism 10 is continuously variable across the adjacent gear positions.

Figure 3:
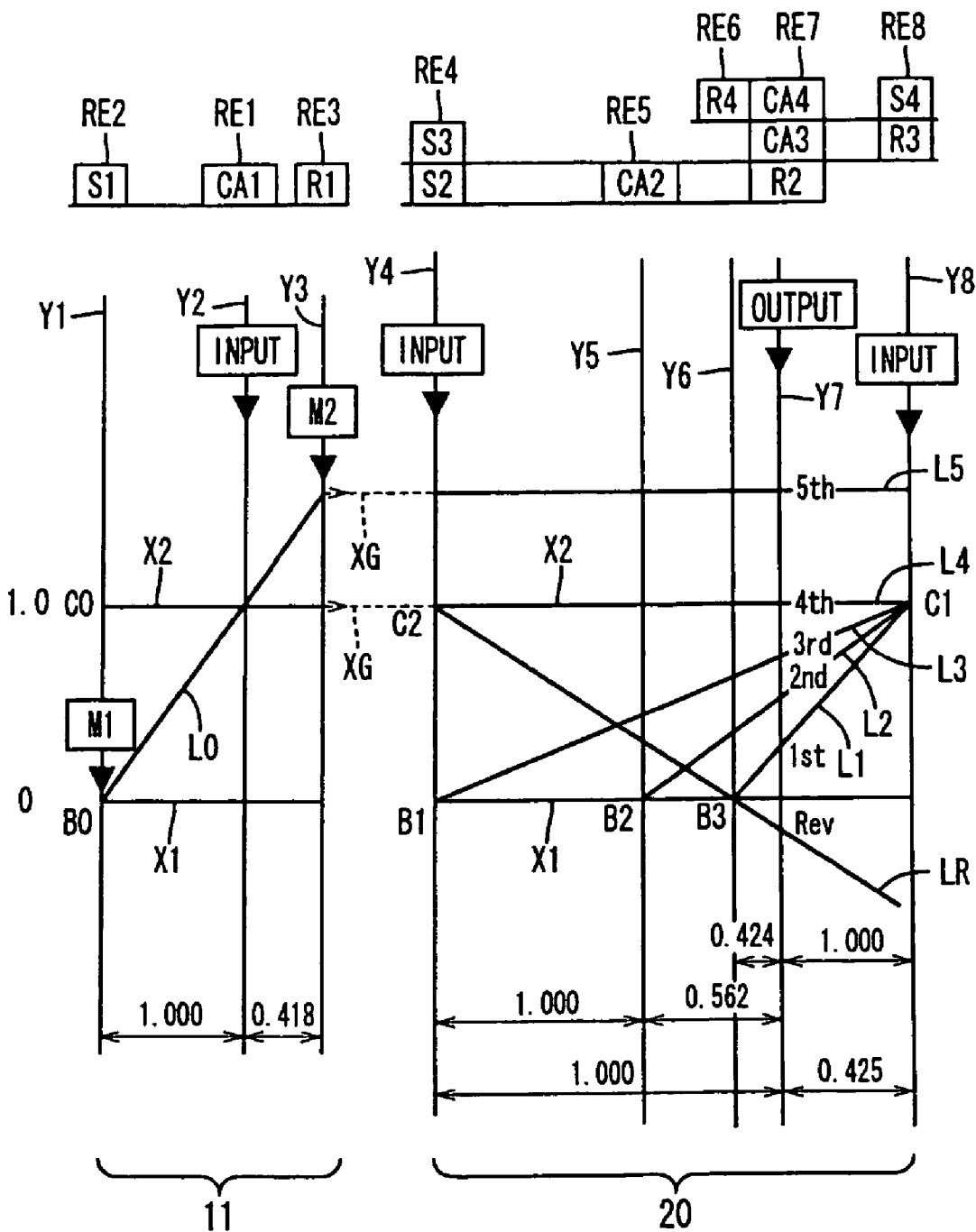
FIG. 3 is a collinear chart indicating relative rotational speeds of the hybrid vehicle drive system of FIG. 1 operated in the step-variable shifting state, in different gear positions of the drive system.

The collinear chart of FIG. 3 indicates, by straight lines, a relationship among the rotational speeds of the rotary elements in each of the gear positions of the transmission mechanism 10, which is constituted by the differential portion 11 functioning as the continuously-variable shifting portion or first shifting portion, and the automatic transmission portion 20 functioning as the step-variable shifting portion or second shifting portion. The collinear chart of FIG. 3 is a rectangular two-dimensional coordinate system in which the gear ratios $\rho$ of the planetary gear sets 24, 26, 28, 30 are taken along the horizontal axis, while the relative rotational speeds of the rotary elements are taken along the vertical axis. A lower one of three horizontal lines, that is, the horizontal line X1 indicates the rotational speed of 0, while an upper one of the three horizontal lines, that is, the horizontal line X2 indicates the rotational speed of 1.0, that is, an operating speed $N_E$ of the engine 8 connected to the input shaft 14. The horizontal line XG indicates the rotational speed of the power transmitting member 18.

Three vertical lines Y1, Y2 and Y3 corresponding to the power distributing mechanism 16 of the differential portion 11 respectively represent the relative rotational speeds of a second rotary element (second element) RE2 in the form of the first sun gear S1, a first rotary element (first element) RE1 in the form of the first carrier CA1, and a third rotary element (third element) RE3 in the form of the first ring gear R1. The distances between the adjacent ones of the vertical lines Y1, Y2 and Y3 are determined by the gear ratio ρ1 of the first planetary gear set 24. That is, the distance between the vertical lines Y1 and Y2 corresponds to "1", while the distance between the vertical lines Y2 and Y3 corresponds to the gear ratio ρ1. Further, five vertical lines Y4, Y5, Y6, Y7 and Y8 corresponding to the transmission portion 20 respectively represent the relative rotational speeds of a fourth rotary element (fourth element) RE4 in the form of the second and third sun gears S2, S3 integrally fixed to each other, a fifth rotary element (fifth element) RE5 in the form of the second carrier CA2, a sixth rotary element (sixth element) RE6 in the form of the fourth ring gear R4, a seventh rotary element (seventh element) RE7 in the form of the second ring gear R2 and third and fourth carriers CA3, CA4 that are integrally fixed to each other, and an eighth rotary element (eighth element) RE8 in the form of the third ring gear R3 and fourth sun gear S4 integrally fixed to each other. The distances between the adjacent ones of the vertical lines are determined by the gear ratios ρ2, ρ3 and ρ4 of the second, third and fourth planetary gear sets 26, 28, 30. In the relationship among the vertical lines of the collinear chart, the distances between the sun gear and carrier of each planetary gear set corresponds to "1", while the distances between the carrier and ring gear of each planetary gear set corresponds to the gear ratio ρ. In the differential portion 11, the distance between the vertical lines Y1 and Y2 corresponds to "1", while the distance between the vertical lines Y2 and Y3 corresponds to the gear ratio ρ. In the automatic transmission portion 20, the distance between the sun gear and carrier of each of the second, third and fourth planetary gear sets 26, 28, 30 corresponds to "1", while the distance between the carrier and ring gear of each planetary gear set 26, 28, 30 corresponds to the gear ratio ρ.

Referring to the collinear chart of FIG. 3, the power distributing mechanism 16 (differential portion 11) of the transmission mechanism 10 is arranged such that the first rotary element RE1 (first carrier CA1) of the first planetary gear set 24 is integrally fixed to the input shaft 14 (engine 8) and selectively connected to the second rotary element RE2 (first sun gear S1) through the switching clutch C0, and this second rotary element RE2 is fixed to the first electric motor M1 and selectively fixed to the casing 12 through the switching brake B0, while the third rotary element RE3 (first ring gear R1) is fixed to the power transmitting member 18 and the second electric motor M2, so that a rotary motion of the input shaft 14 is transmitted (input) to the automatic transmission portion 20 through the power transmitting member 18. A relationship between the rotational speeds of the first sun gear S1 and the first ring gear R1 is represented by an inclined straight line L0 which passes a point of intersection between the lines Y2 and X2.

When the transmission mechanism 10 is brought into the continuously-variable shifting state (differential state) by releasing actions of the switching clutch C0 and brake B0, for instance, the first through third rotary elements RE1-RE3 are rotatable at respective different speeds, for example, at least the second rotary element RE2 and the third rotary element RE3 are rotatable relative to each other. In this case, the rotational speed of the first sun gear S1 represented by a point of intersection between the straight line L0 and the vertical line Y1 is raised or lowered by controlling the operating speed of the first electric motor M1, so that the rotational speed of the first carrier CA1 represented by the straight line L0 and the vertical line Y2, that is, the engine rotational speed $N_E$ is raised or lowered, if the rotational speed of the first ring gear R1 determined by the vehicle speed V and represented by a point of intersection between the straight line L0 and the vertical line Y3 is substantially held constant.

When the switching clutch C0 is engaged, the first sun gear S1 and the first carrier CA1 are connected to each other, and the power distributing mechanism 16 is placed in the non-differential state in which the above-indicated three rotary elements RE1, RE2, RE3 are rotated as a unit and at least the relative rotation of the second and third rotary elements RE2, RE3 is prevented, so that the straight line L0 is aligned with the horizontal line X2, whereby the power transmitting member 18 is rotated at a speed equal to the engine rotational speed $N_E$. When the switching brake B0 is engaged, on the other hand, the first sun gear S1 is fixed to the casing 12, and the power distributing mechanism 16 is placed in the non-differential state in which the second rotary element RE2 is stopped and at least the relative rotation of the second and third rotary elements RE2, RE3 is prevented, so that the straight line L0 is inclined in the state indicated in FIG. 3, whereby the differential portion 11 functions as a speed increasing mechanism. Accordingly, the rotational speed of the first ring gear R1 represented by a point of intersection between the straight lines L0 and Y3, that is, the rotational speed of the power transmitting member 18 is made higher than the engine rotational speed $N_E$ and transmitted to the automatic transmission portion 20.

In the automatic transmission portion 20, the fourth rotary element RE4 is selectively connected to the power transmitting member 18 through the second clutch C2, and selectively fixed to the casing 12 through the first brake B1, and the fifth rotary element RE5 is selectively fixed to the casing 12 through the second brake B2, while the sixth rotary element RE6 is selectively fixed to the casing 12 through the third brake B3. The seventh rotary element RE7 is fixed to the output shaft 22, while the eighth rotary element RE8 is selectively connected to the power transmitting member 18 through the first clutch C1.

When the first clutch C1 and the third brake B3 are engaged, the automatic transmission portion 20 is placed in the first gear position. The rotational speed of the output shaft 22 in the first gear position is represented by a point of intersection between the vertical line Y7 indicative of the rotational speed of the seventh rotary element RE7 fixed to the output shaft 22 and an inclined straight line L1 which passes a point of intersection between the vertical line Y8 indicative of the rotational speed of the eighth rotary element RE8 and the horizontal line X2, and a point of intersection between the vertical line Y6 indicative of the rotational speed of the sixth rotary element RE6 and the horizontal line X1, as indicated in FIG. 3. Similarly, the rotational speed of the output shaft 22 in the second gear position established by the engaging actions of the first clutch C1 and second brake B2 is represented by a point of intersection between an inclined straight line L2 determined by those engaging actions and the vertical line Y7 indicative of the rotational speed of the seventh rotary element RE7 fixed to the output shaft 22. The rotational speed of the output shaft 22 in the third gear position established by the engaging actions of the first clutch C1 and first brake B1 is represented by a point of intersection between an inclined straight line L3 determined by those engaging actions and the vertical line Y7 indicative of the rotational speed of the seventh rotary element RE7 fixed to the output shaft 22. The rotational speed of the output shaft 22 in the fourth gear position established by the engaging actions of the first clutch C1 and second clutch C2 is represented by a point of intersection between a horizontal line L4 determined by those engaging actions and the vertical line Y7 indicative of the rotational speed of the seventh rotary element RE7 fixed to the output shaft 22. In the first through fourth gear positions in which the switching clutch C0 is placed in the engaged state, the eighth rotary element RE8 is rotated at the same speed as the engine rotational speed $N_E$, with the drive force received from the differential portion 11, that is, from the power distributing mechanism 16. When the switching clutch B0 is engaged in place of the switching clutch C0, the eighth rotary element RE8 is rotated at a speed higher than the engine rotational speed $N_E$, with the drive force received from the power distributing mechanism 16. The rotational speed of the output shaft 22 in the fifth gear position established by the engaging actions of the first clutch C1, second clutch C2 and switching brake B0 is represented by a point of intersection between a horizontal line L5 determined by those engaging actions and the vertical line Y7 indicative of the rotational speed of the seventh rotary element RE7 fixed to the output shaft 22.

Figure 4:
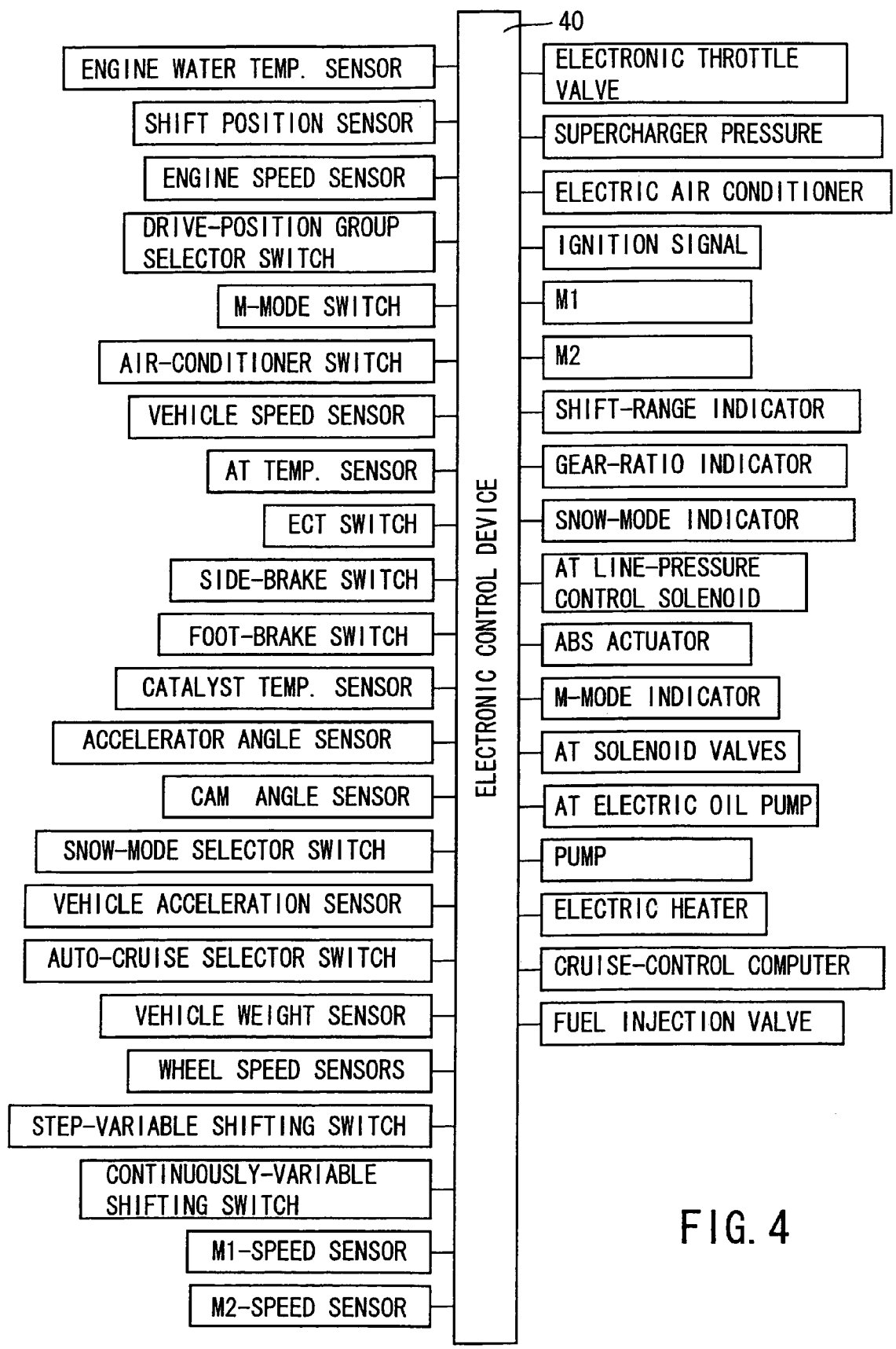
FIG. 4 is a view indicating input and output signals of an electronic control device according to one embodiment of this invention to control the drive system of FIG. 1.

FIG. 4 illustrates signals received by an electronic control device 40 provided to control the transmission mechanism 10, and signals generated by the electronic control device 40. This electronic control device 40 includes a so-called microcomputer incorporating a CPU, a ROM, a RAM and an input/output interface, and is arranged to process the signals according to programs stored in the ROM while utilizing a temporary data storage function of the ROM, to implement hybrid drive controls of the engine 8 and electric motors M1 and M2, and drive controls such as shifting controls of the transmission portion 20.

The electronic control device 40 is arranged to receive various sensors and switches shown in FIG. 4, various signals such as: a signal indicative of a temperature $TEMP_W$ of cooling water of the engine 8; a signal indicative of a selected operating position $P_{SH}$ of a shift lever; a signal indicative of the operating speed $N_E$ of the engine 8; a signal indicative of a value indicating a selected group of forward-drive positions of the transmission mechanism 10; a signal indicative of an M mode (motor drive mode); a signal indicative of an operated state of an air conditioner; a signal indicative of a vehicle speed V corresponding to the rotational speed $N_{OUT}$ of the output shaft 22; a signal indicative of a temperature of a working oil of the automatic transmission portion 20; a signal indicative of an operated state of a side brake; a signal indicative of an operated state of a foot brake; a signal indicative of a temperature of a catalyst; a signal indicative of an amount of operation (an angle of operation) $A_{CC}$ of a manually operable vehicle accelerating member in the form of an accelerator pedal 45 (shown in FIG. 5); a signal indicative of an angle of a cam; a signal indicative of the selection of a snow drive mode; a signal indicative of a longitudinal acceleration value G of the vehicle; a signal indicative of the selection of an auto-cruising drive mode; a signal indicative of a weight of the vehicle; signals indicative of speeds of the drive wheels of the vehicle; a signal indicative of an operating state of a step-variable shifting switch provided to place the differential portion 11 (power distributing mechanism 16) in the step-variable shifting state (locked state) in which the transmission mechanism 10 functions as a step-variable transmission; a signal indicative of a continuously-variable shifting switch provided to place the differential portion 11 in the continuously variable-shifting state (differential state) in which the transmission mechanism 10 functions as the continuously variable transmission; a signal indicative of a rotational speed $N_{M1}$ of the first electric motor M1 (hereinafter referred to as "first electric motor rotational speed $N_{M1}$"); a signal indicative of a rotational speed $N_{M2}$ of the second electric motor M2 (hereinafter referred to as "second electric motor rotational speed $N_{M2}$"); and a signal indicative of an amount of electric energy SOC stored in (a charging state of) an electric-energy storage device 60 (shown in FIG. 5).

The electronic control device 40 is further arranged to generate various signals such as: control signals to be applied to an engine output control device 43 (shown in FIG. 5) to control the output of the engine 8, such as a drive signal to drive a throttle actuator 97 for controlling an angle of opening $\theta_{TH}$ of an electronic throttle valve 96 disposed in a suction pipe 95 of the engine 8, a signal to control an amount of injection of a fuel by a fuel injecting device 98 into the suction pipe 95 or cylinders of the engine 8, a signal to be applied to an ignition device 99 to control the ignition timing of the engine 8, and a signal to adjust a supercharger pressure of the engine 8; a signal to operate the electric air conditioner; signals to operate the electric motors M1 and M2; a signal to operate a shift-range indicator for indicating the selected operating or shift position of the shift lever 48; a signal to operate a gear-ratio indicator for indicating the gear ratio; a signal to operate a snow-mode indicator for indicating the selection of the snow drive mode; a signal to operate an ABS actuator for anti-lock braking of the wheels; a signal to operate an M-mode indicator for indicating the selection of the M-mode; signals to operate solenoid-operated valves incorporated in a hydraulic control unit 42 (shown in FIG. 5) provided to control the hydraulic actuators of the hydraulically operated frictional coupling devices of the differential portion 11 and automatic transmission portion 20; a signal to operate an electric oil pump used as a hydraulic pressure source for the hydraulic control unit 42; a signal to drive an electric heater; and a signal to be applied to a cruise-control computer.

FIG. 5 is a functional block diagram for explaining major control functions of the electronic control device 40. A step-variable shifting control means 54 shown in FIG. 5 is arranged to determine whether a shifting action of the automatic transmission portion 20 should take place, that is, to determine the gear position to which the automatic transmission portion 20 should be shifted. This determination is made on the basis of a condition of the vehicle in the form of the vehicle speed V and an output torque $T_{OUT}$ of the automatic transmission portion 20, and according to a shifting boundary line map (shifting control map or relation) which is stored in memory means 56 and which represents shift-up boundary lines indicated by solid lines in FIG. 6 and shift-down boundary lines indicated by one-dot chain lines in FIG. 5. The step-variable shifting control means 54 generates commands (shifting commands or hydraulic control command) to be applied to the hydraulic control unit 42, to selectively engage and release the two hydraulically operated frictional coupling devices (except the switching clutch C0 and brake B0), for establishing the determined gear position of the automatic transmission portion 20 according to the table of FIG. 2.

Described in detail, the step-variable shifting control means 54 commands the hydraulic control unit 42 to control the solenoid-operated valves incorporated in the hydraulic control unit 42, for activating the appropriate hydraulic actuators to concurrently engage one of the two frictional coupling device and release the other frictional coupling device, to effect the clutch-to-clutch shifting actions of the automatic transmission portion 20.

A hybrid control means 52 functions as continuously-variable shifting control means and is arranged to control the engine 8 to be operated in an operating range of high efficiency, and control the first and second electric motors M1, M2 so as to optimize a proportion of drive forces generated by the engine 8 and the second electric motor M2, and a reaction force generated by the first electric motor M1 during its operation as the electric generator, for thereby controlling the speed ratio $\gamma 0$ of the differential portion 11 operating as the electrically controlled continuously variable transmission, while the transmission mechanism 10 is placed in the continuously-variable shifting state, that is, while the differential portion 11 is placed in the differential state. For instance, the hybrid control means 52 calculates a target (required) vehicle output at the present running speed V of the vehicle, on the basis of the operating amount $A_{CC}$ of the accelerator pedal 45 used as an operator's required vehicle output and the vehicle running speed V, and calculate a target total vehicle output on the basis of the calculated target vehicle output and a required amount of generation of an electric energy by the first electric motor M1. The hybrid control means 52 calculates a target output of the engine 8 to obtain the calculated target total vehicle output, while taking account of a power transmission loss, a load acting on various devices of the vehicle, an assisting torque generated by the second electric motor M2, etc. The hybrid control means 52 controls the speed $N_E$ and torque $T_E$ of the engine 8, so as to obtain the calculated target engine output, and the amount of generation of the electric energy by the first electric motor M1.

Figure 7:
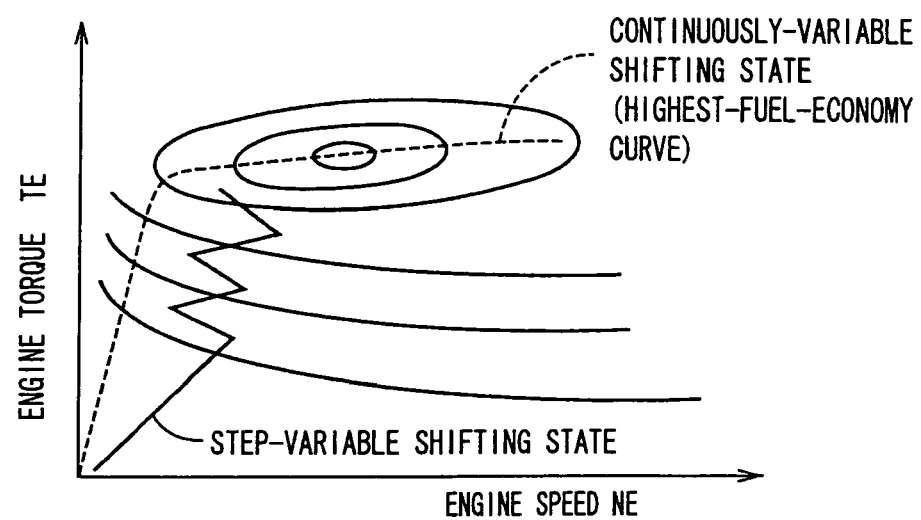
FIG. 7 is a view illustrating an example of a fuel consumption map 8 defining a highest-fuel-economy curve of an engine, and explaining a difference between an operation of the engine in a continuously-variable shifting state (indicated by broken line) of the transmission mechanism and an operation of the engine in a step-variable shifting state (indicated by one-dot chain line) of the transmission mechanism.

The hybrid control means 52 is arranged to implement the hybrid control while taking account of the presently selected gear position of the automatic transmission portion 20, so as to improve the drivability of the vehicle and the fuel economy of the engine 8. In the hybrid control, the differential portion 11 is controlled to function as the electrically controlled continuously-variable transmission, for optimum coordination of the engine rotational speed $N_E$ vehicle speed V for efficient operation of the engine 8, and the rotational speed of the power transmitting member 18 determined by the selected gear position of the transmission portion 20. That is, the hybrid control means 52 determines a target value of the overall speed ratio $\gamma T$ of the transmission mechanism 10, so that the engine 8 is operated according to a stored highest-fuel-economy curve (fuel-economy map or relation) stored in memory means and indicated by broken line in FIG. 7. The target value of the overall speed ratio $\gamma T$ of the transmission mechanism 10 permits the engine torque $T_E$ and speed $N_E$ to be controlled so that the engine 8 provides an output necessary for obtaining the target vehicle output (target total vehicle output or required vehicle drive force). The highest-fuel-economy curve is obtained by experimentation so as to satisfy both of the desired operating efficiency and the highest fuel economy of the engine 8, and is defined in a two-dimensional coordinate system defined by an axis of the engine rotational speed $N_E$ and an axis of the engine torque $T_E$. The hybrid control means 52 controls the speed ratio $\gamma 0$ of the differential portion 11, so as to obtain the target value of the overall speed ratio $\gamma T$, so that the overall speed ratio $\gamma T$ can be controlled within a predetermined range, for example, between 13 and 0.5.

In the hybrid control, the hybrid control means 52 controls an inverter 58 such that the electric energy generated by the first electric motor M1 is supplied to an electric-energy storage device 60 and the second electric motor M2 through the inverter 58. That is, a major portion of the drive force produced by the engine 8 is mechanically transmitted to the power transmitting member 18, while the remaining portion of the drive force is consumed by the first electric motor M1 to convert this portion into the electric energy, which is supplied through the inverter 58 to the second electric motor M2, so that the second electric motor M2 is operated with the supplied electric energy, to produce a mechanical energy to be transmitted to the output shaft 22. Thus, the drive system is provided with an electric path through which an electric energy generated by conversion of a portion of a drive force of the engine 8 is converted into a mechanical energy.

The hybrid control means 52 is further arranged to hold the engine rotational speed $N_E$ substantially constant or at a desired value, by controlling the first electric motor rotational speed $N_{M1}$ and/or the second electric motor rotational speed $N_{M2}$ owing to the electric CVT function of the differential portion 11, irrespective of whether the vehicle is stationary or running. In other words, the hybrid control means 52 is capable of controlling the first electric motor rotational speed $N_{M1}$ and/or the second electric motor rotational speed $N_{M2}$ as desired while holding the engine rotational speed $N_E$ substantially constant or at a desired value.

To raise the engine rotational speed $N_E$ during running of the vehicle, for example, the hybrid control means 52 raises the rotational speed $N_{M1}$ of the first electric motor M1 while holding the rotational speed $N_{M2}$ of the second electric motor M2 substantially constant, since the rotational speed $N_{M2}$ is determined by the vehicle speed V (speed of the drive wheels 38), as is apparent from the collinear chart of FIG. 3. To hold the engine rotational speed $N_E$ substantially constant during a shifting operation of the automatic transmission portion 20, the hybrid control means 52 changes the first electric motor rotational speed $N_{M1}$ in a direction opposite to the direction of change of the second electric motor rotational speed $N_{M2}$ caused by the shifting operation of the automatic transmission portion 20, while holding the engine rotational speed $N_E$ substantially constant.

The hybrid control means 52 includes engine output control means functioning to control the engine 8, so as to provide a required output, by controlling the throttle actuator 97 to open and close the electronic throttle valve 96, and controlling an amount and time of fuel injection by the fuel injecting device 98 into the engine 8, and/or the timing of ignition of the igniter by the ignition device 99, alone or in combination. For instance, the hybrid control means 52 is basically arranged to control the throttle actuator 97 on the basis of the operating amount $A_{CC}$ of the accelerator pedal 45 (manually operable vehicle accelerating member) and according to a predetermined stored relationship (not shown) between the operating amount $A_{CC}$ and the opening angle $\theta_{TH}$ of the electronic throttle valve 96 such that the opening angle $\theta_{TH}$ increases with an increase of the operating amount $A_{CC}$. The engine output control device 43 controls the throttle actuator 97 to open and close the electronic throttle valve 96, controls the fuel injecting device 98 to control the fuel injection, and controls the ignition device 99 to control the ignition timing of the igniter, for thereby controlling the torque of the engine 8, according to the commands received from the hybrid control means 52.

Figure 6:
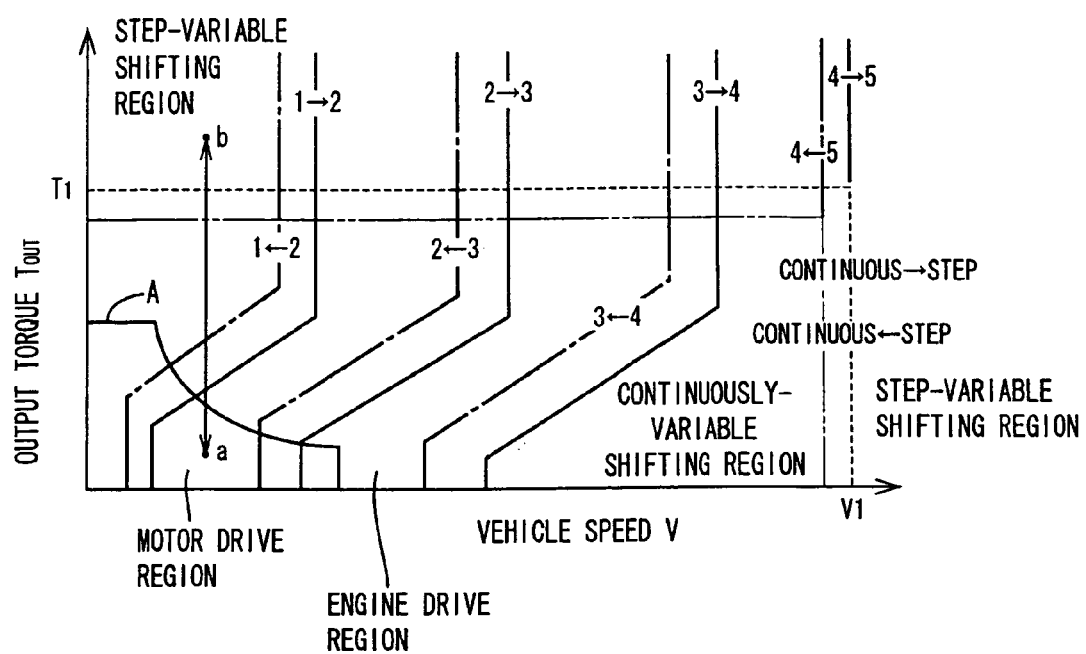
FIG. 6 is a view illustrating an example of a stored shifting boundary line map used for determining a shifting action of an automatic transmission portion, an example of a stored switching boundary line map used for switching the shifting state of a transmission mechanism, and an example of a stored drive-power-source switching boundary line map defining boundary lines between an engine drive region and a motor drive region for switching between an engine drive mode and a motor drive mode, in the same two-dimensional coordinate system defined by control parameters in the form of a running speed and an output torque of the vehicle, such that those maps are related to each other.

The hybrid control means 52 is capable of establishing a motor-drive mode to drive the vehicle by the electric motor, by utilizing the electric CVT function (differential function) of the differential portion 11, irrespective of whether the engine 8 is in the non-operated state or in the idling state. Solid line A in FIG. 6 represents an example of a boundary line defining an engine-drive region and a motor-drive region, for switching the vehicle drive power source for starting and driving the vehicle (hereinafter referred to as "drive power source"), between the engine 8 and the electric motor (e.g., second electric motor M2). In other words, the vehicle drive mode is switchable between a so-called "engine drive mode" corresponding to the engine-drive region in which the vehicle is started and driven with the engine 8 used as the drive power source, and the so-called "motor-drive mode" corresponding to the motor-drive region in which the vehicle is driven with the second electric motor M2 used as the drive power source. A predetermined stored relationship representing the boundary line (solid line A) of FIG. 6 for switching between the engine-drive mode and the motor-drive mode is an example of a drive-power-source switching map (drive-power-source map) in a two-dimensional coordinate system defined by control parameters in the form of the vehicle speed V and a drive-force-related value in the form of the output torque $T_{OUT}$. This drive-power-source switching map is stored in the memory means 56, together with the shifting boundary line map (shifting map) indicated by solid lines and one-dot chain lines in FIG. 6.

The hybrid control means 52 determines whether the vehicle condition is in the motor-drive region or engine-drive region, and establishes the motor-drive mode or engine-drive mode. This determination is made on the basis of the vehicle condition represented by the vehicle speed V and the required output torque $T_{OUT}$, and according to the drive-power-source switching map of FIG. 6. As is understood from FIG. 6, the motor-drive mode is generally established by the hybrid control means 52, when the output torque $T_{OUT}$ is in a comparatively low range in which the engine efficiency is comparatively low, namely, when the engine torque $T_E$ is in a comparatively low range, or when the vehicle speed V is in a comparatively low range, that is, when the vehicle load is comparatively low. Usually, therefore, the vehicle is started in the motor-drive mode, rather than in the engine-drive mode. However, when the vehicle condition upon starting of the vehicle is outside the motor-drive region defined by the drive-power-source switching map of FIG. 6, as a result of an increase of the required output torque $T_{OUT}$ or engine torque $T_E$ due to an operation of the accelerator pedal 45, the vehicle may be started in the engine-drive mode.

For reducing a dragging of the engine 8 in its non-operated state and improving the fuel economy in the motor-drive mode, the hybrid control means 52 is arranged to hold the engine rotational speed $N_E$ at zero or substantially zero as needed, owing to the electric CVT function (differential function) of the differential portion 11, that is, by controlling the differential portion 11 to perform its electric CVT function (differential function), so that the first electric motor rotational speed 1 is controlled so as to be freely rotated to have a negative speed $N_{M1}$.

The hybrid control means 52 is further capable of performing a so-called "drive-force assisting" operation (torque assisting operation) to assist the engine 8, by supplying an electric energy from the first electric motor M1 or the electric-energy storage device 60 to the second electric motor M2, so that the second electric motor M2 is operated to transmit a drive torque to the drive wheels 38. Thus, the second electric motor M2 may be used in addition to the engine 8, in the engine-drive mode. The torque assisting operation may be performed to increase the output torque of the second electric motor M2 in the motor drive mode.

The hybrid control means 52 is arranged to hold the engine 8 in an operated state owing to the electric CVT function of the differential portion 11, irrespective of whether the vehicle is stationary or running at a relatively low speed. When the first electric motor M1 is required to be operated to charge the electric-energy storage device 60 while the vehicle is stationary, in order to charge the electric-energy storage device 60 where the electric energy amount SOC stored in the storage device 60 is reduced, the speed $N_E$ of the engine 8 which is operated to operate the first electric motor M1 at a relatively high speed can be kept high enough to permit the operation of the engine 8 by itself, owing to the differential function of the power distributing mechanism 16, even while the operating speed of the second electric motor M2 determined by the vehicle speed V is zero (substantially zero) when the vehicle is stationary.

The hybrid control means 52 is further arranged to place the first electric motor M1 in a non-load state by cutting off an electric current applied from the electric energy storage device 60 to the first electric motor M1 through the inverter 58. When the first electric motor M1 is placed in the non-load state, the first electric motor M1 is permitted to be freely rotated, and the differential portion 11 is placed in a state similar to the power cut-off state in which power cannot be transmitted through the power transmitting path within the differential portion 11, and no output can be generated from the differential portion 11. Namely, the hybrid control means 52 is arranged to place the first electric motor M1 in the non-load state, for thereby placing the differential portion 11 in a neutral state in which the power transmitting path is electrically cut off.

A high-speed-gear determining means 62 is arranged to determine whether the gear position to which the transmission mechanism 10 should be shifted on the basis of the vehicle condition and according to the shifting boundary line map stored in the memory means 56 and indicated in FIG. 6 by way of example is a high-speed-gear position, for example, the fifth gear position. This determination is made by determining whether the gear position selected by the step-variable shifting control means 54 is the fifth gear position or not, for determining which one of the switching clutch C0 and brake B0 should be engaged to place the transmission mechanism 10 in the step-variable shifting state.

A switching control means 50 is arranged to selectively switch the transmission mechanism 10 between the continuously-variable shifting state and the step-variable shifting state, that is, between the differential state and the locked state, by engaging and releasing the coupling devices (switching clutch C0 and brake B0) on the basis of the vehicle condition. For example, the switching control means 50 is arranged to determine whether the shifting state of the transmission mechanism 10 (differential portion 11) should be changed, on the basis of the vehicle condition represented by the vehicle speed V and the required output torque $T_{OUT}$ and according to the switching boundary line map (switching control map or relation) stored in the memory means 56 and indicated by two-dot chain line in FIG. 6 by way of example, namely, whether the vehicle condition is in the continuously-variable shifting region for placing the transmission mechanism 10 in the continuously-variable shifting state, or in the step-variable shifting region for placing the transmission mechanism 10 in the step-variable shifting state. The switching control means 50 places the transmission mechanism 10 in the continuously-variable shifting state or step-variable shifting state, depending upon whether the vehicle condition is in the continuously-variable shifting region or in the step-variable shifting region. Thus, the switching control means 50 limits the electrically controlled differential function of the differential portion 11 by placing the differential portion 11 in the step-variable shifting state by controlling the switching clutch C0 and/or the switching brake B0. That is, the switching control means 50 functions as differential limiting means for limiting the function of the differential portion 11 as the electrically controlled continuously variable transmission.

Described in detail, when the switching control means 50 determines that the vehicle condition is in the step-variable shifting region, the switching control means 50 disables the hybrid control means 52 to implement a hybrid control or continuously-variable shifting control, and enables the step-variable shifting control means 54 to implement a predetermined step-variable shifting control in which the transmission portion 20 is automatically shifted according to the shifting boundary line map stored in the memory means 56 and indicated in FIG. 6 by way of example. FIG. 2 indicates the combinations of the engaging actions of the hydraulically operated frictional coupling devices C0, C1, C2, B0, B1, B2 and B3, which are stored in the memory means 56 and which are selectively used for automatic shifting of the automatic transmission portion 20. In the step-variable shifting state, the transmission mechanism 10 as a whole constituted by the differential portion 11 and the automatic transmission portion 20 functions as a so-called step-variable automatic transmission which is automatically shifted according to the table of FIG. 2.

When the high-speed-gear determining means 62 has determined that the transmission mechanism 10 should be shifted to the fifth gear position, the switching control means 50 commands the hydraulic control unit 42 to release the switching clutch C0 and engage the switching brake B0, for enabling the differential portion 11 to function as an auxiliary transmission having a fixed speed ratio γ0 of 0.7, for example, so that the transmission mechanism 10 as a whole is placed in a high-speed gear position so-called "an overdrive gear position" having a speed ratio lower than 1.0. When the high-speed-gear determining means 62 has not determined that the transmission mechanism 10 should be shifted to the fifth gear position, the switching control means 50 commands the hydraulic control unit 42 to engage the switching clutch C0 and release the switching brake B0, for enabling the differential portion 11 to function as an auxiliary transmission having a fixed speed ratio γ0 of 1.0, for example, so that the transmission mechanism 10 as a whole is placed in a speed-reducing gear position having a speed ratio not lower than 1.0. Thus, when the transmission mechanism 10 is switched to the step-variable shifting state by the switching control means 50, the differential portion 11 operable as the auxiliary transmission is placed in a selected one of two gear positions under the control of the switching control means 50 while the automatic transmission portion 20 connected in series to the differential portion 11 functions as a step-variable transmission, so that the transmission mechanism 10 as a whole functions as the so-called step-variable automatic transmission.

When the switching control means 50 has determined that the vehicle condition is in the continuously-variable shifting region for placing the transmission mechanism 10 in the continuously-variable shifting state, the switching control means 50 commands the hydraulic control unit 42 to release both of the switching clutch C0 and brake B0, for placing the differential portion 11 in the continuously-variable shifting state. At the same time, the switching control means 50 enables the hybrid control means 52 to implement the hybrid control, and commands the step-variable shifting control means 54 to select and hold a predetermined one of the gear positions, or to permit the automatic transmission portion 20 to be automatically shifted according to the shifting boundary line map stored in the map memory 56 and indicated in FIG. 6 by way of example. In the latter case, the variable-step shifting control means 54 implements the automatic shifting control by suitably selecting the combinations of the operating states of the frictional coupling devices indicated in the table of FIG. 2, except the combinations including the engagement of the switching clutch C0 and brake B0. Thus, the differential portion 11 switched to the continuously-variable shifting state under the control of the switching control means 50 functions as the continuously variable transmission while the automatic transmission portion 20 connected in series to the differential portion 11 functions as the step-variable transmission, so that the transmission mechanism 10 provides a sufficient vehicle drive force, such that the input rotational speed $N_{IN}$ of the automatic transmission portion 20 placed in one of the first through fourth gear positions, namely, the rotational speed $N_{18}$ of the power transmitting member 18 is continuously changed, so that the speed ratio of the transmission mechanism 10 when the transmission portion 20 is placed in one of those gear positions is continuously variable over a predetermined range. Accordingly, the speed ratio of the automatic transmission portion 20 is continuously variable across the adjacent gear positions, whereby the total speed ratio γT of the transmission mechanism 10 is continuously variable.

The maps of FIG. 6 will be described in detail. The shifting boundary line map (shifting control map or relation) shown in FIG. 6 by way of example and stored in the memory means 56 is used for determining whether the automatic transmission portion 20 should be shifted, and is defined in a two-dimensional coordinate system by control parameters consisting of the vehicle speed V and the drive-force-related value in the form of the required output torque $T_{OUT}$. In FIG. 6, the solid lines indicate the shift-up boundary lines, while the one-dot chain lines indicate the shift-down boundary lines.

The broken lines in FIG. 6 represent the upper vehicle-speed limit V1 and the upper output-torque limit T1 which are used for the switching control means 50 to determine whether the vehicle condition is in the step-variable shifting region or the continuously-variable shifting region. In other words, the broken lines represent a high-speed-running boundary line indicative of the upper vehicle-speed limit V1 above which it is determined that the hybrid vehicle is in a high-speed running state, and a high-output-running boundary line indicative of the upper output-torque limit T1 of the output torque $T_{OUT}$ of the automatic transmission portion 20 above which it is determined that the hybrid vehicle is in a high-output running state. The output torque $T_{OUT}$ is an example of the drive-force-related value which relates to the drive force of the hybrid vehicle. FIG. 6 also shows two-dot chain lines which are offset with respect to the broken lines, by a suitable amount of control hysteresis for determination as to whether the step-variable shifting state is changed to the continuously-variable shifting state or vice versa. Thus, the broken lines and two-dot chain lines of FIG. 6 constitute the stored switching boundary line map (switching control map or relation) used by the switching control means 50 to determine whether the vehicle condition is in the step-variable shifting region or the continuously-variable shifting region, depending upon whether the control parameters in the form of the vehicle speed V and the output torque $T_{OUT}$ are higher than the predetermined upper limit values V, T1. This switching boundary line map may be stored in the memory means 56, together with the shifting boundary line map. The switching boundary line map may use at least one of the upper vehicle-speed limit V1 and the upper output-torque limit T1, or at least one of the vehicle speed V and the output torque $T_{OUT}$, as at least one parameter.

The above-described shifting boundary line map, switching boundary line, and drive-power-source switching map may be replaced by stored equations for comparison of the actual vehicle speed V with the limit value V1 and comparison of the actual output torque $T_{OUT}$ with the limit value T1. In this case, the switching control means 50 switches the transmission mechanism 10 in the step-variable shifting state by engaging the switching brake B0, when the actual vehicle speed V has exceeded the upper limit V1, or by engaging the switching clutch C0, when the output torque $T_{OUT}$ of the automatic transmission portion 20 has exceeded the upper limit T1.

The switching control means 50 may be arranged to place the transmission mechanism 10 in the step-variable shifting state even when the vehicle condition is in the continuously-variable shifting region, upon detection of any functional failure or deterioration of the electric components such as the electric motors which are operable to operate the differential portion 11 as the electrically controlled continuously variable transmission. Those electric components include components such as the first electric motor M1, second electric motor M2, inverter 58, electric-energy storage device 50 and electric lines interconnecting those components, which are associated with the electric path through which an electric energy generated by the first electric motor M1 is converted into a mechanical energy. The functional deterioration of the components may be caused by their failure or a drop of their temperatures.

The drive-force-related value indicated above is a parameter corresponding to the drive force of the vehicle, which may be the output torque $T_{OUT}$ of the automatic transmission portion 20, the engine output torque $T_E$ or an acceleration value G of the vehicle, as well as a drive torque or drive force of drive wheels 38. The parameter may be: an actual value calculated on the basis of the operating amount $A_{CC}$ of the accelerator pedal 45 or the opening angle of the throttle valve (or intake air quantity, air/fuel ratio or amount of fuel injection) and the engine rotational speed $N_E$; or any one of estimated values of the required (target) engine torque $T_E$, required (target) output torque $T_{OUT}$ of the transmission potion 20 and required vehicle drive force, which are calculated on the basis of the operating amount $A_{CC}$ of the accelerator pedal 45 or the operating angle of the throttle valve. The above-described vehicle drive torque may be calculated on the basis of not only the output torque $T_{OUT}$, etc., but also the ratio of the differential gear device 36 and the radius of the drive wheels 38, or may be directly detected by a torque sensor or the like.

For instance, the upper vehicle-speed limit V1 is determined such that the transmission mechanism 10 is placed in the step-variable shifting state while the vehicle is in the high-speed running state. This determination is effective to reduce a possibility of deterioration of the fuel economy of the vehicle if the transmission mechanism 10 were placed in the continuously-variable shifting state while the vehicle is in the high-speed running state. That is, where the vehicle is in the high-speed running state, transmission mechanism 10 is effectively used as a planetary gear type step-variable transmission whose transmitting efficiency is high owing to absence of the electric path.

The upper output-torque limit T1 is determined such that the transmission mechanism 10 is placed in the step-variable shifting state in the high-speed running state, that is, functions as a step-variable transmission the speed ratio of which is variable in steps, rather than as a continuously variable transmission. This determination is based on a desire of the vehicle operator to have the engine rotational speed changing as a result of a shifting action of the transmission, which desire is higher than a desire of the vehicle operator to improve the fuel economy, in the high-output running state of the vehicle.

The step-variable shifting region defined by the switching boundary line map of FIG. 6 is defined as a high-torque drive region in which the output torque $T_{OUT}$ is not lower than the predetermined upper limit T1, or a high-speed drive region in which the vehicle speed V is not lower than the predetermined upper limit V1. Accordingly, the step-variable shifting control is implemented when the torque of the engine 8 is comparatively high or when the vehicle speed V is comparatively high, while the continuously-variable shifting control is implemented when the torque of the engine 8 is comparatively low or when the vehicle speed V is comparatively low, that is, when the engine 8 is in a normal output state.

Therefore, the transmission mechanism 10 is placed in the continuously-variable shifting state in a low-speed or medium-speed running state of the vehicle or in a low-output or medium-output running state of the vehicle, assuring a high degree of fuel economy of the vehicle. In a high-speed running of the vehicle at the vehicle speed V higher than the upper limit V1, the transmission mechanism 10 is placed in the step-variable shifting state in which the output of the engine 8 is transmitted to the drive wheels 38 primarily through the mechanical power transmitting path, so that the fuel economy is improved owing to reduction of a loss of conversion of the mechanical energy into the electric energy, which would take place when the differential portion 11 functions as the electrically controlled continuously variable transmission.

Figure 8:
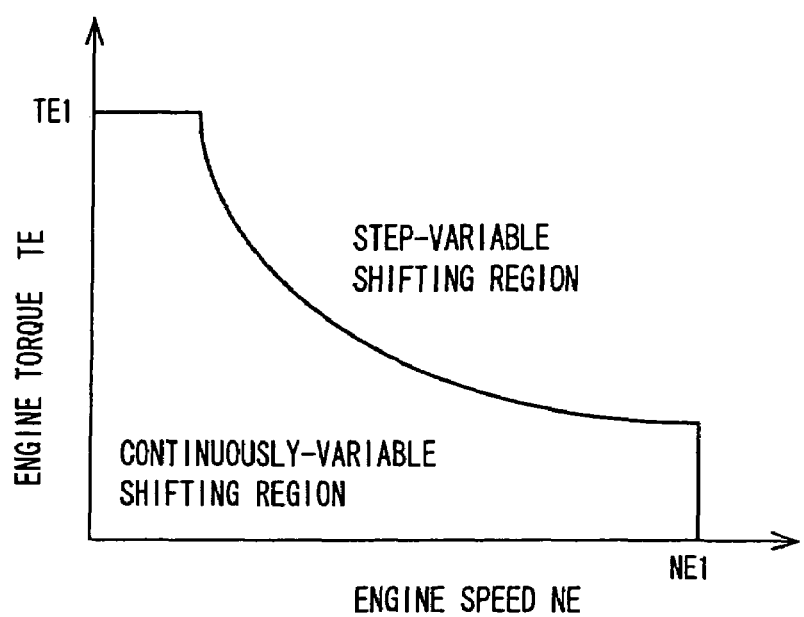
FIG. 8 is a view indicating an example of a change of the engine rotational speed as a result of a shift-up action of the step-variable transmission.

In a high-output running state of the vehicle with the drive-force-related value such as the output torque $T_{OUT}$ being higher than the upper limit T1, the transmission mechanism 10 is placed in the step-variable shifting state so as to be operated as a step-variable transmission, the user can enjoy the engine rotational speed $N_E$ changing with a shift-up action of the automatic transmission portion 20, assuring a comfortable rhythmic change of the engine rotational speed $N_E$ as the transmission portion 20 is shifted up, as indicated in FIG. 8, for example.

Figure 9:
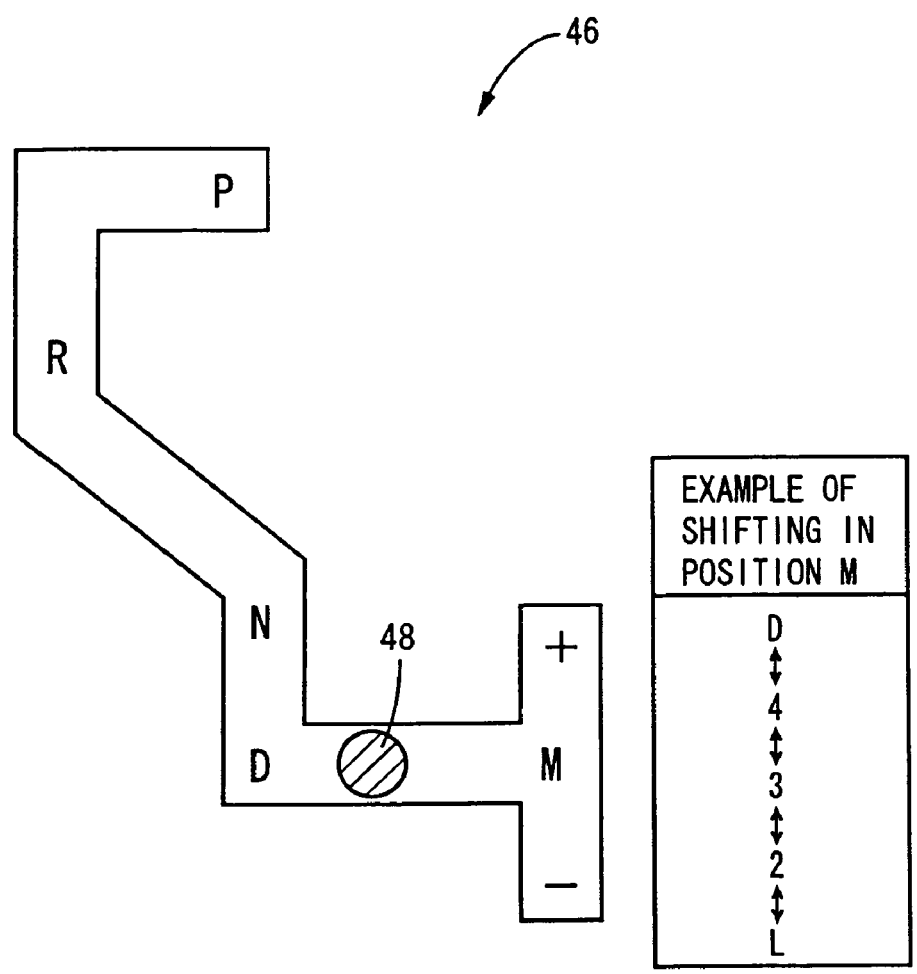
FIG. 9 is a view showing an example of a manually operated shifting device including a shift lever and operable to select one of a plurality of shift positions.

FIG. 9 shows an example of a manually operable shifting device in the form of a shifting device 46. The shifting device 46 includes a shift-lever 48, which is disposed laterally adjacent to an operator's seat, for example, and which is manually operated to select one of a plurality of positions consisting of a parking position P for placing the drive system 10 (namely, automatic transmission portion 20) in a neutral state in which a power transmitting path is disconnected with both of the switching clutch C0 and brake B0 placed in the released state, and at the same time the output shaft 22 of the automatic transmission portion 20 is in the locked state; a reverse-drive position R for driving the vehicle in the rearward direction; a neutral position N for placing the drive system 10 in the neutral state; an automatic forward-drive shifting position D; and a manual forward-drive shifting position M.

When the shift lever 48 is operated to a selected one of the shift positions, a manual valve incorporated in the hydraulic control unit 42 and operatively connected to the shift lever 48 is operated to establish the corresponding state of the hydraulic control unit 42. In the automatic forward-drive position D or the manual forward-drive position M, one of the first through fifth gear positions (1st through 5th) indicated in the table of FIG. 2 is established by electrically controlling the appropriate solenoid-operated valves incorporated in the hydraulic control unit 42.

The above-indicated parking position P and the neutral position N are non-drive positions selected when the vehicle is not driven, while the above-indicated reverse-drive position R, and the automatic and manual forward-drive positions D, M are drive positions selected when the vehicle is driven. In the non-drive positions P, N, the power transmitting path in the automatic transmission portion 20 is in the power-cut-off state established by releasing both of the clutches C1 and C2, as shown in the table of FIG. 2. In the drive positions R, D, M, the power transmitting path in the automatic transmission portion 20 is in the power-transmitting state established by engaging at least one of the clutches C1 and C2, as also shown in the table of FIG. 2.

Described in detail, a manual operation of the shift lever 48 from the parking position P or neutral position N to the reverse-drive position R causes the second clutch C2 to be engaged for switching the power transmitting path in the automatic transmission portion 20 from the power-cut-off state to the power-transmitting state. A manual operation of the shift lever 48 from the neutral position N to the automatic forward-drive position D causes at least the first clutch C1 to be engaged for switching the power transmitting path in the automatic transmission portion 20 from the power-cut-off state to the power-transmitting state. The automatic forward-drive position D provides a highest-speed position, and positions "4" through "L" selectable in the manual forward-drive position M are engine-braking positions in which an engine brake is applied to the vehicle.

The manual forward-drive position M is located at the same position as the automatic forward-drive position D in the longitudinal direction of the vehicle, and is spaced from or adjacent to the automatic forward-drive position D in the lateral direction of the vehicle. The shift lever 48 is operated to the manual forward-drive position M, for manually selecting one of the above-indicated positions "D" through "L". Described in detail, the shift lever 48 is movable from the manual forward-drive position M to a shift-up position "+" and a shift-down position "−", which are spaced from each other in the longitudinal direction of the vehicle. Each time the shift lever 48 is moved to the shift-up position "+" or the shift-down position "−", the presently selected position is changed by one position. The five positions "D" through "L" have respective different lower limits of a range in which the overall speed ratio γT of the transmission mechanism 10 is automatically variable, that is, respective different lowest values of the overall speed ratio γT which corresponds to the highest output speed of the transmission mechanism 10. Namely, the five positions "D" through "L" select respective different numbers of the speed positions (gear positions) of the automatic transmission portion 20 which are automatically selectable, so that the lowest overall speed ratio γT available is determined by the selected number of the gear positions. The shift lever 48 is biased by biasing means such as a spring such that the shift lever 48 is automatically returned from the shift-up position "+" and shift-down position "−" back to the manual forward-drive position M. The shifting device 46 is provided with a shift-position sensor 49 operable to detect the presently selected position of the shift lever 48, so that signals indicative of the presently selected operating position of the shift lever 48 and the number of shifting operations of the shift lever 48 in the manual forward-shifting position M.

When the shift lever 48 is operated to the automatic forward-drive position D, the switching control means 50 effects an automatic switching control of the transmission mechanism 10 according to the stored switching boundary line map indicated in FIG. 6, and the hybrid control means 52 effects the continuously-variable shifting control of the power distributing mechanism 16, while the step-variable shifting control means 54 effects an automatic shifting control of the automatic transmission 20. When the transmission mechanism 10 is placed in the step-variable shifting state, for example, the shifting action of the transmission mechanism 10 is automatically controlled to select an appropriate one of the first through the fifth gear position indicated in FIG. 2. When the drive system is placed in the continuously-variable shifting state, the speed ratio of the power distributing mechanism 16 is continuously changed, while the shifting action of the automatic transmission 20 is automatically controlled to select an appropriate one of the first through fourth gear positions, so that the overall speed ratio γT of the transmission mechanism 10 is controlled so as to be continuously variable within the predetermined range. The automatic forward-drive position D is a position selected to establish an automatic shifting mode (automatic mode) in which the transmission mechanism 10 is automatically shifted.

When the shift lever 48 is operated to the manual forward-drive position M, on the other hand, the shifting action of the transmission mechanism 10 is automatically controlled by the switching control means 50, hybrid control means 52 and step-variable shifting control means 54, such that the overall speed ratio γT is variable within a predetermined range the lower limit of which is determined by the gear position having the lowest speed ratio, which gear position is determined by the manually selected one of the shift positions. When the transmission mechanism 10 is placed in the step-variable shifting state, for example, the shifting action of the transmission mechanism 10 is automatically controlled within the above-indicated predetermined range of the overall speed ratio γT. When the transmission mechanism 10 is placed in the step-variable shifting state, the speed ratio of the power distributing mechanism 16 is continuously changed, while the shifting action of the automatic transmission 20 is automatically controlled to select an appropriate one of the gear positions the number of which is determined by the manually selected one of the shift positions, so that the overall speed ratio γT of the transmission mechanism 10 is controlled so as to be continuously variable within the predetermined range. The manual forward-drive position M is a position selected to establish a manual shifting mode (manual mode) in which the selectable gear positions of the transmission mechanism 10 are manually selected.

In the present embodiment, the transmission mechanism 10 (differential portion 11 or power distributing mechanism 16) is switchable between the continuously-variable shifting state (differential state) and the non-continuously-variable shifting state, for example, the step-variable shifting state (locked state), and the switching control means 50 is arranged to select one of those two shifting states of the differential portion 11 on the basis of the vehicle condition, so that the differential portion 11 is placed in the selected one of the continuously-variable shifting state and the step-variable shifting state.

While the differential portion 11 is placed in the continuously-variable shifting state, for example, the engine rotational speed $N_E$ can be freely changed (set) by the differential function of the differential portion 11. Thus, the hybrid control means 52 commands the engine output control device 43 to selectively increase and reduce the engine rotational speed $N_E$, thereby making it possible to selectively increase and reduce the drive torque.

For example, upon request of acceleration of the vehicle, the hybrid control means 52 is capable of rapidly increasing the engine rotational speed $N_E$ according to a depressing operation of the accelerator pedal, without the engine rotational speed $N_E$ being determined by the vehicle speed V, so that the drive torque of the vehicle can be rapidly increased. Further, upon request of deceleration of the vehicle, the hybrid control means 52 is capable of rapidly reducing the engine rotational speed $N_E$ according to a returning operation of the accelerator pedal, without the engine rotational speed $N_E$ being determined by the vehicle speed V, so that the drive torque of the vehicle can be rapidly reduced.

On the other hand, while the differential portion 11 is placed in the non-continuously-variable shifting state, the speed ratio γ0 of the differential portion 11 is fixed like that of the automatic transmission portion 20, so that the engine rotational speed $N_E$ is determined as well as the input rotational speed $N_{IN}$ of the automatic transmission portion 20 by the vehicle speed V and the speed ratio γ of the automatic transmission portion 20. That is, unlike during the continuously-variable shifting state of the differential portion 11, the engine rotational speed $N_E$ can not be rapidly increased and reduced by the hybrid control means 52.

Therefore, upon request of acceleration of the vehicle, it is not possible to rapidly increase the engine rotational speed $N_E$ according to the depressing operation of the accelerator pedal 45 without the engine rotational speed $N_E$ being bound by the vehicle speed V, thereby possibly reducing the responsiveness of the increase of the drive torque and deteriorating the vehicle acceleration drivability as felt by the vehicle operator. Further, upon request of deceleration of the vehicle, it is not possible to rapidly reduce the engine rotational speed $N_E$ according to the returning operation of the accelerator pedal 45 without the engine rotational speed $N_E$ being bound by the vehicle speed V, thereby possibly reducing the responsiveness of the reduction of the drive torque and deteriorating the vehicle deceleration drivability as felt by the vehicle operator.

In view of this, for improving the vehicle acceleration or deceleration drivability as felt by the vehicle operation upon request of acceleration or deceleration of the vehicle, namely, for permitting the engine rotational speed $N_E$ to be freely changed by the hybrid control means 52 owing to the differential function, the switching control means 50 holds the differential portion 11 in the continuously-variable shifting state (when the differential portion 11 is in the continuously-variable shifting state), or places differential portion 11 in the continuously-variable shifting state (when the differential portion 11 is in the non-continuously-variable shifting state).

The hybrid control means 52 or the switching control means 50 is not always operated upon request of acceleration or deceleration of the vehicle, for improving the vehicle acceleration or deceleration drivability as felt by the vehicle operator. Rather, the hybrid control means 52 or the switching control means 50 is operated, for example, only when a degree of vehicle acceleration or deceleration required by the vehicle operator is not smaller than a predetermined extent. In this arrangement, the operation of the hybrid control means 52 or the switching control means 50 is not frequently carried out, whereby the operation is stabilized.

Specifically, accelerator-operating-amount determining means 80 is provided for determining an amount ΔAcc of change in the operating amount of the accelerator pedal 45 or a rate Acc' (=Acc/dt) of the change in the operating amount Acc of the accelerator pedal 45, so as to determine whether acceleration-on or acceleration-off is selected, namely, so as to determine whether the degree of vehicle acceleration or deceleration required by the vehicle operator is not smaller than the predetermined extent.

For example, the accelerator-operating-amount determining means 80 determines whether the degree of the required acceleration is not smaller than the predetermined extent, by seeing if the amount ΔAcc of positive change in the operating amount of the accelerator pedal 45 made by a depressing operation of the accelerator pedal is not smaller than a predetermined threshold Acc1, or by seeing if a rate Acc' of the positive change in the operating amount of the accelerator pedal 45 is not smaller than a predetermined threshold Acc1'.

Further, for example, the accelerator-operating-amount determining means 80 determines whether the degree of the required deceleration is not smaller than the predetermined extent, by seeing if the amount ΔAcc of negative change in the operating amount of the accelerator pedal 45 made by a returning operation of the accelerator pedal 45 is not smaller than a predetermined threshold Acc2, or by seeing if a rate Acc' of the negative change in the operating amount of the accelerator pedal 45 is not smaller than a predetermined threshold Acc2'.

The predetermined threshold Acc1, Acc2, Acc1' or Acc2' of the amount ΔAcc of change in the operating amount of the accelerator pedal 45 or the rate Acc' of the change in the operating amount of the accelerator pedal 45, which is obtained by experimentation, is a lower limit used for determination as to whether the degree of the required acceleration or deceleration is not smaller than the predetermined extent, for permitting the hybrid control means 52 or the switching control means 50 to be operated only when the degree of vehicle acceleration or deceleration required by the vehicle operator is not smaller than the predetermined extent, rather than for permitting the hybrid control means 52 or the switching control means 50 to be operated always when the accelerator pedal 45 is operated, for improving the vehicle acceleration or deceleration drivability as felt by the vehicle operator.

Locked-state determining means 82 is provided for determining whether the power distributing mechanism 16 is in the locked state, namely, whether the differential portion 11 is in the non-continuously-variable shifting state, so that the hybrid control means 52 or the switching control means 50 is operated, when the degree of vehicle acceleration or deceleration required by the vehicle operator is not smaller than the predetermined extent, for improving the vehicle acceleration or deceleration drivability as felt by the vehicle operator. For example, this determination is made by on the locked-state determining means 82, by seeing if the vehicle condition is in the continuously-variable shifting region for placing the transmission mechanism 10 in the continuously-variable shifting state, on the basis of the condition of the vehicle in the form of the vehicle speed V and the output torque $T_{OUT}$, and according to the shifting boundary line map indicated in FIG. 6, which map is used for determining whether the vehicle condition is in the non-continuously-variable shifting region (in which the transmission mechanism 10 is placed by the switching control means 50 in the non-continuously-variable shifting state) or in the continuously-variable shifting region (in which the transmission mechanism 10 is placed by the switching control means 50 in the continuously-variable shifting state).

The switching control means 50 is operated, when the degree of the required acceleration or deceleration is determined by the accelerator-operating-amount determining means 80 to be not smaller than the predetermined extent and the differential portion 11 is determined by the locked-state determining means 82 to be in the non-continuously-variable shifting state (locked state), for removing limitation imposed on the operation of the differential portion 11 as the electrically controlled continuously variable transmission. In this instance, for removing the limitation, the switching control means 50 is operated as differential-state switching control means for generating a command to be applied to the hydraulic control unit 42, to release the switching clutch C0 or brake B0 that are engaged, so as to place the differential portion 11 in the continuously-variable shifting state (differential state).

For example, the switching control means 50 is operated, when the degree of the required acceleration or deceleration is determined by the accelerator-operating-amount determining means 80 to be not smaller than the predetermined extent and the differential portion 11 is determined by the locked-state determining means 82 to be in the non-continuously-variable shifting state (locked state), for temporarily place the differential portion 11 in the continuously-variable shifting state (differential state) for a predetermined length of time which is obtained by experimentation. After the predetermined length of time has elapsed, the switching control means 50 places the differential portion 11 in the non-continuously-variable shifting state again.

In the present embodiment; the differential portion 11 is temporarily placed in the continuously-variable shifting state, by releasing the switching clutch C0 or brake B0 that are engaged. However, for enabling the differential portion 11 to be placed again in the non-continuously-variable shifting state, the differential portion 11 may be temporarily placed in the continuously-variable shifting state, by partially releasing or engaging the switching clutch C0 or brake B0, rather than by completely releasing the switching clutch C0 or brake B0.

With the switching clutch C0 or brake B0 being partially released or engaged, the switching control means 50 allows the differential portion 11 to be operated as the electrically controlled continuously variable transmission (differential device), while generating a reaction torque against the torque generated by the first electric motor M1 and the engine torque TE inputted to the differential portion 11 through the partial engagement of the switching clutch C0 or brake B0.

The switching control means 50 is operated, when the degree of the required acceleration or deceleration is determined by the accelerator-operating-amount determining means 80 to be not smaller than the predetermined extent and the differential portion 11 is determined by the locked-state determining means 82 to be in the continuously-variable shifting state (differential state), for avoiding limitation imposed on the operation of the differential portion 11 as the electrically controlled continuously variable transmission. In this instance, for avoiding the limitation, the switching control means 50 is operated as the differential-state switching control means for holding the continuously-variable shifting state (differential state) of the differential portion 11, by maintaining the released states of the switching clutch C0 and brake B0.

When the degree of the required acceleration is determined by the accelerator-operating-amount determining means 80 to be not smaller than the predetermined extent, the hybrid control means 52 controls the differential portion 11 (which is placed in the continuously-variable shifting state by the switching control means 50) such that the engine rotational speed $N_E$ is increased whereby the drive torque is increased, for improving the vehicle acceleration drivability as felt by the vehicle operator. For instance, the hybrid control means 52 is arranged to control the throttle actuator 97 on the basis of the operating amount $A_{CC}$ of the accelerator pedal 45 and according to the above-described stored relationship (not shown) between the operating amount $A_{CC}$ and the opening angle $\theta_{TH}$ of the electronic throttle valve 96 such that the opening angle $\theta_{TH}$ increases with the increase of the operating amount $A_{CC}$, for rapidly increasing the engine rotational speed $N_E$. Further, the hybrid control means 52 may be arranged to control the first electric motor M1, in addition to or in place of controlling the throttle actuator 97, on the basis of the operating amount $A_{CC}$ of the accelerator pedal 45 and according to the above-described stored relationship (not shown) such that the first electric motor rotational speed $N_{M1}$ increases with the increase of the operating amount $A_{CC}$, for rapidly increasing the engine rotational speed $N_E$.

When the degree of the required deceleration is determined by the accelerator-operating-amount determining means 80 to be not smaller than the predetermined extent, the hybrid control means 52 controls the differential portion 11 (which is placed in the continuously-variable shifting state by the switching control means 50) such that the engine rotational speed $N_E$ is reduced whereby the drive torque is reduced, for improving the vehicle deceleration drivability as felt by the vehicle operator. For instance, the hybrid control means 52 is arranged to control the throttle actuator 97 on the basis of the operating amount $A_{CC}$ of the accelerator pedal 45 and according to the above-described stored relationship (not shown) between the operating amount $A_{CC}$ and the opening angle $\theta_{TH}$ of the electronic throttle valve 96 such that the opening angle $\theta_{TH}$ decreases with the reduction of the operating amount $A_{CC}$, for rapidly reducing the engine rotational speed $N_E$. Further, the hybrid control means 52 may be arranged to control the first electric motor M1, in addition to or in place of controlling the throttle actuator 97, on the basis of the operating amount $A_{CC}$ of the accelerator pedal 45 and according to the above-described stored relationship (not shown) such that the first electric motor rotational speed $N_{M1}$ decreases with the reduction of the operating amount $A_{CC}$, for rapidly reducing the engine rotational speed $N_E$.

The hybrid control means 52 may be arranged to control the engine rotational speed $N_E$ or the first electric motor rotational speed $N_{M1}$, when the differential portion 11 is placed again in the non-continuously-variable shifting state after having been temporarily placed in the continuously-variable shifting state by the switching control means 50, such that the engine rotational speed $N_E$ or the first electric motor rotational speed $N_{M1}$ is changed toward a value after completion of the engagement of the switching clutch C0 or brake B0, for restraining an engaging shock of the switching clutch C0 or brake B0. After the engine rotational speed $N_E$ or the first electric motor rotational speed $N_{M1}$ has been controlled by the hybrid control means 52 to be changed toward the value after completion of the engagement of the switching clutch C0 or brake B0, the switching control means 50 places the differential portion 11 in the non-continuously-variable shifting state. The value of the engine rotational speed $N_E$ or the first electric motor rotational speed $N_{M1}$ after completion of the engagement of the switching clutch C0 corresponds to the input rotational speed $N_{IN}$ of the automatic transmission portion 20 (=speed ratio γ of the automatic transmission portion 20×output rotational speed $N_{OUT}$ of the automatic transmission portion 20). The value of the engine rotational speed $N_E$ after completion of the engagement of the switching brake B0 corresponds to product of the speed ratio γ of the differential portion 11 and the input rotational speed $N_{IN}$, while the value of the first electric motor rotational speed $N_{M1}$ after completion of the engagement of the switching brake B0 is zero (rotation stop).

Thus, the hybrid control means 52 functions as rotational speed control means for selectively increasing and reducing the engine rotational speed $N_E$ in the differential portion 11 which is placed in the continuously-variable shifting state by the switching control means 50.

As described above, the transmission mechanism 10 in the present embodiment is provided with the automatic transmission portion 20 in addition to the differential portion 11, and the automatic transmission portion 20 is shifted under the control of the step-variable shifting control means 54, on the basis of the running state of the vehicle and according to the shifting boundary line map shown in FIG. 6 by way of example. For example, there is also a case where the automatic transmission portion 20 is shifted as a result of operation of the accelerator pedal 45 which causes the accelerator-operating-amount determining means 80 determines that the degree of vehicle acceleration or deceleration required by the vehicle operator is not smaller than the predetermined extent.

When the automatic transmission portion 20 is thus shifted, too, the hybrid control means 52 selectively increases and reduces the engine rotational speed $N_E$ in the differential portion 11 which is placed in the continuously-variable shifting state by the switching control means 50.

For example, where a power-on shift-down action of the automatic transmission portion 20 is carried out by the step-variable shifting control means 54 when it is determined by the accelerator-operating-amount determining means 80 that the degree of required vehicle acceleration is not smaller than the predetermined extent, the hybrid control means 52 rapidly increases the engine rotational speed $N_E$ in the differential portion 11 (which is placed in the continuously-variable shifting state by the switching control means 50), so as to increase the drive torque, in an initial stage of the shifting action of the automatic transmission portion 20, e.g., during a length of time immediately after the moment of the determination by the accelerator-operating-amount determining means 80 until the moment of change of the input rotational speed $N_{IN}$ caused by the shifting action of the automatic transmission portion 20, for improving the vehicle acceleration drivability as felt by the vehicle operator. In this arrangement, it is possible to increase the engine rotational speed $N_E$ more rapidly as compared with an arrangement in which the shift-down action of the automatic transmission portion 20 is carried out while the differential portion 11 is held in the non-continuously-variable shifting state. In the latter arrangement, the shift-down action of the automatic transmission portion 20 requires a certain length of time as a required shifting time, which is dependent on hydraulic pressures of the frictional coupling devices to be released and engaged for the shifting action, and the timings of the releasing and engaging actions of those frictional coupling devices, which are determined to reduce the shifting shock and shorten the required shifting time.

For example, where a shift-up action of the automatic transmission portion 20 is carried out by the step-variable shifting control means 54 when it is determined by the accelerator-operating-amount determining means 80 that the degree of required vehicle deceleration is not smaller than the predetermined extent, the hybrid control means 52 rapidly increases the engine rotational speed $N_E$ in the differential portion 11 (which is placed in the continuously-variable shifting state by the switching control means 50) so as to reduce the drive torque, in an initial stage of the shifting action of the automatic transmission portion 20, for improving the vehicle deceleration drivability as felt by the vehicle operator. In this arrangement, it is possible to reduce the engine rotational speed $N_E$ more rapidly as compared with an arrangement in which the shift-up action of the automatic transmission portion 20 is carried out while the differential portion 11 is held in the non-continuously-variable shifting state. In the latter arrangement, the shift-up action of the automatic transmission portion 20 requires a certain length of time as a required shifting time.

Further, where a shifting action of the automatic transmission portion 20 is carried out by the step-variable shifting control means 54 when it is determined by the accelerator-operating-amount determining means 80 that the degree of required vehicle acceleration or deceleration is not smaller than the predetermined extent, the hybrid control means 52 adjusts the engine rotational speed $N_E$ by using the first electric motor M1 such that the adjusted engine rotational speed $N_E$ coincides with an engine rotational speed $N_E$ that is to be established after the differential portion 11 is placed in the non-continuously-variable shifting state, namely, with an engine rotational speed $N_E$ that is to be established after completion of engagement of the switching clutch C0 or brake B0, in a final stage of the sifting action of the automatic transmission portion 20, e.g., during a length of time after initiation of change of the input rotational speed $N_{IN}$ caused by the shifting action of the automatic transmission portion 20 until completion of the change of the input rotational speed $N_{IN}$, for restraining an engaging shock of the switching clutch C0 or brake B0 when the differential portion 11 is placed again in the non-continuously-variable shifting state after having been temporarily placed in the continuously-variable shifting state by the switching control means 50.

In other words, the hybrid control means 52 controls the first electric motor M1 such that the first electric motor rotational speed $N_{M1}$ is changed toward the rotational speed that is to be established after completion of the engagement of the switching clutch C0 or brake B0. That is, it can be said that the first electric motor M1 is controlled by the hybrid control means 52, when the switching clutch C0 is engaged, such that the first electric motor rotational speed $N_{M1}$ is changed toward the engine rotational speed $N_E$, or it can be said that the first electric motor M1 is controlled by the hybrid control means 52, when the switching brake B0 is engaged, such that the first electric motor rotational speed $N_{M1}$ is changed toward zero. The value of the engine rotational speed $N_E$ or the first electric motor rotational speed $N_{M1}$ after completion of the engagement of the switching clutch C0 corresponds to the input rotational speed $N_{IN}$ of the automatic transmission portion 20 after completion of the shifting action (=speed ratio γ of the automatic transmission portion 20 after completion of the shifting action×output rotational speed $N_{OUT}$ of the automatic transmission portion 20 after completion of the shifting action). The value of the engine rotational speed $N_E$ after completion of the engagement of the switching brake B0 corresponds to product of the speed ratio γ of the differential portion 11 and the input rotational speed $N_{IN}$, while the value of the first electric motor rotational speed $N_{M1}$ after completion of the engagement of the switching brake B0 is zero (rotation stop).

After the engine rotational speed $N_E$ has been controlled by the hybrid control means 52 to be changed toward the rotational speed that is to be established after completion of the engagement of the switching clutch C0 or brake B0, the differential portion 11 which has been temporarily placed in the continuously-variable shifting state is placed in the non-continuously-variable shifting state.

Shifting-action-final-stage determining means 84 is provided to determining whether the final stage of the shifting action of the automatic transmission portion 20 is initiated or not, by seeing if the input rotational speed $N_{IN}$ begins to be changed as each frictional coupling device to be engaged for the shifting action begins to have an engaging torque capacity, after each frictional coupling device to be released for the shifting action has been released as a result of determination of the shifting action of the automatic transmission portion 20 by the step-variable shifting control means 54.

The shifting-action-final-stage determining means 84 determines, in process of the shifting action of the automatic transmission portion 20 effected by the step-variable shifting control means 54, whether the input rotational speed $N_{IN}$ begins to be changed as each frictional coupling device to be engaged for the shifting action begins to have the engaging torque capacity, for example, by seeing if the actual input rotational speed $N_{IN}$ has been changed by a predetermined amount (which is experimentally obtained), if a predetermined length of time (which is experimentally obtained), as a time required by each frictional coupling device (to be engaged for the shifting action) to begin to have the engaging torque capacity, has elapsed since the determination of the shifting action of the automatic transmission portion 20 by the step-variable shifting control means 54, or if the engaging hydraulic pressure of each frictional coupling device to be engaged for the shifting action coincides with a transient hydraulic pressure (command) value $P_C$ (which is experimentally obtained) as a hydraulic pressure (command) value by which each frictional coupling device is determined to begin to have the engaging torque capacity.

Further, the shifting-action-final-stage determining means 84 determines whether the shifting action of the automatic transmission portion 20 is completed or not, by seeing if the input rotational speed $N_{IN}$ substantially coincides with the input rotational speed $N_{IN}$ that is to be established, after the input rotational speed $N_{IN}$ begins to be changed as a result of the shifting action of the automatic transmission portion 20 effected by the step-variable shifting control means 54.

Figure 10:
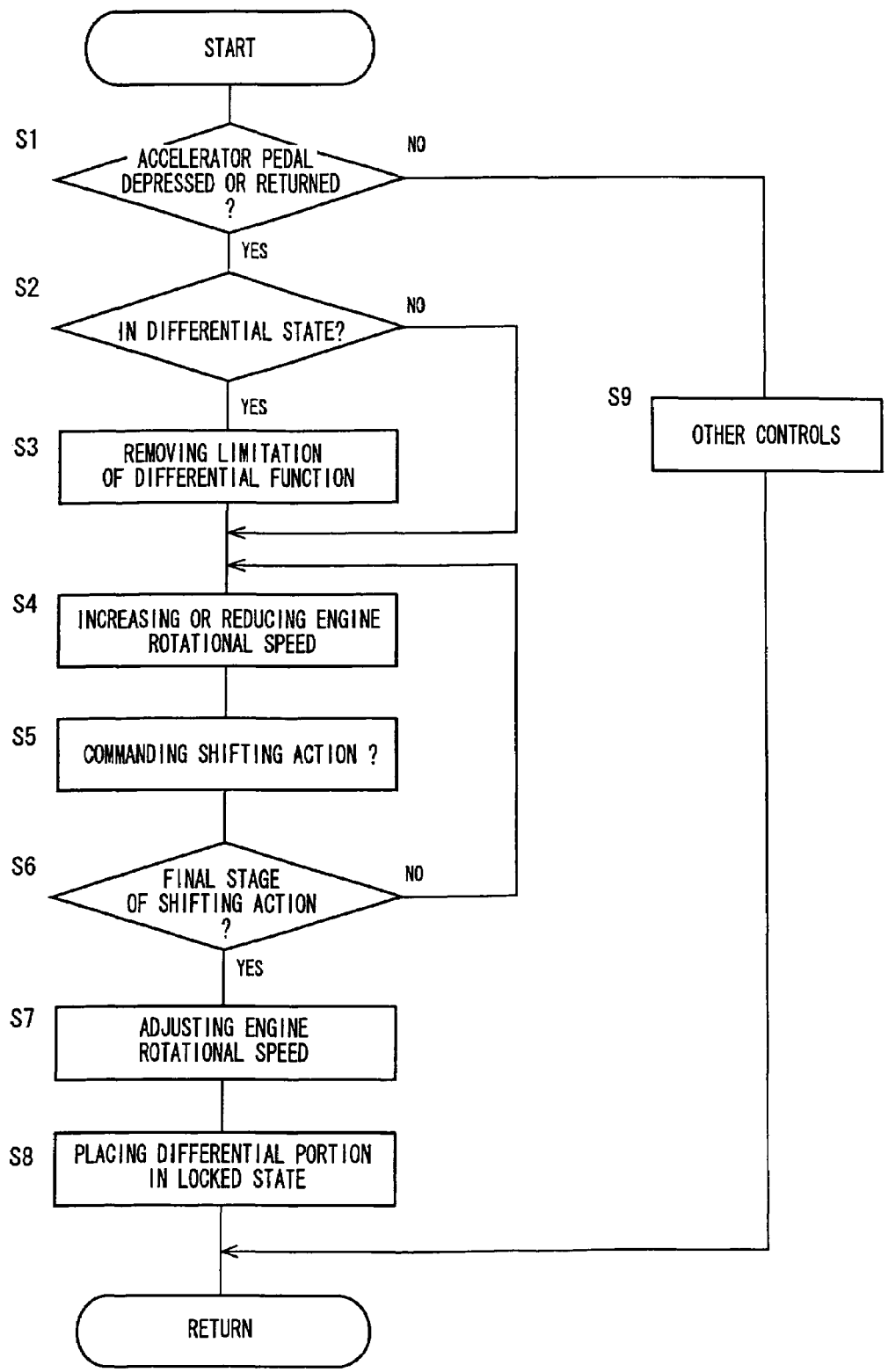
FIG. 10 is a flow chart illustrating a control operation of the electronic control device of FIG. 5, that is, a switching control operation of a differential portion when acceleration or deceleration of the vehicle is required.

FIG. 10 is a flow chart illustrating a major portion of a control operation of the electronic control device 40, namely, a switching control routine of the differential portion 11 when acceleration or deceleration of the vehicle is required. This control routine is repeatedly executed with an extremely short cycle time of about several milliseconds to about several tens of milliseconds, for example.

Figure 11:
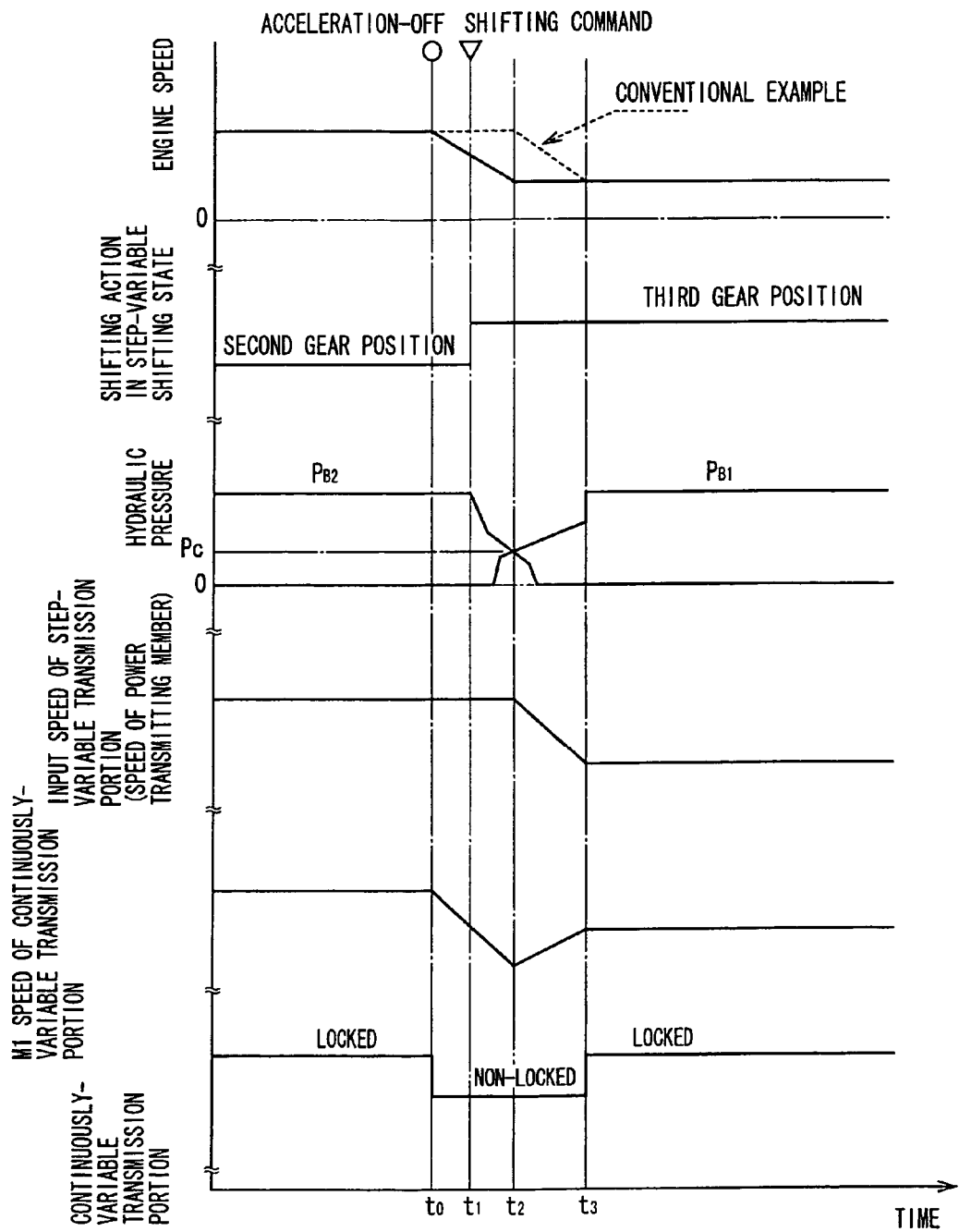
FIG. 11 is a time chart for explaining the control operation illustrated by the flow chart of FIG. 10 when the automatic transmission portion is commanded to effect a shift-up action from a second gear position to a third gear position while a differential portion is placed in a step-variable shifting state (locked state).

FIG. 11 is a time chart for explaining the control operation illustrated by the flow chart of FIG. 10 when the automatic transmission portion 20 is commanded to effect a shift-up action from the second gear position to the third gear position while the differential portion 11 is placed in the step-variable shifting state (locked state).

Figure 12:
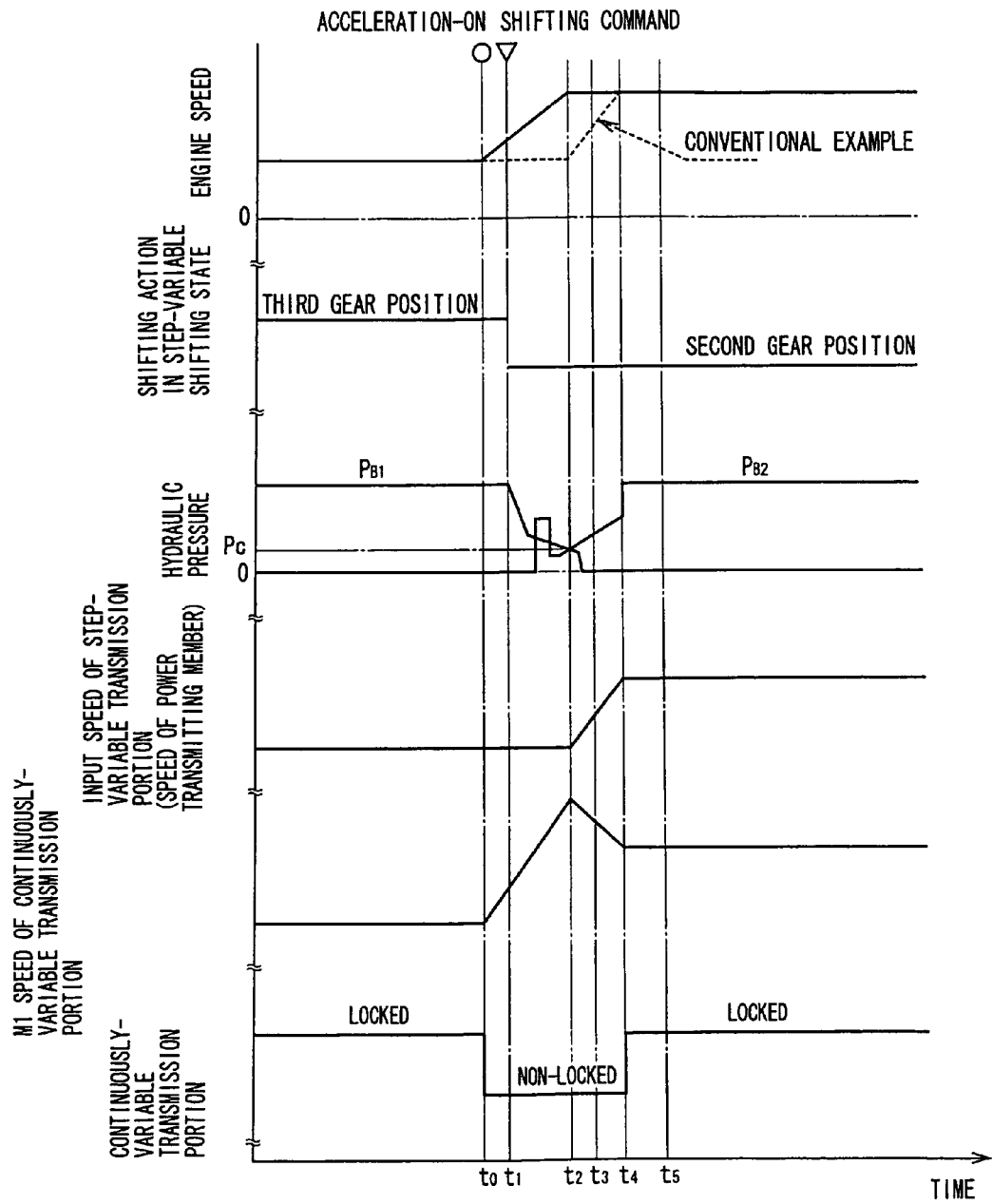
FIG. 12 is a time chart for explaining the control operation illustrated by the flow chart of FIG. 10 when the automatic transmission portion is commanded to effect a shift-down action from the third gear position to the second gear position while the differential portion is placed in the step-variable shifting state (locked state).

FIG. 12 is a time chart for explaining the control operation illustrated by the flow chart of FIG. 10 when the automatic transmission portion 20 is commanded to effect a power-on shift-down action from the third gear position to the second gear position while the differential portion 11 is placed in the step-variable shifting state (locked state).

The control routine is initiated with step S1 ("step" being hereinafter omitted) corresponding to the accelerator-operating-amount determining means 80, to determine whether the degree of the required acceleration is not smaller than the predetermined extent, by seeing if the amount ΔAcc of positive change in the operating amount of the accelerator pedal 45 made by a depressing operation of the accelerator pedal is not smaller than a predetermined threshold Acc1, or by seeing if a rate Acc' of the positive change in the operating amount of the accelerator pedal 45 is not smaller than a predetermined threshold Acc1'. Alternatively, the S1 is implemented to determine whether the degree of the required deceleration is not smaller than the predetermined extent, by seeing if the amount ΔAcc of negative change in the operating amount of the accelerator pedal 45 made by a returning operation of the accelerator pedal 45 is not smaller than a predetermined threshold Acc2, or by seeing if a rate Acc' of the negative change in the operating amount of the accelerator pedal 45 is not smaller than a predetermined threshold Acc2'.

In FIG. 11, a point $t_0$ of time is a point of time at which the accelerator pedal 45 is subjected to a returning operation (acceleration-off) by which it is determined that the degree of the required deceleration is not smaller than the predetermined extent.

In FIG. 12, a point $t_0$ of time is a point of time at which the accelerator pedal 45 is subjected to a depressing operation (acceleration-on) by which it is determined that the degree of the required acceleration is not smaller than the predetermined extent.

If an affirmative decision is obtained in the S1, the control flow goes to S2 corresponding to the locked-state determining means 82, to determine whether the power distributing mechanism 16 is placed in the locked state, namely, whether the differential portion (continuously-variable transmission portion) 11 is placed in the non-continuously-variable shifting state, for example, by seeing if the vehicle condition is in the step-variable shifting region for placing the transmission mechanism 10 in the non-continuously-variable shifting state, on the basis of the condition of the vehicle, and according to the shifting boundary line map indicated in FIG. 6.

If an affirmative decision is obtained in the S2, the control flow goes to S3 corresponding to the switching control means 50, to command the hydraulic control unit 42 to release the switching clutch C0 or brake B0, for temporarily placing the differential portion 11 in the continuously-variable shifting state (differential state), so as to remove the limitation imposed on the operation of the differential portion 11 as the electrically controlled continuously variable transmission.

In FIG. 11, the point $t_0$ of time is a point of time at which the differential portion (continuously-variable transmission portion) 11 is switched from the non-continuously-variable shifting state (locked state) to the continuously-variable shifting state (non-locked state) by the acceleration-on causing the determination that the degree of the required deceleration is not smaller than the predetermined extent.

In FIG. 12, the point $t_0$ of time is a point of time at which the differential portion (continuously-variable transmission portion) 11 is switched from the non-continuously-variable shifting state (locked state) to the continuously-variable shifting state (non-locked state) by the acceleration-off causing the determination that the degree of the required acceleration is not smaller than the predetermined extent.

A negative decision obtained in the S2 or implementation of the S3 is followed by S4 corresponding to the hybrid control means 52. In the step S4, where the required acceleration by a depressing operation of the accelerator pedal 45 is not smaller than the predetermined extent, the opening angle $\theta_{TH}$ of the electronic throttle valve 96 or the first electric motor rotational speed $N_{M1}$ is controlled to be increased with the increase of the operating amount $A_{CC}$ of the accelerator pedal 45, for rapidly increasing the engine rotational speed $N_E$ and the drive torque, so as to improve the vehicle acceleration drivability as felt by the vehicle operator. Further, in the step S4, when the required deceleration by a returning operation of the accelerator pedal 45 is not smaller than the predetermined extent, the opening angle $\theta_{TH}$ of the electronic throttle valve 96 is controlled to be reduced with the reduction of the operating amount $A_{CC}$ of the accelerator pedal 45, for rapidly reducing the engine rotational speed $N_E$ and the drive torque, so as to improve the vehicle deceleration drivability as felt by the vehicle operator.

In FIG. 11, at the point $t_0$ of time and thereafter, the engine rotational speed $N_E$ is reduced concurrently with the acceleration-off while the differential portion 11 is placed in the continuously-variable shifting state. In this instance, before the shift-up action of the automatic transmission portion 20, since the input rotational speed $N_{IN}$ of the automatic transmission portion 20 is held substantially constant if the vehicle speed V is held substantially constant, the first electric motor rotational speed $N_{M1}$ is reduced, too. Described in another point of view, in addition to or in place of reducing the engine rotational speed $N_E$ by controlling the throttle actuator 97 according to the acceleration-off, it is also possible to actively reduce the first electric motor rotational speed $N_{M1}$ as shown at the point $t_0$ of time and thereafter, so as to reduce the engine rotational speed $N_E$.

In FIG. 12, at the point $t_0$ of time and thereafter, the engine rotational speed $N_E$ is increased concurrently with the acceleration-on while the differential portion 11 is placed in the continuously-variable shifting state. In this instance, before the shift-down action of the automatic transmission portion 20, since the input rotational speed $N_{IN}$ of the automatic transmission portion 20 is held substantially constant if the vehicle speed V is held substantially constant, the first electric motor rotational speed $N_{M1}$ is increased, too. Described in another point of view, in addition to or in place of increasing the engine rotational speed $N_E$ by controlling the throttle actuator 97 according to the acceleration-on, it is also possible to actively increase the first electric motor rotational speed $N_{M1}$ as shown at the point $t_0$ of time and thereafter, so as to increase the engine rotational speed $N_E$.

The S4 is followed by S5 corresponding to the step-variable shifting control means 54. In the S5, where a shifting action of the automatic transmission portion 20 is to be carried out upon the determination that the required acceleration by a depressing operation of the accelerator pedal 45 or the required deceleration by a returning operation of the accelerator pedal 45 is not smaller than the predetermined extent, for example, where the gear position (to which the automatic transmission portion 20 should be shifted) is determined on the basis of the vehicle condition and according to the shifting boundary line map of FIG. 6, there are generated commands to be applied to the hydraulic control unit 42, for establishing the determined gear position of the automatic transmission portion 20.

In FIG. 11, the point $t_1$ of time is a point of time at which the shift-up action of the automatic transmission portion 20 from the second gear position to the third gear position is determined whereby the automatic transmission portion 20 is commanded to be shifted up to the third gear position in the non-continuously-variable shifting state (locked state) of the differential portion (continuously-variable transmission portion) 11 so that the reduction of a releasing hydraulic pressure $P_{B2}$ of the second brake B2 as the coupling device to be released is initiated.

In FIG. 12, the point $t_1$ of time is a point of time at which the shift-down action of the automatic transmission portion 20 from the third gear position to the second gear position is determined whereby the automatic transmission portion 20 is commanded to be shifted down to the second gear position in the non-continuously-variable shifting state (locked state) of the differential portion (continuously-variable transmission portion) 11 so that the reduction of a releasing hydraulic pressure $P_{B1}$ of the first brake B1 as the coupling device to be released is initiated.

The S5 is followed by S6 corresponding to the shifting-action-final-stage determining means 84, to determine whether the final stage is initiated in process of the shifting action of the automatic transmission portion 20. For example, this determination is made by seeing if the input rotational speed $N_{IN}$ begins to be changed as each frictional coupling device to be engaged for the shifting action begins to have an engaging torque capacity, after each frictional coupling device to be released for the shifting action has been released as a result of determination of the shifting action of the automatic transmission portion 20.

During a time period from the point $t_1$ of time to the point $t_3$ of time indicated in FIG. 11, the engaging hydraulic pressure $P_{B1}$ of the first brake B1 as the coupling device to be engaged for the shifting action is increased. At the point $t_3$ of time, the engaging action of the first brake B1 is completed, and the shifting action of the automatic transmission portion 20 is terminated. The point $t_2$ of time is a point of time at which the input rotational speed $N_{IN}$ begins to be changed as the first brake B1 begins to have an engaging torque capacity, namely, the final stage is initiated in process of the shifting action of the automatic transmission portion 20. Thus, in the embodiment of FIG. 11, a time period from the point $t_0$ of time to the point $t_2$ of time corresponds to the initial stage of the shifting action (in which the engine rotational speed $N_E$ is reduced as described above), while a time period from the point $t_2$ of time to the point $t_3$ of time corresponds to the final stage of the shifting action. The transient hydraulic pressure of the coupling device to be released and the transient hydraulic pressure of the coupling device to be engaged, during the time period from the point $t_1$ of time to the point $t_3$ of time, are determined such that the rate of change of the input rotational speed $N_{IN}$ of the automatic transmission portion 20 coincides with a value which is experimentally obtained for shortening the required shifting time and reducing the shifting shock.

During a time period from the point $t_1$ of time to the point $t_4$ of time indicated in FIG. 12, the engaging hydraulic pressure $P_{B2}$ of the second brake B2 as the coupling device to be engaged for the shifting action is increased. At the point $t_4$ of time, the engaging action of the second brake B2 is completed, and the shifting action of the automatic transmission portion 20 is terminated. The point $t_2$ of time is a point of time at which the input rotational speed $N_{IN}$ begins to be changed as the second brake B2 begins to have an engaging torque capacity, namely, the final stage is initiated in process of the shifting action of the automatic transmission portion 20. Thus, in the embodiment of FIG. 12, a time period from the point $t_0$ of time to the point $t_2$ of time corresponds to the initial stage of the shifting action (in which the engine rotational speed $N_E$ is increased as described above), while a time period from the point $t_2$ of time to the point $t_4$ of time corresponds to the final stage of the shifting action. The transient hydraulic pressure of the coupling device to be released and the transient hydraulic pressure of the coupling device to be engaged, during the time period from the point $t_1$ of time to the point $t_4$ of time, are determined such that the rate of change of the rotational speed $N_{18}$ of the power transmitting member 18 coincides with a value which is experimentally obtained. For example, upon initiation of supply of the pressurized working fluid to the coupling device to be engaged, the pressure of the fluid is made relatively high to rapidly eliminate the back clearance of the coupling device, that is, for rapid filling of the coupling device. Then, the fluid pressure is once lowered to prevent a risk of an engaging shock of the coupling device, which would take place if the relatively high initial pressure was maintained for a long time. Subsequently, the fluid pressure to be applied to the coupling device to be engaged is gradually increased to a predetermined value for complete engagement of the coupling device.

If a negative decision is obtained in the S6, the control flow goes back to the S4. If an affirmative decision is obtained in the S6, the control flow goes to S7 corresponding to the hybrid control means 52. In S7, where the differential portion 11 has been temporarily placed in the continuously-variable shifting state, the engine rotational speed $N_E$ is adjusted by using the first electric motor M1 such that the adjusted engine rotational speed $N_E$ coincides with an engine rotational speed $N_E$ that is to be established after completion of the engagement of the switching clutch C0 or brake B0, in the final stage of the sifting action of the automatic transmission portion 20, namely, during a time period after initiation of change of the input rotational speed $N_{IN}$ until completion of the shifting action.

During a time period from the point $t_2$ of time to the point $t_3$ of time indicated in FIG. 11, the engine rotational speed $N_E$ (first electric motor rotational speed $N_{M1}$) is adjusted by using the first electric motor M1 such that the adjusted rotational speed coincides with a rotational speed that is to be established after completion of the engagement of the switching clutch C0. In the embodiment of FIG. 11 in which the engine rotational speed $N_E$ is reduced in the initial stage of the shifting action such that the reduced rotational speed coincides with the rotational speed that is to be established after completion of the engagement of the switching clutch C0, the first electric motor rotational speed $N_{M1}$ (which has been temporarily reduced in the initial stage of the shifting action) is increased in the final stage of the shifting action, such that the engine rotational speed $N_E$ is kept to coincide with the rotational speed that is to be established after completion of the engagement of the switching clutch C0, in spite of reduction of the input rotational speed $N_{IN}$ in the final stage of the shifting action. A broken line represents a change of the engine rotational speed $N_E$ in a conventional example in which the shift-up action of the automatic transmission portion 20 is carried out while the differential portion 11 is held in the non-continuously-variable shifting state, rather than being placed in the continuously-variable shifting state. In the present embodiment, as compared with the conventional example, the engine rotational speed $N_E$ is reduced in an earlier stage, as indicated by a solid line, thereby improving the vehicle deceleration drivability as felt by the vehicle operator.

During a time period from the point $t_2$ of time to the point $t_4$ of time indicated in FIG. 12, the engine rotational speed $N_E$ (first electric motor rotational speed $N_{M1}$) is adjusted by using the first electric motor M1 such that the adjusted rotational speed coincides with a rotational speed that is to be established after completion of the engagement of the switching clutch C0. In the embodiment of FIG. 12 in which the engine rotational speed $N_E$ is increased in the initial stage of the shifting action such that the increased rotational speed coincides with the rotational speed that is to be established after completion of the engagement of the switching clutch C0, the first electric motor rotational speed $N_{M1}$ (which has been temporarily increased in the initial stage of the shifting action) is reduced in the final stage of the shifting action, such that the engine rotational speed $N_E$ is kept to coincide with the rotational speed that is to be established after completion of the engagement of the switching clutch C0, in spite of increase of the input rotational speed $N_{IN}$ in the final stage of the shifting action. A broken line represents a change of the engine rotational speed $N_E$ in a conventional example in which the shift-down action of the automatic transmission portion 20 is carried out while the differential portion 11 is held in the non-continuously-variable shifting state, rather than being placed in the continuously-variable shifting state. In the present embodiment, as compared with the conventional example, the engine rotational speed $N_E$ is increased in an earlier stage, as indicated by a solid line, thereby improving the vehicle acceleration drivability as felt by the vehicle operator.

The control flow then goes to S8 corresponding to the switching control means 50, to place the differential portion 11 (which has been temporarily placed in the continuously-variable shifting state) again in the non-continuously-variable shifting state, after the engine rotational speed $N_E$ has been controlled toward the rotational speed that is to be established after completion of the engagement of the switching clutch C0 or brake B0, namely, after the first electric motor rotational speed $N_{M1}$ has been controlled toward the rotational speed that is to be established after completion of the engagement of the switching clutch C0 or brake B0.

In FIG. 11, the point $t_3$ of time is a point of time at which the differential portion 11 which has been temporarily placed in the continuously-variable shifting state (non-locked state) is placed again in the non-continuously-variable shifting state (locked state) after the engine rotational speed $N_E$ (first electric motor rotational speed $N_{M1}$) has been synchronously controlled to coincide with the rotational speed that is to be established after completion of the engagement of the switching clutch C0.

In FIG. 12, the point $t_4$ of time is a point of time at which the differential portion 11 which has been temporarily placed in the continuously-variable shifting state (non-locked state) is placed again in the non-continuously-variable shifting state (locked state) after the engine rotational speed $N_E$ (first electric motor rotational speed $N_{M1}$) has been synchronously controlled to coincide with the rotational speed that is to be established after completion of the engagement of the switching clutch C0.

If a negative decision is obtained in the S1, the control flow goes to S9 in which controls other than the controls implemented where the degree of required vehicle acceleration or deceleration is not smaller than the predetermined extent are implemented by various control means of the control device 40. Alternatively, one cycle of execution of the present shifting control routine is terminated.

As described above, in the present embodiment, the differential portion 11 is switched between the continuously-variable shifting state and the non-continuously-variable shifting state, by the switching clutch C0 or brake B0 as the differential-state limiting device operable to limit an operation of the differential portion 11 as the electrically controlled differential device. Accordingly, it is possible to obtain a drive system having both an advantage of an improvement of the fuel economy of a transmission the speed ratio of which is electrically variable, and an advantage of a high power transmitting efficiency of a gear type power transmitting device constructed for mechanical transmission of power.

When the differential portion 11 is placed in the continuously-variable shifting state in a normal output state of the engine during a low-speed or medium-speed running or a low-output or medium-output running of the vehicle, for example, the fuel economy of the vehicle is improved. When the differential portion 11 is placed in the non-continuously-variable shifting state during a high-speed running of the vehicle, the output of the engine is transmitted to the drive wheel primarily through the mechanical power transmitting path, so that the fuel economy is improved owing to reduction of a loss of conversion of a mechanical energy into an electric energy, which would take place when the continuously-variable transmission portion is operated as the electrically controlled continuously variable transmission. Further, with the differential portion 11 being placed in the non-continuously-variable shifting state during the high-speed running of the vehicle, the vehicle operator can enjoy a comfortable rhythmic change of the engine rotational speed $N_E$ as the transmission portion 20 is shifted up or down.

Further, when acceleration or deceleration of the vehicle is required, the differential portion 11 is placed in the continuously-variable shifting state by the switching control means 50, so that the engine rotational speed $N_E$ can be freely set by the hybrid control means 52, irrespective of a vehicle speed, whereby the vehicle acceleration drivability or the vehicle deceleration drivability as felt by the vehicle operator is improved.

When acceleration of the vehicle is required, the hybrid control means 52 causes the engine rotational speed $N_E$ to be increased according to a depressing operation of the accelerator pedal 45, so that a drive torque of the vehicle is rapidly increased whereby the vehicle acceleration performance and the vehicle acceleration drivability as felt by the vehicle operator are improved. Further, when deceleration of the vehicle is required, the hybrid control means 52 causes the engine rotational speed $N_E$ to be reduced according to a returning operation of the accelerator pedal 45, so that the drive torque of the vehicle is rapidly reduced whereby the vehicle acceleration performance and the vehicle deceleration drivability as felt by the vehicle operator are improved.

In the present embodiment, the switching control means 50 places the differential portion 11 in the differential state, by releasing the switching clutch C0 or brake B0 that are engaged. Thus, the differential portion 11 is easily switchable by the switching clutch C0 or brake B0, between the differential state and the locked state, thereby making it possible to obtain a drive system having both an advantage of an improvement of the fuel economy of a transmission the speed ratio of which is electrically variable, and an advantage of a high power transmitting efficiency of a gear type power transmitting device constructed for mechanical transmission of power. Further, when acceleration or deceleration of the vehicle is required, the differential portion 11 is easily placed in the differential state, by releasing the switching clutch C0 or brake B0 that are engaged, so that the engine rotational speed $N_E$ can be freely set by the hybrid control means 52, irrespective of a vehicle speed.

Where the switching control means 50 is arranged to place the differential portion 11 by partially engaging the switching clutch C0 or brake B0 that are engaged, it is possible to engage again the switching clutch C0 or brake B0 more rapidly as compared with the arrangement in which the switching clutch C0 or brake B0 is released for placing the differential portion 11 in the differential state.

Further, in the present embodiment, where the shifting action of the automatic transmission portion 20 is carried out upon request of acceleration of the vehicle, the drive torque of the vehicle begins to be rapidly increased in the initial stage of the shift-down action according to a depressing operation of the accelerator pedal 45, irrespective of a shifting time required for the automatic transmission portion 20 in process of completing the shifting action, i.e., irrespective of responsiveness of the shifting action of the automatic transmission portion 20, whereby the vehicle acceleration performance and the vehicle acceleration drivability as felt by the vehicle operator are improved.

Further, in the present embodiment, where the shifting action of the automatic transmission portion 20 is carried out upon request of deceleration of the vehicle, the drive torque of the vehicle begins to be rapidly reduced in the initial stage of the shift-up action according to a returning operation of the accelerator pedal 45, irrespective of a shifting time required for the automatic transmission portion 20 in process of completing the shifting action, i.e., irrespective of responsiveness of the shifting action of the automatic transmission portion 20, whereby the vehicle deceleration performance and the vehicle deceleration drivability as felt by the vehicle operator are improved.

Further, in the present embodiment, where the shifting action of the automatic transmission portion 20 is carried out upon request of acceleration or deceleration of the vehicle, the hybrid control means 52 adjusts the engine rotational speed $N_E$ by using the first electric motor M1 such that the adjusted engine rotational speed $N_E$ coincides in the final stage of the shifting action with the engine rotational speed $N_E$ that is to be established after completion of the engagement of the switching clutch C0 or brake B0. This arrangement is effective to restrain generation of a shock when the differential portion 11 which has been temporarily placed in the differential state is placed again in the non-differential state.

The other embodiments of the present invention will be described. In the following descriptions, the same reference sings as used in the preceding embodiment will be used to identify the corresponding elements which will not be described.

Embodiment 2

In the above-described embodiment, upon request of acceleration or deceleration of the vehicle, the switching control means 50 is arranged to hold the differential portion 11 in the continuously-variable shifting state when the differential portion 11 is in the continuously-variable shifting state, or to place the differential portion 11 in the continuously-variable shifting state when the differential portion 11 is in the non-continuously-variable shifting state, so that the engine rotational speed $N_E$ can be freely changed by the hybrid control means 52 owing to the differential function, for improving the vehicle acceleration or deceleration drivability as felt by the vehicle operation.

When acceleration or deceleration of the vehicle is required, the engine torque $T_E$ is generated according to the operating amount $A_{CC}$ of the accelerator pedal 45 and the vehicle speed V by the hybrid control means 52. That is, upon request of the acceleration or deceleration of the vehicle, the engine torque $T_E$ is changed in response to the depressing operation or the returning operation (hereinafter referred to as "acceleration-on or acceleration-off") of the accelerator pedal 45. It is considered that the vehicle operator can enjoy better comfortability (feeling) where the change of the engine torque $T_E$ in response to the acceleration-on or acceleration-off is directly reflected on the drive torque of the drive wheels 38. On the other hand, the change of the engine torque $T_E$, which is transmitted to the drive wheels 38, constitutes a factor causing generation of a shock, so that there is a possibility that a larger shock is generated as the rate or amount of the change of the engine torque $T_E$ is larger.

In a well-known power transmitting system equipped with a fluid-operated power transmitting device such as a torque converter or a fluid coupling which is disposed in a power transmitting path between a step-variable transmission and an engine, a difference between the engine and the step-variable transmission with respect to rotational speed is allowed by the fluid-operated power transmitting device. Thus, owing to the fluid-operated power transmitting device, the change of the torque transmitted to the drive wheels 38 is restrained as compared with the change of the engine torque $T_E$, whereby the shock caused by the acceleration-on or acceleration-off is restrained.

In the transmission mechanism 10 of the present embodiment, although the fluid-operated power transmitting device is not provided in the power transmitting path between the engine 8 and the automatic transmission portion 20, the differential portion 11 is placed in the continuously-variable shifting state upon request of acceleration or deceleration of the vehicle, so that the differential function of the differential portion 11 enables the engine rotational speed $N_E$ to be set independently of the vehicle speed. Therefore, when acceleration of the vehicle is requested, since the increased engine torque $T_E$ is consumed by an engine inertia due to the change of the engine rotational speed $N_E$, the change of the torque transmitted to the drive wheels 38 is reduced whereby the shock caused by the acceleration-on is restrained. Further, when deceleration of the vehicle is requested, since the engine rotational speed $N_E$ can be freely reduced, the rotational speed of the drive wheels 38 is not abruptly reduced by the engine brake, whereby the shock is difficult to be caused by the acceleration-off.

However, there might be a case where the differential portion 11 cannot be switched from the non-continuously-variable shifting state to the continuously-variable shifting state by the switching control means 50, for example, due to a failure of the switching clutch C0 or brake B0. In such a case, upon request of acceleration or deceleration of the vehicle, the change of the engine torque TE caused by the change of the operating amount $A_{CC}$ of the accelerator pedal 45 would be transmitted directly to the drive wheels 38, whereby the shock caused by the acceleration-on or acceleration-off could be made larger than where the differential portion 11 is placed in the continuously-variable shifting state.

In view of this, where the placement of the differential portion 11 in the continuously-variable shifting state by the switching control means 50 cannot be made upon request of acceleration or deceleration of the vehicle, a responsiveness of an input torque $T_{11}$ of the differential portion 11 with respect to the operation of the accelerator pedal 45 (e.g., with respect to change $\Delta A_{CC}$ of the operating amount $A_{CC}$ of the accelerator pedal 45) is changed for smoothing the change of the torque transmitted to the drive wheels 38, so as to restrain generation of the shock caused by the acceleration-on or acceleration-off. Hereinafter, the responsiveness of the input torque $T_{11}$ is interpreted to mean the responsiveness of the input torque $T_{11}$ with respect to the operating amount change $\Delta A_{CC}$ of the accelerator pedal 45 caused by the acceleration-on or acceleration-off, and changing the responsiveness may be interpreted to mean reducing the responsiveness.

Figure 13:
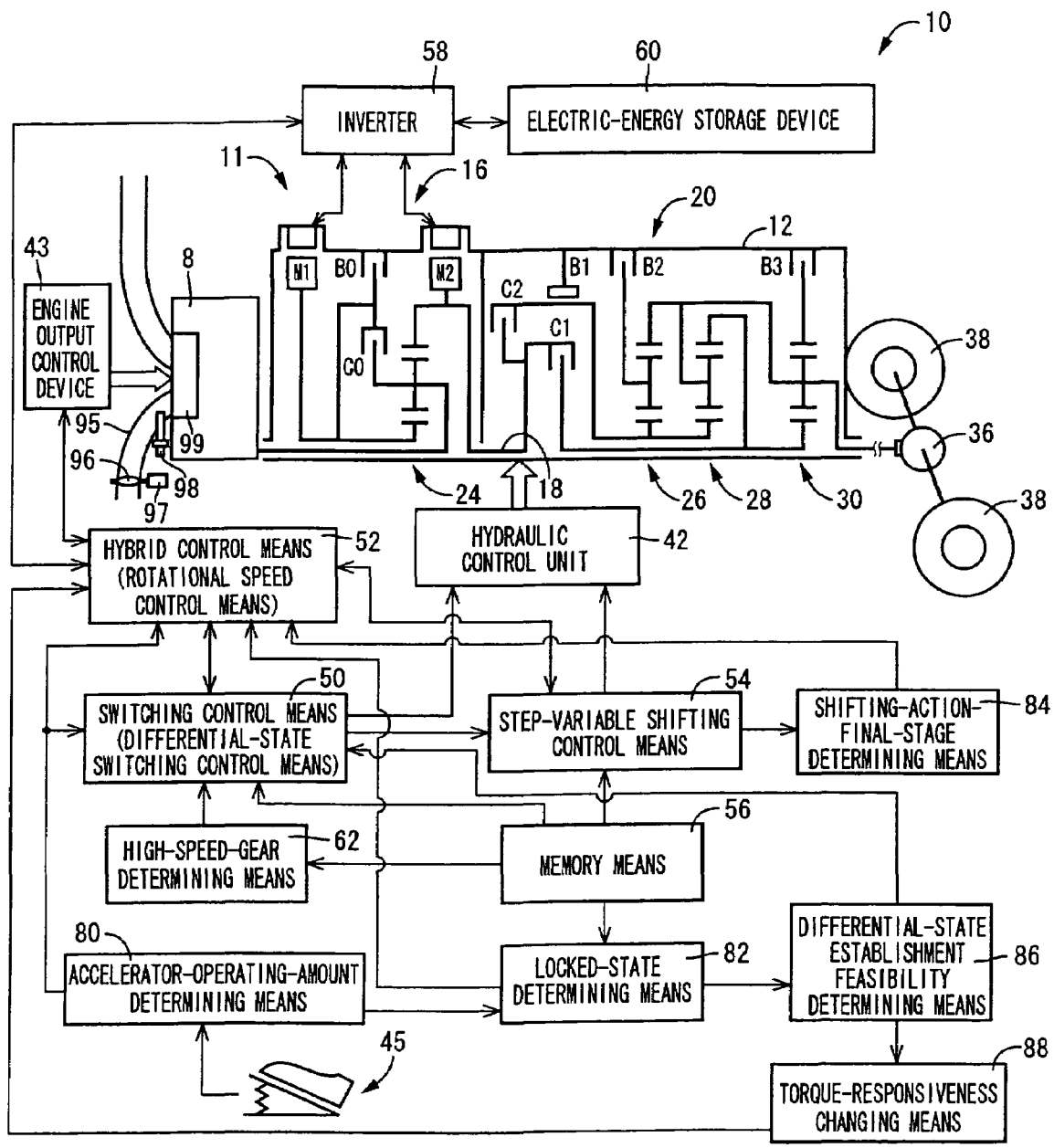
FIG. 13 is a functional block diagram corresponding to that of FIG. 5 and illustrating major control functions of the electronic control device of FIG. 4.

FIG. 13 is a functional block diagram corresponding to that of FIG. 5 and illustrating major control functions of the electronic control device 40. In FIG. 13, differential-state establishment feasibility determining means 86 is provided to determine whether the differential portion 11 can be switched from the non-continuously-variable shifting state (step-variable shifting state) to the continuously-variable shifting state (differential state) when the degree of the required acceleration or deceleration is determined by the accelerator-operating-amount determining means 80 to be not smaller than the predetermined extent and the differential portion 11 is determined by the locked-state determining means 82 to be in the non-continuously-variable shifting state (locked state). This determination as to whether the differential portion 11 is switchable from the non-continuously-variable shifting state to the continuously-variable shifting state is made, for example, by seeing if the switching clutch C0 or brake B0 engaged by the hydraulic control unit 42 can be released according to command of the switching control means 50. For example, the differential-state establishment feasibility determining means 86 is arranged to make the determination as to whether the switching clutch C0 or brake B0 can be released, based on presence of failure of friction members or hydraulic actuators of the switching clutch C0 and brake B0, presence of failure of solenoid-operated valves incorporated in the hydraulic control unit 42 for controlling the hydraulic actuators, presence of functional deterioration of the hydraulic actuators and solenoid-operated valves, and presence of delay of response of the hydraulic actuators due to low temperature of a working oil of the automatic transmission portion 20. Although the delay of response of the hydraulic actuators does not actually disable the switching clutch C0 or brake B0 from being released, the change of the engine torque $T_E$ is transmitted directly to the drive wheels 38 since the switching clutch C0 or brake B0 is released slower than the change of the engine torque $T_E$ caused by the acceleration-on or acceleration-off. It is therefore determined that the differential portion 11 cannot be placed in the continuously-variable shifting state, in presence of the delay of response of the hydraulic actuators.

Torque-responsiveness changing means 88 is provided to change responsiveness of the input torque $T_{11}$ of the differential portion 11 so as to alleviate change of the torque transmitted to the drive wheels 38, where it is determined by the differential-state establishment feasibility determining means 86 that the differential portion 11 cannot be switched from the non-continuously-variable shifting state (step-variable shifting state) to the continuously-variable shifting state (differential state) when the degree of the required acceleration or deceleration is determined by the accelerator-operating-amount determining means 80 to be not smaller than the predetermined extent and the differential portion 11 is determined by the locked-state determining means 82 to be in the non-continuously-variable shifting state.

Specifically, the torque-responsiveness changing means 88 is arranged to change the responsiveness of the input torque $T_{11}$ of the differential portion 11, by changing the responsiveness of the engine torque $T_E$ with respect to the operating amount change $\Delta A_{CC}$ of the accelerator pedal 45 caused by the acceleration-on or acceleration-off (hereinafter "the responsiveness of the engine torque $T_E$" means "the responsiveness of the engine torque $T_E$ with respect to the operating amount change $\Delta A_{CC}$ of the accelerator pedal 45 caused by the acceleration-on or acceleration-off"), namely, by lowering the responsiveness of the engine torque. For example, the torque-responsiveness changing means 88 changes the responsiveness of the engine torque $T_E$, by moderating the change of the engine torque $T_E$ (caused by the acceleration-on or acceleration-off) by a predetermined moderation amount. That is, the torque-responsiveness changing means 88 is arranged to moderate the change of the input torque $T_{11}$ of the differential portion 11 by a predetermined moderation amount, and change the responsiveness of the input torque $T_{11}$ of the differential portion 11, by moderating the change of the engine torque $T_E$ (caused by the acceleration-on or acceleration-off) by the predetermined moderation amount, such that the change of the torque transmitted to the drive wheels 38 is smoothed.

Figure 14A:
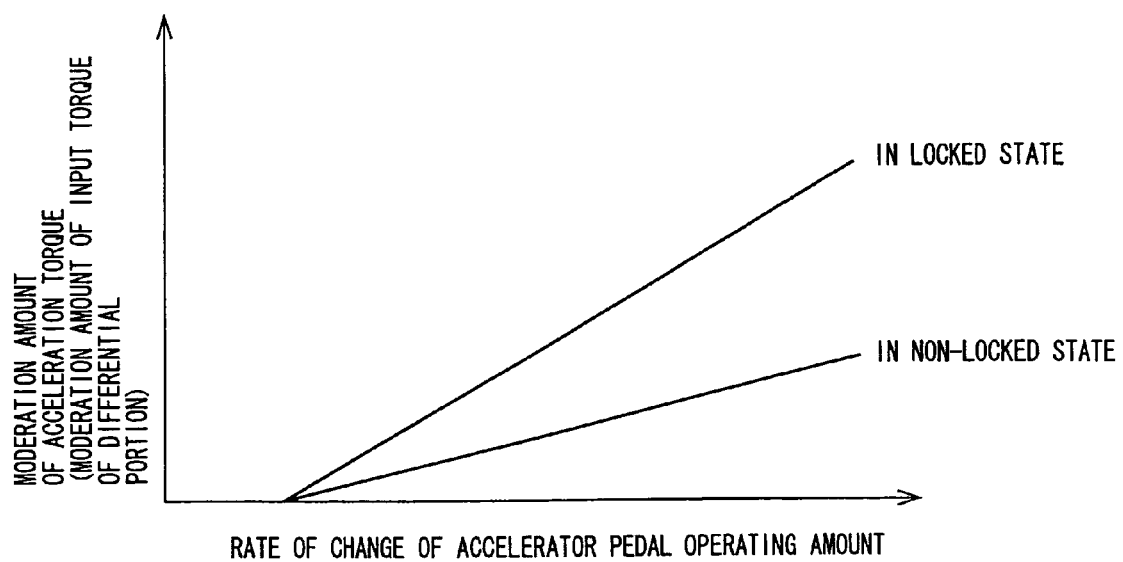
FIG. 14 is an example showing a predetermined relationship between a rate of change in an operating amount of an accelerator pedal and a predetermined moderation amount of an input torque of the differential portion, wherein (a) represents the moderation amount of the input torque with the accelerator pedal being depressed when acceleration of the vehicle is required, while (b) represents the moderation amount of the input torque with the accelerator pedal being released when deceleration of the vehicle is required.
Figure 14B:
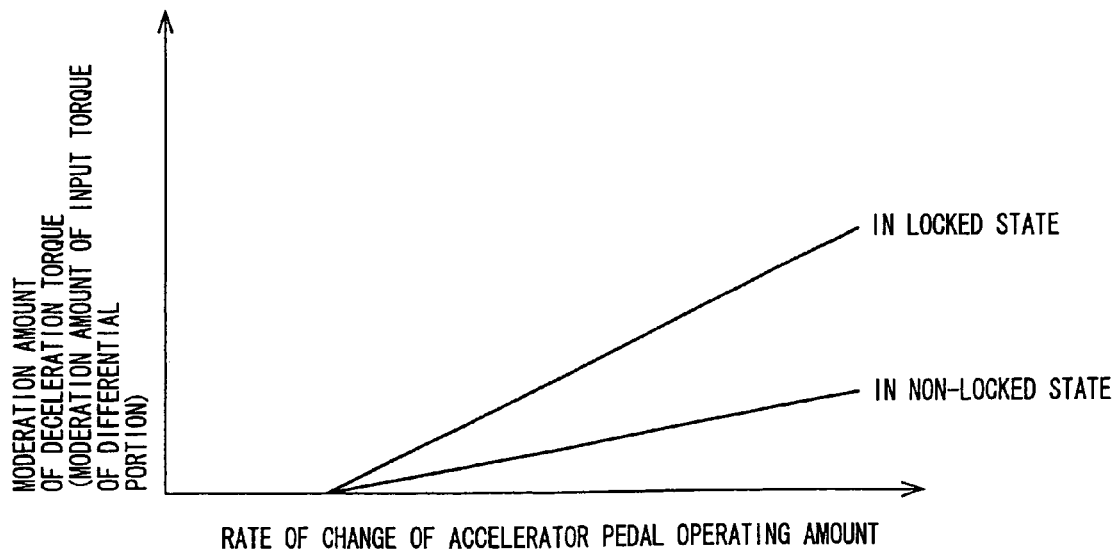

FIG. 14 is an example showing a predetermined relationship between a rate Acc' of the operating amount change $\Delta A_{CC}$ of the accelerator pedal 45 and the predetermined moderation amount of the input torque $T_{11}$ of the differential portion 11, wherein (a) represents the moderation amount of the input torque $T_{11}$ with the accelerator pedal being depressed when acceleration of the vehicle is required, while (b) represents the moderation amount of the input torque $T_{11}$ with the accelerator pedal being released when deceleration of the vehicle is required. Since there is a high possibility that the drive system has a higher shock caused by the acceleration-on or acceleration-off when the differential portion 11 is placed in the non-continuously-variable shifting state (locked state) than when it is placed in the continuously-variable shifting state (non-locked state), the relationship is determined such that the moderation amount is larger in the locked state than in the non-locked state, as shown in FIG. 14. In the non-locked state in which the generation of the shock caused by the acceleration-on or acceleration-off is somewhat restrained, as described above, the input torque $T_{11}$ of the differential portion 11 does not have to be moderated by the torque-responsiveness changing means 88, with the moderation amount being zero.

The torque-responsiveness changing means 88 determines the moderation amount of the input torque $T_{11}$ of the differential portion 11, on the basis of the actual rate Acc' of change of the operating amount $A_{CC}$ of the accelerator pedal 45 and according to the relationship of FIG. 14. The torque-responsiveness changing means 88 moderates the change of the engine torque $T_E$ so as to obtain the thus determined moderation amount. Therefore, when acceleration of the vehicle is required, a rise of the engine torque $T_E$ caused by acceleration-on is moderated by the predetermined moderation amount, such that the change of the drive torque to be transmitted to the drive wheels 38 is smoothed to restrain the amount of generation of the shock of the drive system. Similarly, when deceleration of the vehicle is required, a fall of the engine torque $T_E$ caused by acceleration-off is moderated by the predetermined moderation amount, such that the change of the drive torque to be transmitted to the drive wheels 38 is smoothed to restrain the amount of generation of the shock.

To moderate the change of the engine torque $T_E$ (caused by the acceleration-on or acceleration-off) with the predetermine moderation amount, the torque-responsiveness changing means 88 commands the hybrid control means 52 to adjust the change of the engine torque $T_E$ by controlling the rate of change of the angle of opening of the electronic throttle valve 94, for example. According to the command received from the torque-responsiveness changing means 88, when acceleration of the vehicle is requested, the hybrid control means 52 commands the engine output control device 43 to increase the angle of opening of the electronic throttle valve 94 at a rate that is predetermined for obtaining the predetermined moderation amount, for thereby moderating the rise of the engine torque $T_E$. When deceleration of the vehicle is requested, the hybrid control means 52 commands the engine output control device 43 to reduce the angle of opening of the electronic throttle valve 94 at a rate that is predetermined for obtaining the predetermined moderation amount, for thereby moderating the fall of the engine torque $T_E$.

When acceleration of the vehicle is requested, in particular, the torque-responsiveness changing means 88 may command the hybrid control means 52 to retard the ignition timing of the engine 8, for thereby reducing the rate of rise of the engine torque $T_E$, namely, for moderating the change of the engine torque $T_E$ caused by the acceleration-on. According to the command, the hybrid control means 52 commands, upon request of acceleration of the vehicle, the engine output control device 43 to control the ignition device 99 to retard the ignition timing of the engine 8 by an amount that is predetermined for obtaining the predetermined moderation amount, for thereby moderating the rise of the engine torque $T_E$.

When the differential portion 11 is placed in the non-differential state, the engine 8 is mechanically connected to the drive wheels 38, so that a drive torque of the first electric motor M1 and/or the second electric motor M1 can be added to (or subtracted from) the engine torque $T_E$ to be transmitted to the drive wheels 38. In view of this fact, the torque-responsiveness changing means 88 may be arranged to change the responsiveness of the input torque $T_{11}$ of the differential portion 11, by offsetting the change of the engine torque $T_E$ (caused by the acceleration-on or acceleration-off) by a predetermined amount through the first electric motor M1 and/or the second electric motor M2, in place of or in addition to changing the responsiveness of the engine torque $T_E$.

For example, the torque-responsiveness changing means 88 is arranged to change the responsiveness of the input torque $T_{11}$ of the differential portion 11, by moderating the change of the input torque $T_{11}$ by the moderation amount determined to cause the input torque $T_{11}$ to be smoothly changed, by controlling the torque of the first electric motor M1 and/or the second electric motor M2 to be added to or subtracted from the engine torque $T_E$, for moderating the change of the engine torque $T_E$ caused by the acceleration-on or acceleration-off, so that the drive torque to be transmitted to the drive wheels 38 is smoothly changed.

The torque-responsiveness changing means 88 determines the amount of moderation of the change of the input torque $T_{11}$ of the differential portion 11 on the basis of the detected rate $A_{CC}'$ of change of the operating amount $A_{CC}$ of the accelerator pedal 45 and according to the relationship of FIG. 14, and offsets the change of the engine torque $T_E$ by a predetermined amount through the torque of the first electric motor M1 and/or the second electric motor M2 that are to be added to or subtracted from the engine torque $T_E$, so as to obtain the determined moderation amount. This arrangement permits a predetermined amount of offsetting of the amount of rise of the engine torque $T_E$ caused by the acceleration-on upon request of acceleration of the vehicle, so that the change of the drive torque transmitted to the drive wheels 38 is smoothed whereby the generation of shock is restrained. Further, this arrangement permits a predetermined amount of offsetting of the amount of fall of the engine torque $T_E$ caused by the acceleration-off upon request of deceleration of the vehicle, so that the change of the drive torque transmitted to the drive wheels 38 is smoothed whereby the generation of shock is restrained. Where the change of the input torque $T_{11}$ of the differential portion 11 is smoothed by adding or subtracting the torque of the first electric motor M1 and/or the second electric motor M2 to or from the engine torque $T_E$, in addition to moderating the change of the engine torque $T_E$, the obtained amount of moderation of the change of the input torque $T_{11}$ is a sum of the amount of moderation of the change of the engine torque $T_E$ and the amount of offsetting by the addition or subtraction of the torque of the first electric motor M1 and/or the second electric motor M2.

To obtain the determined amount of moderation of the change of the input torque T11 of the differential portion 11, the torque-responsiveness changing means 88 commands the hybrid control means 52 to adjust the output torque of the first electric motor M1 and/or the second electric motor M2, which is added to or subtracted from the engine torque $T_E$ that is changed as a result of the acceleration-on or acceleration-off. According to the command received from the torque-responsiveness changing means 88, the hybrid control means 52 commands the inverter 58 to control the first electric motor M1 and/or the second electric motor M1 to generate a reverse drive torque by which the engine torque $T_E$ that is changed as a result of the depressing operation of the accelerator pedal 45 to accelerate the vehicle is offset. When the accelerator pedal 45 is released to decelerate the vehicle, the hybrid control means 52 commands the inverter 58 to control the first electric motor M1 and/or the second electric motor M2 to generate a forward drive torque by which the engine torque $T_E$ that is changed as a result of the returning operation of the accelerator pedal 45 is offset.

The change of the input torque $T_{11}$ of the differential portion 11 can be moderated by the torque of the first electric motor M1 and/or the second electric motor M2 only when the differential portion 11 is placed in the locked state (non-differential state). However, a change of the torque transmitted to the power transmitting member 18 can be moderated by the second electric motor M2 even when the differential portion 11 is placed in the non-locked state (differential state). Therefore, the torque-responsiveness changing means 88 may be arranged to moderate the change of the torque transmitted to the power transmitting member 18 by the torque of the second electric motor M2, rather than to moderate the change of the input torque $T_{11}$ of the differential portion 11. In this case, too, the drive torque to be transmitted to the drive wheels 38 can be smoothly changed so as to restrain generation of the shock.

Figure 15:
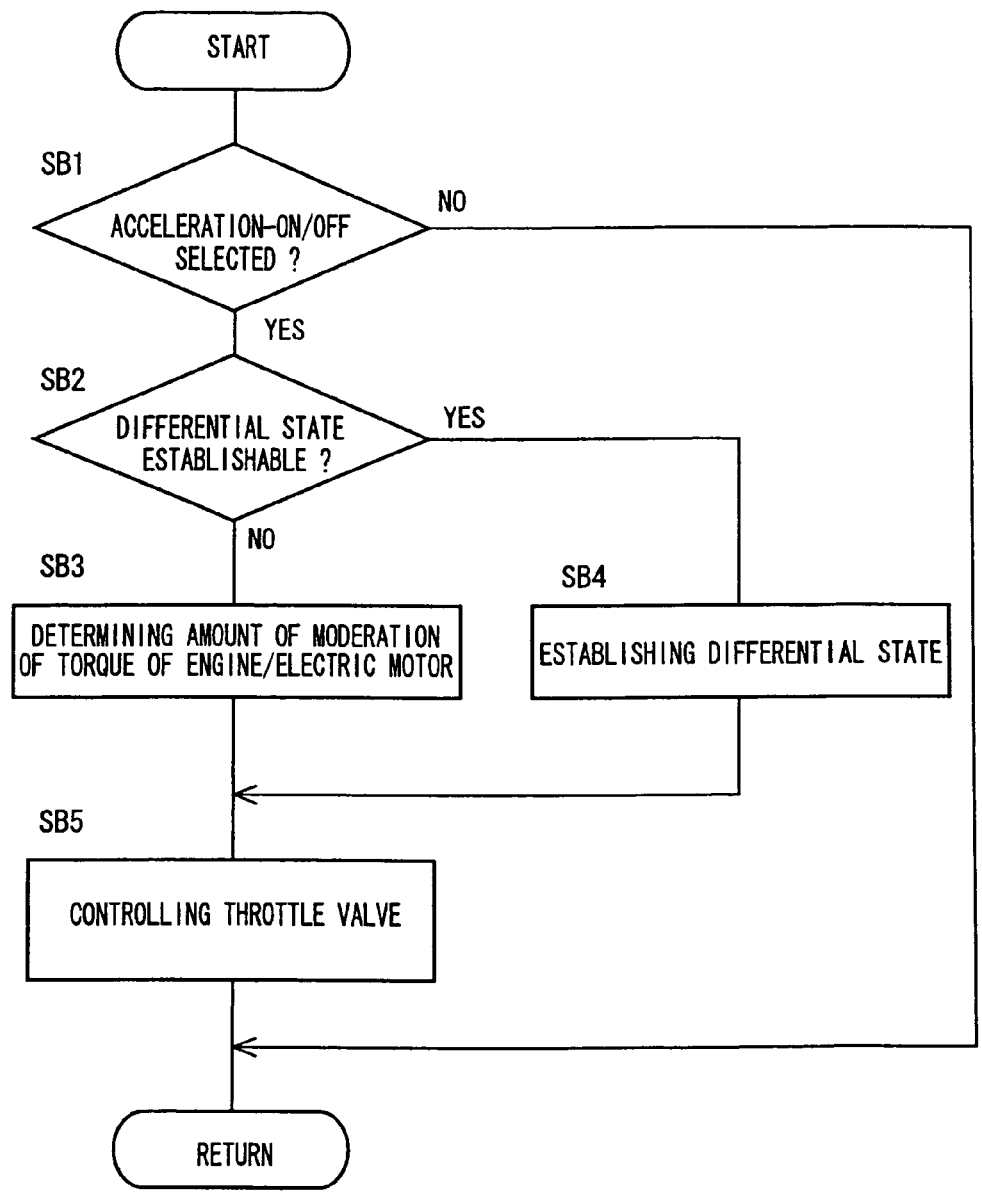
FIG. 15 is a flow chart illustrating a control operation of the electronic control device of FIG. 13, that is, a control routine to change responsiveness of the input torque of the differential portion when acceleration or deceleration of the vehicle is required.

FIG. 15 is a flow chart illustrating a control operation of the electronic control device of FIG. 13, that is, a control routine to change responsiveness of the input torque $T_{11}$ of the differential portion 11 when acceleration or deceleration of the vehicle is required. This control routine is executed with an extremely short cycle time of about several milliseconds to several tens of milliseconds.

Figure 16:
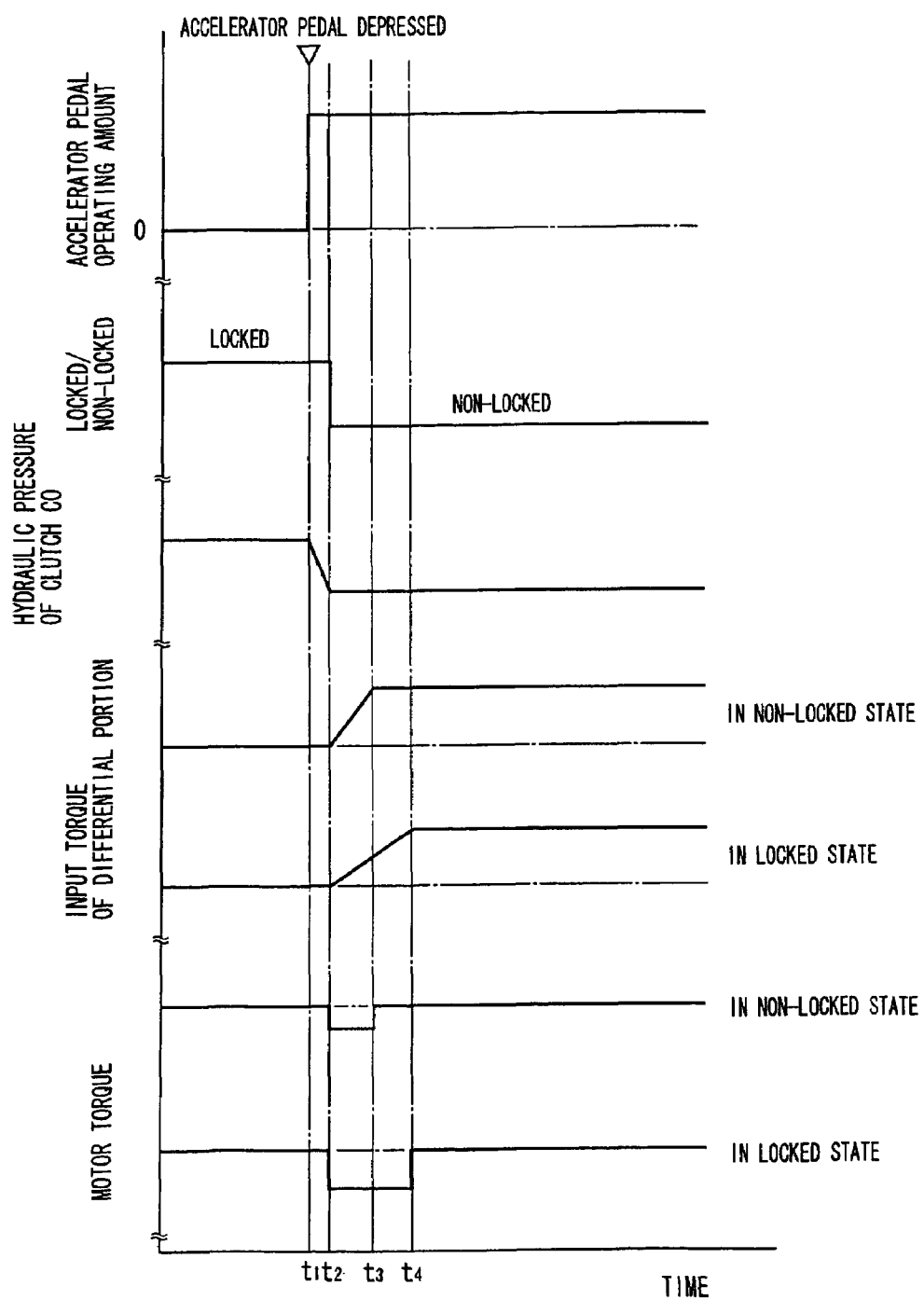
FIG. 16 is a time chart for explaining the control operation illustrated by the flow chart of FIG. 15, for moderating change in the input torque of the differential portion when the accelerator pedal is operatively depressed while the differential portion is placed in the step-variable shifting state (locked state), wherein the operation during the locked state of the differential portion and the operation during the non-locked state of the differential portion can be compared.

FIG. 16 is a time chart for explaining the control operation illustrated by the flow chart of FIG. 15, for moderating change of the input torque $T_{11}$ of the differential portion 11 when the accelerator pedal 45 is operatively depressed while the differential portion 11 is placed in the step-variable shifting state (locked state), wherein the operation during the locked state of the differential portion and the operation during the non-locked state of the differential portion can be compared.

Figure 17:
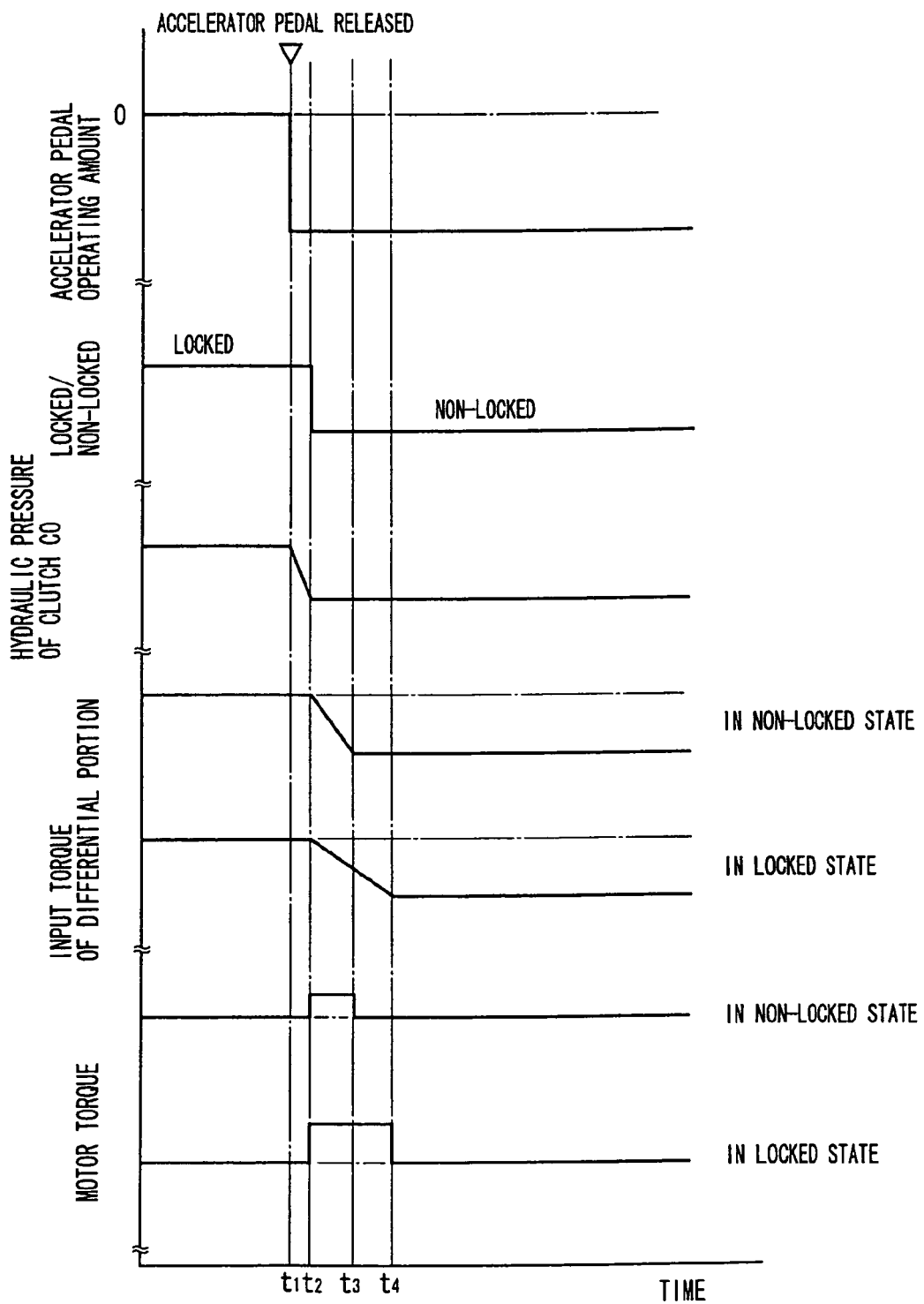
FIG. 17 is a time chart for explaining the control operation illustrated by the flow chart of FIG. 15, for moderating change in the input torque of the differential portion when the accelerator pedal is operatively returned while the differential portion is placed in the step-variable shifting state (locked state), wherein the operation during the locked state of the differential portion and the operation during the non-locked state of the differential portion can be compared.

FIG. 17 is a time chart for explaining the control operation illustrated by the flow chart of FIG. 15, for moderating change of the input torque $T_{11}$ of the differential portion 11 when the accelerator pedal 45 is operatively returned while the differential portion 11 is placed in the step-variable shifting state (locked state), wherein the operation during the locked state of the differential portion and the operation during the non-locked state of the differential portion can be compared.

The control routine is initiated with SB1 corresponding to the accelerator-operating-amount determining means 80, to determine whether the acceleration-on or acceleration-off has been selected. The determination as to whether the acceleration-on has been selected is made by seeing if the amount ΔAcc of positive change in the operating amount of the accelerator pedal 45 made by the depressing operation of the accelerator pedal 45 is not smaller than the predetermined threshold Acc1. The determination as to whether the acceleration-off has been selected is made by seeing if the amount ΔAcc of negative change in the operating amount of the accelerator pedal 45 made by the returning operation of the accelerator pedal 45 is not smaller than the predetermined threshold Acc2.

In FIG. 16, a point $t_1$ of time is a point of time at which the accelerator pedal 45 is subjected to a depressing operation (acceleration-on) while the differential portion 11 is placed in the step-variable shifting state (locked state).

In FIG. 17, a point $t_1$ of time is a point of time at which the accelerator pedal 45 is subjected to a returning operation (acceleration-off) while the differential portion 11 is placed in the step-variable shifting state (locked state).

If a negative decision is obtained in the SB1, one cycle of execution of the routine is terminated. If an affirmative decision is obtained in the SB1, the control flow goes to SB2 corresponding to the differential-state establishment feasibility determining means 86, to determine whether the differential portion 11 can be switched by the switching control means 50 from the non-continuously-variable shifting state (step-variable shifting state) to the continuously-variable shifting state (differential state), for example, by seeing if the engaged switching clutch C0 or brake B0 can be released according to command of the switching control means 50.

If a negative decision is obtained in the SB2, the control flow goes to SB3 corresponding to the torque-responsiveness changing means 88, to determine the amount of moderation of a change of the input torque $T_{11}$ of the differential portion 11 during the locked state, for example, on the basis of the actual rate $A_{CC}'$ of change of the operating amount $A_{CC}$ of the accelerator pedal 45, and according to the relationship of FIG. 14. Namely, in the SB3 is implemented to determine the amount of moderation of a change of the engine torque $T_E$, and/or the torque of the first electric motor M1 and/or the second electric motor M2 to be added to or subtracted from the engine torque $T_E$.

If an affirmative decision is obtained in the SB2, the control flow goes to SB4 corresponding to the switching control means 50, to command the hydraulic control unit 42 to release the engaged switching clutch C0 or brake B0, for temporarily placing the differential portion 11 in the continuously-variable shifting state (differential state), for thereby removing the limitation imposed on the operation of the differential portion 11 as the electrically controlled continuously variable transmission. Further, where the change of the input torque $T_{11}$ of the differential portion 11 is moderated, the SB4 is implemented by the torque-responsiveness changing means 88, to determine the amount of moderation of a change of the input torque $T_{11}$ of the differential portion 11 during the non-locked state, for example, on the basis of the actual rate $A_{CC}'$ of change of the operating amount $A_{CC}$ of the accelerator pedal 45, and according to the relationship of FIG. 14. That is, torque-responsiveness changing means 88 determines the amount of moderation of the change of the engine torque $T_E$.

In FIG. 16, the point $t_2$ of time is a point of time at which the differential portion (continuously-variable transmission portion) 11 is switched from the non-continuously-variable shifting state (locked state) to the continuously-variable shifting state (non-locked state).

In FIG. 17, the point $t_2$ of time is a point of time at which the differential portion (continuously-variable transmission portion) 11 is switched from the non-continuously-variable shifting state (locked state) to the continuously-variable shifting state (non-locked state).

The SB3 or SB4 is followed by SB5 corresponding to the torque-responsiveness changing means 88 and the hybrid control means 52, to command the hybrid control means 52 to control the rate of change of the angle of opening of the electronic throttle valve 94, for thereby adjusting the rate of change of the engine torque $T_E$. According to the command from the torque-responsiveness changing means 88, the hybrid control means 52 commands the engine output control device 43 to control the electronic throttle valve 96, such that the angle of opening is increased at a rate determined by the determined amount of moderation, to moderate a rise of the engine torque $T_E$ when acceleration of the vehicle is required, and such that the angle of opening is reduced at a rate determined by the determined amount of moderation, to moderate a fall of the engine torque $T_E$ when deceleration of the vehicle is required.

When the differential portion 11 is placed in the locked state, the hybrid control means 52 is commanded to adjust the output torque of the first electric motor M1 and/or the second electric motor M2, in place of or in addition to changing the responsiveness of the engine torque $T_E$. According to the command, when acceleration of the vehicle is required, the hybrid control means 52 commands the inverter 58 to control the first electric motor M1 and/or the second electric motor M1 to generate a reverse drive torque such that the change of the engine torque $T_E$ is offset by a predetermined amount that is predetermined for obtaining a predetermined moderation amount. Further, according to the command, when deceleration of the vehicle is required, the hybrid control means 52 commands the inverter 58 to control the first electric motor M1 and/or the second electric motor M1 to generate a drive torque such that the change of the engine torque $T_E$ is offset by a predetermined amount that is predetermined for obtaining a predetermined moderation amount.

Further, when acceleration of the vehicle is required, the hybrid control means 52 may be commanded to retard the ignition timing of the engine 8, in place of or in addition to controlling the electronic throttle valve 96 to adjust the rate of change of the engine torque $T_E$, for moderating the rise of the engine torque $T_E$. In this case, the hybrid control means 52 controls the ignition device 99 to retard the ignition timing of the engine 8, by an amount that is predetermined for obtaining the predetermined moderation amount, for thereby moderating the rise of the engine torque $T_E$.

When acceleration of the vehicle is required while the differential portion 11 is placed in the non-locked state, the rise of the input torque $T_{11}$ of the differential portion 11 is moderated during a time period from the point $t_2$ of time to the point $t_3$ of time of FIG. 16. While the differential portion 11 is placed in the locked state, the rise of the engine torque $T_E$ is moderated by a moderation amount larger than while the differential portion 11 is placed in the non-locked state. Therefore, in the locked-state of the differential portion 11, the rise of the input torque $T_{11}$ is smoothed during a time period from the point $t_2$ of time to the point $t_4$ of time of FIG. 16, such that the input torque $T_{11}$ rises at a lower rate than in the non-locked state of the differential portion 11. In the example of FIG. 16, the change of the input torque $T_{11}$ of the differential portion 11 (or change of the torque transmitted to the power transmitting member 18) is moderated by the reverse drive torque generated by the first electric motor M1 and/or the second electric motor M2, in place of or in addition to the moderation of the change of the engine torque $T_E$.

When deceleration of the vehicle is required while the differential portion 11 is placed in the non-locked state, the fall of the input torque $T_{11}$ of the differential portion 11 is moderated during a time period from the point $t_2$ of time to the point $t_3$ of time of FIG. 17. While the differential portion 11 is placed in the locked state, the fall of the engine torque $T_E$ is moderated by a moderation amount larger than while the differential portion 11 is placed in the non-locked state. Therefore, in the locked-state of the differential portion 11, the fall of the input torque $T_{11}$ is smoothed during a time period from the point $t_2$ of time to the point $t_4$ of time of FIG. 17, such that the input torque $T_{11}$ falls at a lower rate than in the non-locked state of the differential portion 11. In the example of FIG. 17, the change of the input torque $T_{11}$ of the differential portion 11 (or change of the torque transmitted to the power transmitting member 18) is moderated by the drive torque generated by the first electric motor M1 and/or the second electric motor M2, in place of or in addition to the moderation of the change of the engine torque $T_E$.

As described above, in the present embodiment, where the switching control means 50 cannot remove the limitation imposed on the operation of the differential portion 11 as the electrically controlled continuously variable transmission, upon request of acceleration or deceleration of the vehicle, namely, where the switching control means 50 cannot place the differential portion 11 in the continuously-variable shifting state, upon request of acceleration or deceleration of the vehicle, the torque-responsiveness changing means 88 changes responsiveness of the input torque $T_{11}$ of the differential portion 11. In this arrangement, even where the change of the engine torque $T_E$ is transmitted directly to the drive wheels 38 due to failure of removal of the limitation imposed on the on the operation of the differential portion 11 as the electrically controlled continuously variable transmission when the acceleration or deceleration of the vehicle is required, it is possible to restrain generation of the shock upon request of acceleration or deceleration of the vehicle, since the change of the torque transmitted to the drive wheels 38 is smoothed.

Further, in the present embodiment, the responsiveness of the engine torque $T_E$ is changed by the torque-responsiveness changing means 88, namely, the change of the engine torque $T_E$ is moderated by a predetermined moderation amount, so that the responsiveness of the input torque $T_{11}$ of the differential portion 11 is changed, namely, the change of the input torque $T_{11}$ of the differential portion 11 is moderated by a predetermined moderation amount. In this arrangement, the change of the engine torque $T_E$ is smoothed whereby the change of the input torque $T_{11}$ of the differential portion 11 is smoothed, so that the change of the torque transmitted to the drive wheels 38 is smoothed whereby the generation of the shock upon request of acceleration or deceleration of the vehicle is restrained.

Further, in the present embodiment, the torque-responsiveness changing means 88 is arranged to offset the change of the engine torque $T_E$, by the torque of the first electric motor M1 and/or the second electric motor M2, so that the responsiveness of the input torque $T_{11}$ of the differential portion 11 is changed, namely, the change of the input torque $T_{11}$ of the differential portion 11 is moderated by a predetermined moderation amount. Therefore, the change of the torque transmitted to the drive wheels 38 is smoothed whereby the generation of the shock upon request of acceleration or deceleration of the vehicle is restrained.

Embodiment 3

Figures 18, 19:
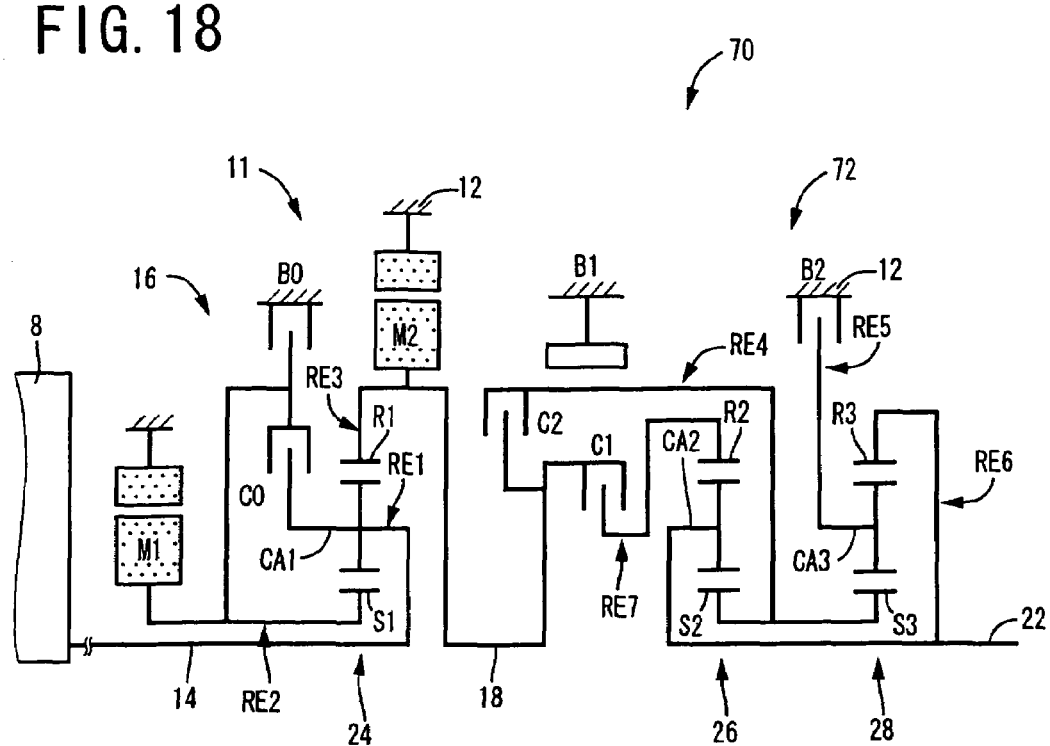
FIG. 18 is a schematic view corresponding to that of FIG. 1, and showing an arrangement of a drive system of a hybrid vehicle according to another embodiment of the invention.
FIG. 19 is a table corresponding to that of FIG. 2, and indicating shifting actions of the hybrid vehicle drive system of FIG. 18, which is operable in a selected one of a continuously-variable shifting state and a step-variable shifting state, in relation to different combinations of operating states of hydraulically operated frictional coupling devices to effect the respective shifting actions.
Figure 20:
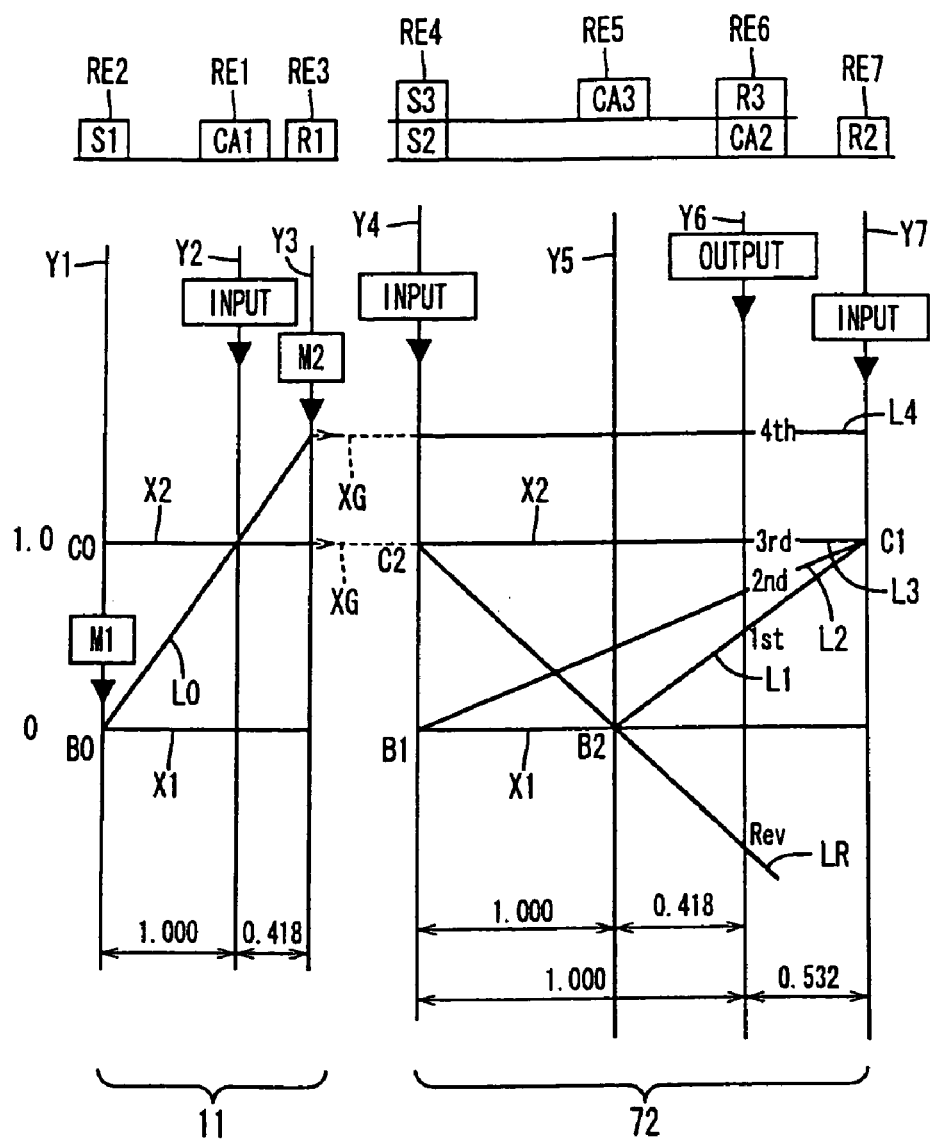
FIG. 20 is a collinear chart corresponding to that of FIG. 3, and indicating relative rotational speeds of the hybrid vehicle drive system of FIG. 18 operated in the step-variable shifting state, in different gear positions of the drive system.

FIG. 18 is a schematic view for explaining an arrangement of a transmission mechanism 70 in still another embodiment of this invention. FIG. 19 a table indicating a relationship between the gear positions of the transmission mechanism 70 and different combinations of engaged states of the hydraulically operated frictional coupling devices for respectively establishing those gear positions. FIG. 20 is a collinear chart for explaining a shifting operation of the transmission mechanism 70.

The transmission mechanism 70 includes the differential portion 11 having the first electric motor M1, power distributing mechanism 16 and second electric motor M2, as in the preceding embodiments. The transmission mechanism 70 further includes an automatic transmission portion 72 having three forward drive positions. The automatic transmission portion 72 is disposed between the differential portion 11 and the output shaft 22 and is connected in series to the differential portion 11 and output shaft 22 through the power transmitting member 18. The power distributing mechanism 16 includes the single-pinion type first planetary gear set 24 having a gear ratio ρ1 of about 0.418, for example, and the switching clutch C0 and the switching brake B0. The automatic transmission portion 72 includes the single-pinion type second planetary gear set 26 having a gear ratio ρ2 of about 0.532, for example, and the single-pinion type third planetary gear set 28 having a gear ratio ρ3 of about 0.418, for example. The second sun gear S2 of the second planetary gear set 26 and the third sun gear S3 of the third planetary gear set 28 are integrally fixed to each other as a unit, selectively connected to the power transmitting member 18 through the second clutch C2, and selectively fixed to the casing 12 through the first brake B1. The second carrier CA2 of the second planetary gear set 26 and the third ring gear R3 of the third planetary gear set 28 are integrally fixed to each other and fixed to the output shaft 22. The second ring gear R2 is selectively connected to the power transmitting member 18 through the first clutch C1, and the third carrier CA3 is selectively fixed to the casing 12 through the second brake B2.

In the transmission mechanism 70 constructed as described above, one of a first gear position (first speed position) through a fourth gear position (fourth speed position), a reverse gear position (rear-drive position) and a neural position is selectively established by engaging actions of a corresponding combination of the frictional coupling devices selected from the above-described switching clutch C0, first clutch C1, second clutch C2, switching brake B0, first brake B1 and second brake B2, as indicated in the table of FIG. 19. Those gear positions have respective speed ratios γ (=input shaft rotational speed $N_{IN}$/output shaft rotational speed $N_{OUT}$) which change as geometric series. In particular, it is noted that the power distributing mechanism 16 provided with the switching clutch C0 and brake B0 can be selectively placed by engagement of the switching clutch C0 or switching brake B0, in the fixed-speed-ratio shifting state in which the mechanism 16 is operable as a transmission having fixed speed ratio or ratios, as well as in the continuously-variable shifting state in which the mechanism 16 is operable as the continuously variable transmission described above. In the present transmission mechanism 70, therefore, a step-variable transmission is constituted by the transmission portion 20, and the differential portion 11 which is placed in the fixed-speed-ratio shifting state by engagement of the switching clutch C0 or switching brake B0. Further, a continuously variable transmission is constituted by the transmission portion 20, and the differential portion 11 which is placed in the continuously-variable shifting state, with none of the switching clutch C0 and brake B0 being engaged. In other words, the transmission mechanism 70 is switched to the step-variable shifting state, by engaging one of the switching clutch C0 and switching brake B0, and to the continuously-variable shifting state by releasing both of the switching clutch C0 and switching brake B0.

Where the transmission mechanism 70 functions as the step-variable transmission, for example, the first gear position having the highest speed ratio γ1 of about 2.804, for example, is established by engaging actions of the switching clutch C0, first clutch C1 and second brake B2, and the second gear position having the speed ratio γ2 of about 1.531, for example, which is lower than the speed ratio γ1, is established by engaging actions of the switching clutch C0, first clutch C1 and first brake B1, as indicated in FIG. 19. Further, the third gear position having the speed ratio γ3 of about 1.000, for example, which is lower than the speed ratio γ2, is established by engaging actions of the switching clutch C0, first clutch C1 and second clutch C2, and the fourth gear position having the speed ratio γ4 of about 0.705, for example, which is lower than the speed ratio γ3, is established by engaging actions of the first clutch C1, second clutch C2, and switching brake B0. Further, the reverse gear position having the speed ratio γR of about 2.393, for example, which is intermediate between the speed ratios γ1 and γ2, is established by engaging actions of the second clutch C2 and the second brake B2. The neutral position N is established by engaging only the switching clutch C0.

When the transmission mechanism 70 functions as the continuously-variable transmission, on the other hand, the switching clutch C0 and the switching brake B0 are both released, as indicated in FIG. 19, so that the differential portion 11 functions as the continuously variable transmission, while the automatic transmission portion 72 connected in series to the differential portion 11 functions as the step-variable transmission, whereby the speed of the rotary motion transmitted to the automatic transmission portion 72 placed in one of the first through third gear positions, namely, the rotational speed of the power transmitting member 18 is continuously changed, so that the speed ratio of the transmission mechanism 10 when the automatic transmission portion 72 is placed in one of those gear positions is continuously variable over a predetermined range. Accordingly, the total speed ratio of the automatic transmission portion 72 is continuously variable across the adjacent gear positions, whereby the overall speed ratio γT of the transmission mechanism 70 as a whole is continuously variable.

The collinear chart of FIG. 20 indicates, by straight lines, a relationship among the rotational speeds of the rotary elements in each of the gear positions of the transmission mechanism 70, which is constituted by the differential portion 11 functioning as the continuously-variable shifting portion or first shifting portion, and the automatic transmission portion 72 functioning as the step-variable shifting portion or second shifting portion. The collinear chart of FIG. 21 indicates the rotational speeds of the individual elements of the power distributing mechanism 16 11 when the switching clutch C0 and brake B0 are both released, and the rotational speeds of those elements when the switching clutch C0 or brake B0 is engaged, as in the preceding embodiments.

In FIG. 20, four vertical lines Y4, Y5, Y6 and Y7 corresponding to the automatic transmission portion 72 and arranged in the rightward direction respectively represent the relative rotational speeds of a fourth rotary element (fourth element) RE4 in the form of the second and third sun gears S2, S3 integrally fixed to each other, a fifth rotary element (fifth element) RE5 in the form of the third carrier CA3, a sixth rotary element (sixth element) RE6 in the form of the second carrier CA2 and third ring gear R3 that are integrally fixed to each other, and a seventh rotary element (seventh element) RE7 in the form of the second ring gear R2. In the automatic transmission portion 72, the fourth rotary element RE4 is selectively connected to the power transmitting member 18 through the second clutch C2, and is selectively fixed to the casing 12 through the first brake B1, and the fifth rotary element RE5 is selectively fixed to the casing 12 through the second brake B2. The sixth rotary element RE6 is fixed to the output shaft 22 of the automatic transmission portion 72, and the seventh rotary element RE7 is selectively connected to the power transmitting member 18 through the first clutch C1.

When the first clutch C1 and the second brake B2 are engaged, the automatic transmission portion 72 is placed in the first gear position. The rotational speed of the output shaft 22 in the first gear position is represented by a point of intersection between the vertical line Y6 indicative of the rotational speed of the sixth rotary element RE6 fixed to the output shaft 22 and an inclined straight line L1 which passes a point of intersection between the vertical line Y7 indicative of the rotational speed of the seventh rotary element RE7 (R2) and the horizontal line X2, and a point of intersection between the vertical line Y5 indicative of the rotational speed of the fifth rotary element RE5 (CA3) and the horizontal line X1, as indicated in FIG. 20. Similarly, the rotational speed of the output shaft 22 in the second gear position established by the engaging actions of the first clutch C1 and first brake B1 is represented by a point of intersection between an inclined straight line L2 determined by those engaging actions and the vertical line Y6 indicative of the rotational speed of the sixth rotary element RE6 (CA2, R3) fixed to the output shaft 22. The rotational speed of the output shaft 22 in the third speed position established by the engaging actions of the first clutch C1 and second clutch C2 is represented by a point of intersection between an inclined straight line L3 determined by those engaging actions and the vertical line Y6 indicative of the rotational speed of the sixth rotary element RE6 fixed to the output shaft 22. In the first through third gear positions in which the switching clutch C0 is placed in the engaged state, the seventh rotary element RE7 is rotated at the same speed as the engine rotational speed $N_E$, with the drive force received from the differential portion 11. When the switching clutch B0 is engaged in place of the switching clutch C0, the sixth rotary element RE6 is rotated at a speed higher than the engine rotational speed $N_E$, with the drive force received from the differential portion 11. The rotational speed of the output shaft 22 in the fourth gear position established by the engaging actions of the first clutch C1, second clutch C2 and switching brake B0 is represented by a point of intersection between a horizontal line L4 determined by those engaging actions and the vertical line Y6 indicative of the rotational speed of the sixth rotary element RE6 fixed to the output shaft 22.

The transmission mechanism 70 according to the present embodiment is also constituted by the differential portion 11 functioning as the continuously-variable shifting portion or first shifting portion, and the automatic transmission portion 72 functioning as the step-variable shifting portion or second shifting portion, and the output shaft 22 is provided with the third electric motor M3, so that the present transmission mechanism 70 has advantages similar to those of the preceding embodiments.

Figure 21:
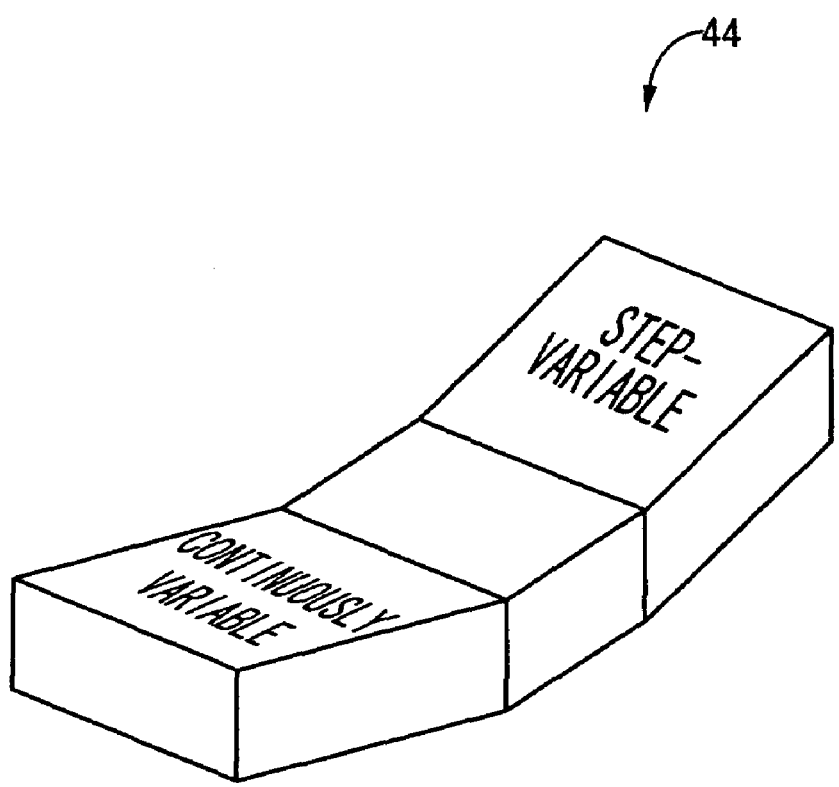
FIG. 21 is an example of a manually operable shifting-state selecting device in the form of a seesaw switch operated by a user to select the shifting state.

FIG. 21 shows an example of a seesaw switch 44 (hereinafter referred to as "switch 44") functioning as a shifting-state selecting device manually operable to select the differential state (non-locked state) or non-differential state (locked state) of the power distributing mechanism 16, that is, to select the continuously-variable shifting state or step-variable shifting state of the transmission mechanism 10. This switch 44 permits the user to select the desired shifting state during running of the vehicle. The switch 44 has a continuously-variable-shifting running button labeled "STEP-VARIABLE" for running of the vehicle in the continuously-variable shifting state, and a step-variable-shifting running button labeled "CONTINUOUSLY-VARIABLE" for running of the vehicle in the step-variable shifting state, as shown in FIG. 21. When the continuously-variable-shifting running button is depressed by the user, the switch 44 is placed in a continuously-variable shifting position for selecting the continuously-variable shifting state in which the transmission mechanism 10 is operable as the electrically controlled continuously variable transmission. When the step-variable-shifting running button is depressed by the user, the switch 44 is placed in a step-variable shifting position for selecting in the step-variable shifting state in which the transmission mechanism is operable as the step-variable transmission.

In the preceding embodiments, the shifting state of the transmission mechanism 10 is automatically switched on the basis of the vehicle condition and according to the switching boundary line map shown in FIG. 6 by way of example. However, the shifting state of the transmission mechanism 10, 70 may be switched by a manual operation of the switch 44, in place of or in addition to the automatic switching operation. Namely, the switching control means 50 may be arranged to selectively place the transmission mechanism 10 in the continuously-variable shifting state or the step-variable shifting state, depending upon whether the switch 44 is placed in its continuously-variable shifting position or step-variable shifting position. For instance, the user manually operates the switch 44 to place the transmission mechanism 10 in the continuously-variable shifting state when the user likes the transmission mechanism 10 to operate as a continuously variable transmission or wants to improve the fuel economy of the engine, or alternatively in the step-variable shifting state when the user likes a rhythmical change of the engine rotational speed as a result of a shifting action of the step-variable transmission.

The switch 44 may have a neutral position in which none of the continuously-variable and step-variable shifting states are selected. In this case, the switch 44 may be placed in its neutral position when the user has not selected the desired shifting state or likes the transmission mechanism 10 to be automatically placed in one of the continuously-variable and step-variable shifting states.

Where the shifting state of the transmission mechanism 10 is not automatically selected, but is manually selected by a manual operation of the switch 44, the S2 in the flow chart of FIG. 10 is formulated such that the determination as to whether the power distributing mechanism 16 is placed in the locked state, that is, whether the differential portion 11 is placed in the non-continuously-variable shifting state, is effected depending upon whether the switch 44 has been operated to select the locked state of the power distributing mechanism 16 or the non-continuously-variable shifting state of the transmission mechanism 10.

While the preferred embodiments of this invention have been described in detail by reference to the accompanying drawings, it is to be understood that the present invention may be otherwise embodied.

In FIGS. 10, 11 and 12 of the preceding embodiment, there has been described a case where a shifting action of the automatic transmission portion 20 is carried out upon request of acceleration or deceleration of the vehicle that is not smaller than the predetermined extent. The present invention is applicable to also a case where a shifting action of the automatic transmission portion 20 is not carried out upon request of acceleration or deceleration of the vehicle that is not smaller than the predetermined extent.

In the preceding embodiment, the locked-state determining means 82 (in the step S2 of FIG. 10) is arranged to determine whether the power distributing mechanism 16 is placed in the locked state, by seeing if the vehicle condition is in the step-variable shifting region, on the basis of the condition of the vehicle and according to the shifting boundary line map indicated in FIG. 6. However, the locked-state determining means 82 may be arranged to determine whether the power distributing mechanism 16 is placed in the locked state, based on the determination by the switching control means 50 as to whether the transmission mechanism 10 is in the step-variable shifting region or the continuously-variable shifting region.

In the preceding embodiment, the first electric motor M1 and/or the second electric motor M2 is/are used to generate a drive torque to be added to or subtracted to the engine torque $T_E$, to offset the amount of change of the engine torque $T_E$ caused by the acceleration-on or acceleration-off, for thereby changing the responsiveness of the input torque $T_{11}$ of the differential portion 11 under the control of the torque-responsiveness changing means 88. However, a third electric motor M3 operatively connectable to the engine 8 may be used to generate the drive torque to offset the amount of change of the engine torque $T_E$ caused by the acceleration-on or acceleration-off, for thereby changing the responsiveness of the input torque $T_{11}$ of the differential portion 11. In this case, the responsiveness of the input torque $T_{11}$ can be changed by offsetting the change of the engine torque $T_E$ by the torque of the third electric motor M3, even while the differential portion 11 is placed in the continuously-variable shifting state. The third electric motor M3 may be an engine starter motor.

In the preceding embodiments, the amount of moderation of a change of the input torque $T_{11}$ of the differential portion 11 is determined by the torque-responsiveness changing means 88, on the basis of the relationship of FIG. 10 between the rate $A_{CC}'$ of change of the operating amount $A_{CC}$ of the accelerator pedal 45 and the amount of moderation of the change of the input torque $T_{11}$. However, the rate $A_{cc}'$ of change of the operating amount $A_{CC}$ of the accelerator pedal 45 may be replaced by a rate of change of the engine torque $T_E$ or a rate of change of the angle of opening $\theta_{TH}$ of the electronic throttle valve 96.

In the illustrated embodiments, the transmission mechanism 10, 70 is switchable between its continuously-variable shifting state and the step-variable shifting states by placing the differential portion 11 (power distributing mechanism 16) selectively in one of its differential state in which the differential portion is operable as the electrically controlled continuously variable transmission, and the non-differential state (locked state) in which the differential portion 11 is not operable as the electrically controlled continuously variable transmission. However, the differential portion 11 placed in its differential state can be operable as the step-variable transmission the speed ratio of which is variable in steps rather than continuously. In other words, the differential and non-differential states of the differential portion 11 do not respectively correspond to the continuously-variable and step-variable shifting states of the transmission mechanism 10, 70, and therefore the differential portion 11 need not be switchable between the continuously-variable and step-variable shifting states. The present invention is applicable to any transmission mechanism wherein the transmission mechanism 10, 70 (differential portion 11, power distributing mechanism 16) is switchable between the differential and non-differential states.

In the power distributing mechanism 16 in the illustrated embodiments, the first carrier CA1 is fixed to the engine 8, and the first sun gear S1 is fixed to the first electric motor M1 while the first ring gear R1 is fixed to the power transmitting member 18. However, this arrangement is not essential. The engine 8, first electric motor M1 and power transmitting member 18 may be fixed to any other elements selected from the three elements CA1, S1 and R1 of the first planetary gear set 24.

While the engine 8 is directly fixed to the input shaft 14 in the illustrated embodiments, the engine 8 may be operatively connected to the input shaft 14 through any suitable member such as gears and a belt, and need not be disposed coaxially with the input shaft 14.

In the illustrated embodiments, the first electric motor M1 and the second electric motor M2 are disposed coaxially with the input shaft 14, and are fixed to the first sun gear S1 and the power transmitting member 18, respectively. However, this arrangement is not essential. For example, the first and second electric motors M1, M2 may be operatively connected to the first sun gear S1 and the power transmitting member 18 or output shaft 20, respectively, through gears or belts. Further, the second electric motor M2 connected to the power transmitting member 18 in the illustrated embodiment may be connected to the output shaft 22 or any of the rotary elements of the automatic transmission portion 20, 72. The second electric motor M2 connected to the power transmitting member 18 or output shaft 22 may be considered to be disposed in a power transmitting path between the power transmitting member 18 and the drive wheels 38.

Although the power distributing mechanism 16 in the illustrated embodiments is provided with the switching clutch C0 and the switching brake B0, the power distributing mechanism 16 need not be provided with both of the switching clutch C0 and brake B0. While the switching clutch C0 is provided to selectively connect the first sun gear S1 and the first carrier CA1 to each other, the switching clutch C0 may be provided to selectively connect the first sun gear S1 and the first ring gear R1 to each other, or selectively connect the first carrier CA1 and the first ring gear R1. Namely, the switching clutch C0 may be arranged to connect any two elements of the three elements of the first planetary gear set 24.

While the switching clutch C0 is engaged to establish the neutral position N in the transmission mechanism 10, 70 in the illustrated embodiments, the switching clutch C0 need not be engaged to establish the neutral position.

The hydraulically operated frictional coupling devices used as the switching clutch C0, switching brake B0, etc. in the illustrated embodiments may be replaced by a coupling device of a magnetic-power type, an electromagnetic type or a mechanical type, such as a powder clutch (magnetic powder clutch), an electromagnetic clutch and a meshing type dog clutch.

In the illustrated embodiments, the automatic transmission portion 20, 72 is disposed in the power transmitting path between the drive wheels 38, and the power transmitting member 18 which is the output member of the differential portion 11 or power distributing mechanism 16. However, the automatic transmission portion 20, 72 may be replaced by any other type of power transmitting device such as: a continuously variable transmission (CVT) which is a kind of an automatic transmission; and an automatic transmission which is a permanent-mesh parallel-two-axes type transmission well known as a manual transmission and which is automatically shifted by select cylinders and shift cylinders. Where the continuously variable transmission (CVT) is provided, the transmission mechanism as a whole is placed in the step-variable shifting state when the power distributing mechanism 16 is placed in the fixed-speed-ratio shifting state. The step-variable shifting state is defined as a state in which power is transmitted primarily through a mechanical power transmitting path, without power transmission through an electric path. The continuously variable transmission may be arranged to establish a plurality of predetermined fixed speed ratios corresponding to those of the gear positions of a step-variable transmission, according to stored data indicative of the predetermined speed ratios. The present invention is applicable also to a drive system which does not include the automatic transmission portion 10, 72.

While the automatic transmission portion 20, 72 in the preceding embodiments is connected in series to the differential portion 11 through the power transmitting member 18, the automatic transmission portion 20, 72 may be mounted on and disposed coaxially with a counter shaft which is parallel to the input shaft 14. In this case, the differential portion 11 and the automatic transmission portion 20, 72 are operatively connected to each other through a suitable power transmitting device or a set of two power transmitting members such as a pair of counter gears, and a combination of a sprocket wheel and a chain.

The power distributing mechanism 16 provided as a differential mechanism in the preceding embodiments may be replaced by a differential gear device including a pinion rotated by the engine 8, and a pair of bevel gears which mesh with the pinion and which are respectively operatively connected to the first electric motor M1 and the power transmitting member 18.

While the power distributing mechanism 16 in the illustrated embodiments is constituted by one planetary gear set 24, it may be constituted by two or more planetary gear sets so that the power distributing mechanism 16 is operable as a transmission having three or more gear positions in the non-differential state (fixed-speed-ratio shifting state). Each planetary gear set of the power distributing mechanism need not be a single-pinion type, but may be a double-pinion type.

In the illustrated embodiments, the manually operable shifting device 46 is provided with the shift lever 48 manually operable to select one of a plurality of operating positions. However, the shift lever 48 may be replaced by pushbutton switches, a slide-type or any other type of switch manually operable to select a desired one of a plurality of operating positions, or by devices not operated by hand, such as a device operated in response to a voice of the vehicle operator or operated by foot, to select one of a plurality of operating positions. Although the shift lever 48 has the manual forward-drive position M for selecting the number of the forward-drive gear positions available for automatic shifting of the automatic transmission portion 20, 72, the shift lever 48 placed in the manual forward-drive position M may be used to manually shift up or down the automatic transmission portion 20, 72, within the range from the first gear position through the fourth gear position, by operating the shift lever 48 from the position M to the shift-up position "+" or shift-down position "−".

While the switch 44 is of a seesaw type switch in the preceding embodiments, the seesaw switch 44 may be replaced by a single pushbutton switch, two pushbutton switches that are selectively pressed into operated positions, a lever type switch, a slide-type switch or any other type of switch or switching device that is operable to select a desired one of the continuously-variable shifting state (differential state) and the step-variable shifting state (non-differential state). The seesaw switch 44 may or may not have a neutral position. Where the seesaw switch 44 does not have the neutral position, an additional switch may be provided to enable and disable the seesaw switch 44. The function of this additional switch corresponds to the neutral position of the seesaw switch 44. The seesaw switch 44 may be replaced by a switching device operable by a voice generated by the vehicle operator or a foot of the vehicle operator, rather than by hand, to select one of the continuously-variable shifting state (differential state) and the step-variable shifting state (non-differential state).

It is to be understood that the embodiments of the invention have been descried for illustrative purpose only, and that the present invention may be embodied with various changes and modifications which may occur to those skilled in the art.

The invention claimed is:

1. A control apparatus for a vehicular drive system including a continuously-variable transmission portion operable as an electrically controlled continuously variable transmission, the continuously-variable transmission portion having a differential mechanism operable to distribute an output of an engine to a first electric motor and a power transmitting member, and a second electric motor disposed in a power transmitting path between the power transmitting member and a drive wheel of a vehicle, said control apparatus comprising:

a differential-state limiting device provided in the differential mechanism, and operable to limit a differential function of the differential mechanism, for limiting an operation of the continuously-variable transmission portion as the electrically controlled continuously variable transmission; and a differential-state switching controller operable, when a predetermined condition regarding a vehicle condition is satisfied, for limiting the operation of the continuously-variable transmission portion as the electrically controlled continuously variable transmission by switching the differential mechanism to a differential function limited state in which a differential function is limited, and when acceleration or deceleration of the vehicle is required, for removing the limitation imposed by said differential-state limiting device on the operation of the continuously-variable transmission portion as the electrically controlled continuously variable transmission, by switching the differential mechanism placed in the differential function limited state to a differential state in which the limitation of the differential function is removed.

2. The control apparatus according to claim 1, wherein said differential-state limiting device includes at least one of a first engaging element operable to connect at least two of three rotary elements constituting the differential mechanism, and a second engaging element operable to hold one of said three rotary elements stationary, and wherein said differential-state switching controller releases said first engaging element or said second engaging element, for placing the differential portion in said differential state in which the differential portion performs the differential function.

3. The control apparatus according to claim 1, wherein said differential-state limiting device includes at least one of a first engaging element operable to connect at least two of three rotary elements constituting the differential mechanism, and a second engaging element operable to hold one of said three rotary elements stationary, and wherein said differential-state switching controller partially engages said first engaging element or said second engaging element, for placing the differential portion in said differential state in which the differential portion performs the differential function.

4. The control apparatus according to claim 1, further comprising:

a step-variable transmission portion constituting a part of the power transmitting path and functioning as a step-variable transmission; and a rotational speed controller operable, during a shift-down action of the step-variable transmission portion effected when the acceleration of the vehicle is required, to increase a rotational speed of the engine in an initial stage of the shift-down action.

5. The control apparatus according to claim 4, wherein said rotational speed controller is operated, during the shift-down action of the step-variable transmission portion effected when the acceleration of the vehicle is required, to adjust the rotational speed of the engine by using the first electric motor, such that the adjusted rotational speed coincides, in a final stage of the shift-down action, with a rotational speed of the engine that is to be established in a non-differential state in which the differential function of the differential mechanism is limited.

6. The control apparatus according to claim 1, further comprising:

a step-variable transmission portion constituting a part of the power transmitting path and functioning as a step-variable transmission; and a rotational speed controller operable, during a shift-up action of the step-variable transmission portion effected when the deceleration of the vehicle is required, to reduce a rotational speed of the engine in an initial stage of the shift-up action.

7. The control apparatus according to claim 6, wherein said rotational speed controller is operated, during the shift-up action of the step-variable transmission portion effected when the deceleration of the vehicle is required, to adjust the rotational speed of the engine by using the first electric motor, such that the adjusted rotational speed coincides, in a final stage of the shift-up action, with a rotational speed of the engine that is to be established in a non-differential state in which the differential function of the differential mechanism is limited.

8. The control apparatus according to claim 1, further comprising a torque-responsiveness changer operable, when said differential-state switching controller cannot remove the limitation imposed on the operation of the continuously-variable transmission portion as the electrically controlled continuously variable transmission, for changing responsiveness of an input torque of the continuously-variable transmission portion with respect to change in an angle of operation of a manually operable vehicle accelerating member.

9. The control apparatus according to claim 8, wherein said torque-responsiveness changer changes responsiveness of an output torque of the engine, for thereby changing the responsiveness of the input torque of the continuously-variable transmission portion with respect to the change in the angle of the operation of the manually operable vehicle accelerating member.

10. The control apparatus according to claim 9, wherein said torque-responsiveness changer moderates change in the output torque of the engine by a predetermined moderation amount, for thereby changing the responsiveness of the output torque of the engine with respect to the change in the angle of the operation of the manually operable vehicle accelerating member.

11. The control apparatus according to claim 8, wherein said torque-responsiveness changer offsets change in an output torque of the engine, by a torque of each of at least one of the first electric motor and the second electric motor, for thereby changing the responsiveness of the input torque of the continuously-variable transmission portion with respect to the change in the angle of the operation of the manually operable vehicle accelerating member.

12. The control apparatus according to claim 11, wherein said torque-responsiveness changer moderates change in the input torque of the continuously-variable transmission portion relative to change in the angle of the operation of the manually operable vehicle accelerating member, by offsetting the change in the output torque of the engine by the torque of each of said at least one of the first electric motor and the second electric motor.

13. A control apparatus for a vehicular drive system including a differential portion, the differential portion having a differential mechanism operable to distribute an output of an engine to a first electric motor and a power transmitting member, and a second electric motor disposed in a power transmitting path between the power transmitting member and a drive wheel of a vehicle, said control apparatus comprising:

a differential-state limiting device provided in the differential mechanism, and operable to limit a differential function of the differential mechanism, for limiting a differential function of the differential portion; and a differential-state switching controller operable, when a predetermined condition regarding a vehicle condition is satisfied, for switching the differential mechanism to a differential function limited state in which a differential function is limited, and when acceleration or deceleration of the vehicle is required, for switching the differential portion placed in the differential function limited state to a differential state in which the limitation of the differential function is removed.

14. The control apparatus according to claim 13, further comprising a torque-responsiveness changer operable, when said differential-state switching controller cannot place the differential portion in the differential state in which the differential portion performs the differential function, for changing responsiveness of an input torque of the differential portion with respect to change in an angle of operation of a manually operable vehicle accelerating member.

15. The control apparatus according to claim 14, wherein said torque-responsiveness changer changes responsiveness of an output torque of the engine, for thereby changing the responsiveness of the input torque of the differential portion with respect to the change in the angle of the operation of the manually operable vehicle accelerating member.

16. The control apparatus according to claim 15, wherein said torque-responsiveness changer moderates change in the output torque of the engine by a predetermined moderation amount, for thereby changing the responsiveness of the output torque of the engine with respect to the change in the angle of the operation of the manually operable vehicle accelerating member.

17. The control apparatus according to claim 14, wherein said torque-responsiveness changer offsets change in an output torque of the engine, by a torque of each of at least one of the first electric motor and the second electric motor, for thereby changing the responsiveness of the input torque of the differential portion with respect to the change in the angle of the operation of the manually operable vehicle accelerating member.

18. The control apparatus according to claim 17, wherein said torque-responsiveness changer moderates change in the input torque of the differential portion relative to change in the angle of the operation of the manually operable vehicle accelerating member, by offsetting the change in the output torque of the engine by the torque of each of said at least one of the first electric motor and the second electric motor.

* * * * *